US006870645B1

(12) United States Patent
Schramm et al.

(10) Patent No.: US 6,870,645 B1
(45) Date of Patent: Mar. 22, 2005

(54) PLANE DEPENDENT MATRIX BASED HALFTONING

(75) Inventors: Morgan T. Schramm, Portland, OR (US); Jay S. Gondek, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 903 days.

(21) Appl. No.: 09/678,642

(22) Filed: Oct. 3, 2000

(51) Int. Cl.[7] .................................................. H04N 1/40
(52) U.S. Cl. ...................................... 358/3.14; 358/3.06
(58) Field of Search ....................... 358/1.9, 3.06–3.14, 358/516–520, 529, 534–536

(56) References Cited

U.S. PATENT DOCUMENTS

| | | |
|---|---|---|
| 5,111,302 A | 5/1992 | Chan et al. |
| 5,377,024 A | 12/1994 | Dillinger |
| 5,402,245 A | 3/1995 | Motta et al. |
| 5,473,446 A | 12/1995 | Perumal, Jr. et al. |
| 5,537,228 A | 7/1996 | Dillinger |
| 5,657,137 A | 8/1997 | Perumal, Jr. et al. |
| 5,710,827 A | 1/1998 | Perumal, Jr. et al. |
| 5,809,217 A | 9/1998 | Bunce |
| 5,812,744 A | 9/1998 | Allebach et al. |
| 5,898,505 A | 4/1999 | Lin et al. |
| 5,930,010 A | 7/1999 | Cheung et al. |
| 5,949,964 A | 9/1999 | Clouthier et al. |
| 5,949,965 A | 9/1999 | Gondek |
| 5,973,803 A | 10/1999 | Cheung et al. |
| 5,974,228 A | 10/1999 | Heitsch |
| 5,982,990 A | 11/1999 | Gondek |
| 5,991,512 A | 11/1999 | Shaked et al. |
| 6,057,933 A | 5/2000 | Hudson et al. |

FOREIGN PATENT DOCUMENTS

| | | |
|---|---|---|
| EP | 0887998 | 12/1998 |
| GB | 2352353 | 1/2001 |

OTHER PUBLICATIONS

British Search Report dated Apr. 30, 2002.
Hewlett–Packard Company U.S. Appl. No. 08/812,777, filed Mar. 6, 1997, "Fast Error Diffusion Algorithm".

*Primary Examiner*—Thomas D. Lee
*Assistant Examiner*—Stephen Brinich
(74) *Attorney, Agent, or Firm*—Gregg W. Wisdom

(57) ABSTRACT

An embodiment of a halftoning method reduces the grainy appearance resulting from overlap of cyan and magenta colorants using a single threshold matrix for both the cyan and the magenta color planes. The cyan color value and the magenta color value for a pixel are summed. If the sum is greater than the maximum possible color value by at least the corresponding matrix threshold value, both cyan and magenta colorants are placed on the pixel. If the sum is not greater than the maximum possible color value by at least the corresponding matrix threshold value, then the smallest of the cyan color value and the magenta color value is compared to the corresponding matrix threshold value. If this smallest color value is greater than the corresponding matrix threshold value, the corresponding colorant is placed on the pixel. Otherwise, the other colorant is placed on the pixel. If the sum is less the maximum possible color value, then the sum is compared to the corresponding matrix threshold value. If the sum is greater than the corresponding matrix threshold value, colorant will be placed on the pixel. The smallest of the cyan color value and the magenta color value is compared to the corresponding matrix threshold value. If this smallest color value is greater than the corresponding matrix threshold value, the corresponding colorant is placed on the pixel. Otherwise, the other colorant is placed on the pixel.

24 Claims, 32 Drawing Sheets

- ▨ Magenta
- ▨ Cyan
- ▨ C/M overlapping

```
sum = c + m;

if(sum > 255)    // decompose into blue, c and m
{
        blue = sum-255;     // Blue signal = the amount over 255
        if(blue > matrix[x][y])  // Compare B to matrix first
                Fire BLUE;     // Fire BOTH Cyan and Magenta
        Else
        {
                if(c < m)   // c is minority pixel
                {
                        if(c > matrix[x][y])
                                Fire CYAN
                        else
                                Fire MAGENTA
                }
                else // m is minority pixel
                {
                        if(m > matrix[x][y])
                                Fire MAGENTA
                        else
                                Fire CYAN
                }

}
}
else   // Sum is not above 255 so compare sum to threshold
{
        if(sum > matrix[x][y])   // fire something
        {
                if(c < m)   // c is minority pixel
                {
                        if(c > matrix[x][y])
                                Fire CYAN
                        else
                                Fire MAGENTA
                }
                else // m is minority pixel
                { if(m > matrix[x][y])
                Fire MAGENTA
        else
                Fire CYAN
```

FIG. 6

```
0x6f, 0x02, 0x85, 0x45, 0xf6, 0x9b, 0x70, 0x15, 0x69, 0xff, 0x74, 0x20,
0x5e, 0x7c, 0x06, 0x56, 0x71, 0x16, 0x4f, 0xa8, 0x58, 0x25, 0x97, 0x5b,
0xf1, 0x10, 0x96, 0x41, 0x5a, 0xfe, 0x31, 0x96, 0x62, 0x2a, 0x6d, 0xdb,
0x10, 0x4c, 0x9c, 0x58, 0xe7, 0x28, 0xda, 0x7c, 0x24, 0x4e, 0xdb, 0x63,
0xac, 0x2e, 0x81, 0x9b, 0x47, 0x25, 0xe7, 0xb8, 0x53, 0x22, 0x89, 0x6a,
0x37, 0x7c, 0xa5, 0x53, 0x9c, 0x7e, 0x3a, 0x60, 0x92, 0x50, 0x02, 0xf9,
0x8c, 0xd3, 0x2a, 0xfb, 0x86, 0x18, 0x55, 0xb7, 0x82, 0x2c, 0xee, 0x46,
0x9d, 0x67, 0x10, 0x4e, 0xba, 0x91, 0x2e, 0xa3, 0x60, 0x84, 0x22, 0xaa,
0xc7, 0xfc, 0x24, 0xb6, 0x88, 0x6f, 0x91, 0x0b, 0x71, 0xdd, 0x27, 0xf6,
0xc8, 0xaa, 0x16, 0x6f, 0xfd, 0x25, 0xc1, 0xdb, 0xa8, 0xf1, 0x1b, 0x5b,
0xeb, 0x46, 0x6b, 0x16, 0x74, 0x44, 0x94, 0xe7, 0x90, 0xff, 0x38, 0xb2,
0xcf, 0x0b, 0xe9, 0xa7, 0x2c, 0x46, 0x88, 0xb1, 0xf6, 0x33, 0xca, 0x43,
0xdd, 0xc0, 0x7f, 0xd2, 0x76, 0xae, 0x35, 0x6e, 0xb2, 0x4d, 0x24, 0xd2,
0x71, 0x9e, 0x4a, 0x12, 0xc8, 0xf5, 0x84, 0x3f, 0x95, 0x25, 0xe0, 0x78,
0x41, 0x95, 0x11, 0xb4, 0xf1, 0x98, 0xb9, 0x0b, 0x90, 0xdf, 0x3a, 0xf6,
0xd1, 0x6a, 0x14, 0x94, 0xfe, 0xcf, 0xb1, 0xf3, 0xc6, 0x02, 0xfa, 0x6c,
0x19, 0xe5, 0xab, 0xcd, 0xee, 0x1d, 0x81, 0xcb, 0x4c, 0x15, 0x63, 0x9e,
0x4d, 0xc3, 0x94, 0xf8, 0x3e, 0xbb, 0x6f, 0x86, 0xf6, 0x1a, 0xd2, 0x8a,
0xfd, 0x0b, 0x6b, 0xf3, 0x3c, 0xc2, 0xee, 0x5f, 0x7e, 0x0b, 0x6b, 0x3b,
0xef, 0x50, 0x36, 0xfd, 0x18, 0xaa, 0x7b, 0x03, 0x53, 0x29, 0x8d, 0xa1,
0x45, 0x7b, 0x17, 0x80, 0x5d, 0x2a, 0x8e, 0x7a, 0x99, 0x27, 0xde, 0xa9,
0xfa, 0xbc, 0x0d, 0xd0, 0x58, 0xb8, 0x78, 0x28, 0x6b, 0x56, 0xc4, 0x3a,
0xdb, 0xa1, 0xc3, 0x53, 0x13, 0x67, 0xe9, 0xa1, 0x2d, 0x9b, 0x0a, 0xf5,
0x40, 0xcd, 0xfd, 0x08, 0xda, 0x9b, 0xba, 0xf3, 0x02, 0xb2, 0xec, 0x86,
0x3c, 0xa3, 0x05, 0xc5, 0xff, 0x70, 0xbf, 0x07, 0xce, 0xfc, 0x63, 0x30,
0x58, 0x71, 0x3a, 0xfa, 0x21, 0xc6, 0x54, 0x06, 0xaf, 0x88, 0xdc, 0x2e,
0x56, 0x7a, 0x18, 0x49, 0x90, 0x5f, 0x26, 0x93, 0xb9, 0x4d, 0x07, 0x73,
0x42, 0xac, 0x60, 0xb4, 0x31, 0xe9, 0xb9, 0xd6, 0x23, 0xed, 0x6c, 0x03,
0x89, 0xdf, 0x11, 0xb3, 0x35, 0x62, 0xae, 0x5a, 0x21, 0x83, 0x47, 0xb9,
0x81, 0x04, 0x9e, 0x3f, 0xd9, 0xae, 0xe1, 0x9c, 0xc9, 0x1d, 0xb9, 0x95,
0x69, 0x34, 0xed, 0x96, 0xdb, 0xb7, 0xeb, 0x31, 0xca, 0xe0, 0xb4, 0xf8,
0x0d, 0xd5, 0xbb, 0xff, 0x3e, 0xb7, 0x03, 0x8b, 0x5f, 0x37, 0x7b, 0x27,
0x3f, 0xda, 0x18, 0xe4, 0xab, 0x8d, 0x1f, 0x4f, 0x6d, 0x03, 0xec, 0x3a,
0xd4, 0xab, 0x86, 0x1c, 0x55, 0xe5, 0x6a, 0x21, 0x5a, 0x99, 0x18, 0x83,
0x3d, 0x76, 0x5e, 0x39, 0x81, 0x28, 0xcd, 0x64, 0xde, 0x1f, 0x6a, 0xa7,
0x53, 0x32, 0xac, 0x56, 0x22, 0x88, 0x9d, 0xd6, 0x03, 0xe4, 0xa6, 0x43,
0x6d, 0xa1, 0x88, 0x72, 0x32, 0x50, 0xbb, 0x72, 0x08, 0x9d, 0xe3, 0x2b,
0xda, 0xb7, 0xe8, 0x36, 0xd5, 0x89, 0xf7, 0x2c, 0x96, 0xe2, 0x26, 0xf3,
0x8b, 0x6f, 0x91, 0x0e, 0x71, 0xb0, 0x2b, 0x4a, 0xa5, 0x58, 0x98, 0x26,
0xda, 0x9b, 0xe5, 0x37, 0xc8, 0xea, 0x9b, 0xda, 0x2a, 0x52, 0xd0, 0x8c,
0x1a, 0x46, 0x58, 0x6f, 0x05, 0x85, 0x5f, 0xe4, 0xc9, 0x4c, 0xb3, 0x67,
0x3a, 0x61, 0x82, 0x51, 0x07, 0x73, 0x56, 0x39, 0xab, 0x71, 0x46, 0x12,
0x69, 0xd9, 0x55, 0x1e, 0xcb, 0xaa, 0xf4, 0xc3, 0x7e, 0x0f, 0x52, 0x86,
0x3e, 0xfc, 0xd1, 0xb2, 0xf5, 0x8b, 0x25, 0x64, 0x94, 0x4d, 0x0c, 0xfa,
0x74, 0xaf, 0x35, 0xc6, 0x7e, 0xbc, 0x4e, 0xe9, 0xc3, 0x1d, 0xe4, 0xaf,
0x99, 0x50, 0x1a, 0x7d, 0xa7, 0x4d, 0x87, 0xe6, 0x17, 0x97, 0xef, 0x79,
0xae, 0x3a, 0x4c, 0xba, 0x78, 0x1d, 0xc1, 0x89, 0xeb, 0x13, 0xd8, 0xb9,
0xe8, 0x11, 0xf3, 0xa3, 0xd6, 0x39, 0xaf, 0x67, 0x0d, 0x50, 0x86, 0x66,
0x11, 0x5a, 0xa7, 0x63, 0x13, 0xc8, 0x81, 0x0a, 0xa5, 0x55, 0x38, 0xc8,
0x42, 0xdb, 0x99, 0xe7, 0xc4, 0x3a, 0xfe, 0x65, 0x83, 0x46, 0x04, 0x75,
0x94, 0x42, 0x69, 0x19, 0xa1, 0xb5, 0xff, 0x30, 0x6d, 0xf2, 0xcd, 0x2b,
0xf9, 0xa4, 0x3c, 0x8e, 0x09, 0x75, 0xd5, 0x1c, 0xca, 0x0f, 0xc2, 0xf4,
0xaa, 0x20, 0x97, 0x6c, 0x2d, 0x8f, 0xe5, 0x84, 0x31, 0xad, 0x7c, 0xe6,
0x44, 0x71, 0x1b, 0x61, 0xd3, 0xae, 0xf2, 0xba, 0x6e, 0x08, 0x58, 0x85,
```

FIG. 8a

```
0x17, 0xa8, 0xd8, 0xb9, 0xe6, 0x2f, 0xb7, 0xcb, 0x3d, 0xd6, 0x79, 0xf2,
0x0f, 0xdc, 0x89, 0x31, 0xa0, 0x56, 0x10, 0x65, 0xfc, 0xba, 0xe2, 0x0c,
0xc7, 0xf9, 0x31, 0xd1, 0x82, 0x45, 0xd2, 0x0f, 0xc9, 0xf4, 0x16, 0xe9,
0x5b, 0x96, 0x33, 0x5c, 0xcd, 0x4a, 0x29, 0x60, 0xa3, 0x7c, 0x20, 0x46,
0x85, 0x58, 0xec, 0x8d, 0xcd, 0x1b, 0xab, 0xc9, 0xef, 0x21, 0xc2, 0xde,
0x9a, 0x36, 0x68, 0xc0, 0xd9, 0x21, 0xff, 0xa4, 0x51, 0x17, 0x7c, 0x5f,
0x1c, 0x7e, 0xcc, 0x0d, 0xd5, 0xb6, 0xf7, 0x1d, 0xbe, 0xd7, 0x09, 0xef,
0x86, 0x69, 0x10, 0x84, 0xb3, 0x94, 0x12, 0x7d, 0xb4, 0x53, 0xd6, 0x22,
0xf7, 0xa1, 0x2c, 0x50, 0xff, 0xa6, 0x24, 0x92, 0x40, 0xe7, 0xcd, 0xb8,
0xee, 0x05, 0xb1, 0xcd, 0x9c, 0xf7, 0x25, 0xba, 0x9a, 0x08, 0xe1, 0x9a,
0x31, 0x64, 0x99, 0x22, 0xde, 0x9e, 0x2a, 0xca, 0x68, 0x34, 0x7c, 0x54,
0x1b, 0x67, 0x8b, 0x5a, 0x92, 0x02, 0x51, 0xa8, 0x69, 0x26, 0xa8, 0x60,
0xef, 0x7d, 0xd5, 0x2b, 0x82, 0x3a, 0x71, 0x5c, 0x35, 0x6d, 0x8e, 0x09,
0x68, 0xb7, 0x38, 0x6a, 0x2b, 0x61, 0x7e, 0x9e, 0x40, 0xd1, 0xf4, 0x09,
0x84, 0x9e, 0xff, 0x1c, 0xd5, 0x3f, 0xd2, 0xb6, 0xfc, 0x1d, 0xc0, 0x41,
0x58, 0xf9, 0x31, 0x4b, 0x9f, 0x67, 0x2f, 0x4b, 0x7c, 0xec, 0x4d, 0x91,
0x40, 0x6e, 0x05, 0x8a, 0xeb, 0xb6, 0xd4, 0x09, 0xf2, 0xb2, 0x2b, 0x9d,
0x3d, 0x61, 0x90, 0x57, 0x31, 0x8f, 0x5c, 0xb8, 0x48, 0x1e, 0xbb, 0xe6,
0x54, 0x26, 0xc3, 0x45, 0xdf, 0x16, 0x97, 0x62, 0x44, 0x7d, 0xe8, 0x97,
0x83, 0x44, 0x6c, 0xd7, 0x58, 0x71, 0x10, 0x4a, 0x86, 0x5d, 0x1f, 0x51,
0x6f, 0x0b, 0x67, 0x3b, 0xed, 0x64, 0xb1, 0x4e, 0xfb, 0x04, 0x82, 0x4f,
0x34, 0xb1, 0xea, 0x45, 0xad, 0xf1, 0xc7, 0x07, 0xfd, 0xaf, 0xda, 0x24,
0xed, 0xb9, 0x1d, 0x92, 0xe1, 0x46, 0xbf, 0x04, 0xca, 0x3f, 0xb9, 0xa3,
0x07, 0xda, 0xa9, 0xf1, 0xb5, 0x20, 0xa5, 0xc4, 0x24, 0xf7, 0x8e, 0xe2,
0xa9, 0xbe, 0xdd, 0x0c, 0xae, 0x85, 0x1a, 0xad, 0x3d, 0xb5, 0x67, 0x8f,
0x02, 0x55, 0x92, 0x63, 0x32, 0x79, 0x05, 0x9b, 0x6d, 0xa3, 0x73, 0x08,
0xd4, 0x88, 0xff, 0x03, 0xb0, 0xd0, 0x1b, 0xf7, 0xa9, 0xdf, 0xc2, 0x2c,
0x74, 0x58, 0x3b, 0x95, 0x77, 0x51, 0x6c, 0x8c, 0xf0, 0x13, 0xdf, 0xcb,
0xa8, 0xfb, 0x27, 0xd5, 0xa1, 0xf5, 0x44, 0x9a, 0x07, 0xdc, 0xa3, 0x5d,
0x2e, 0x74, 0xf1, 0xb9, 0xd3, 0x11, 0xb4, 0x5c, 0x05, 0xe5, 0x8b, 0x14,
0xb4, 0x99, 0xfc, 0x32, 0xda, 0xbb, 0xf4, 0x36, 0xc6, 0xe0, 0x85, 0xae,
0x18, 0x83, 0xda, 0x24, 0x42, 0xb2, 0xed, 0xd0, 0x8e, 0x14, 0x6a, 0x89,
0x0d, 0x6f, 0x41, 0x61, 0x9d, 0x4a, 0x10, 0x73, 0x47, 0x7e, 0xff, 0x2c,
0xc9, 0x57, 0xfa, 0x8d, 0x18, 0x6b, 0xf7, 0x45, 0x60, 0x92, 0x4b, 0x16,
0x7e, 0xdc, 0x3d, 0xec, 0x79, 0xa8, 0x50, 0x02, 0x78, 0x4d, 0x24, 0x5e,
0xfe, 0x2d, 0x6a, 0xdb, 0x58, 0xe4, 0x2f, 0xc8, 0xee, 0xab, 0xd8, 0x0f,
0xe1, 0xa9, 0xcf, 0xf0, 0x29, 0xc3, 0xe1, 0xa6, 0x1e, 0x55, 0xb8, 0x63,
0x27, 0x89, 0x69, 0x0e, 0x77, 0x57, 0x38, 0xa3, 0xdc, 0x23, 0xf6, 0xc1,
0x31, 0xcf, 0xe9, 0x21, 0xbd, 0x7a, 0x35, 0x4d, 0x7c, 0x15, 0x6a, 0x3e,
0x77, 0x35, 0x7d, 0xab, 0x6c, 0x3d, 0x7b, 0xeb, 0xc7, 0xac, 0x02, 0x87,
0x38, 0x54, 0xdd, 0x25, 0xba, 0xcc, 0x3d, 0xf6, 0x27, 0x50, 0xba, 0x75,
0x17, 0xa3, 0x7e, 0x97, 0x15, 0xa1, 0x47, 0xfe, 0x55, 0x35, 0xba, 0x93,
0x6a, 0x9b, 0x1e, 0x67, 0xba, 0xf9, 0x3b, 0xd1, 0xe3, 0x30, 0xbd, 0x81,
0xca, 0x28, 0xe9, 0xb2, 0xd3, 0x9b, 0x3d, 0x6b, 0x11, 0x93, 0x70, 0x3a,
0xdc, 0x83, 0x26, 0x98, 0xe9, 0xc7, 0x24, 0xd5, 0x5c, 0x96, 0x51, 0x10,
0x5e, 0xda, 0x1d, 0xcb, 0xfa, 0x3c, 0xc5, 0x79, 0xb8, 0x4c, 0x9c, 0xbb,
0x7d, 0x10, 0x51, 0x73, 0x43, 0x6a, 0x29, 0x7c, 0x44, 0x6e, 0x56, 0x3b,
0x75, 0x12, 0x50, 0x8c, 0xee, 0x35, 0xd7, 0x99, 0xe9, 0x3e, 0x9c, 0xb8,
0xcd, 0x18, 0xfa, 0x7c, 0x0c, 0x63, 0x7f, 0x13, 0x68, 0x94, 0x02, 0x49,
0x97, 0x5e, 0xc2, 0x07, 0xd7, 0xb1, 0xe9, 0xc1, 0x02, 0xce, 0xe2, 0x16,
0xc1, 0xfa, 0x97, 0x0d, 0x56, 0x90, 0x4d, 0x27, 0xee, 0x76, 0x9c, 0x63,
0x34, 0x90, 0x69, 0x84, 0xa9, 0x02, 0xd8, 0x8a, 0x5d, 0x28, 0x49, 0xe8,
0x5e, 0xd6, 0x2b, 0xb7, 0x95, 0x6d, 0x0f, 0xd6, 0x54, 0xe6, 0x83, 0x0e,
0x46, 0x76, 0x96, 0x21, 0xb1, 0x7c, 0xf4, 0x1c, 0xd9, 0x6f, 0x8e, 0x34,
```

FIG. 8b

```
0x67, 0x09, 0xad, 0xd8, 0xb8, 0xe8, 0x23, 0xb4, 0xa5, 0x5a, 0xb2, 0x0f,
0x78, 0x35, 0x66, 0xb7, 0x04, 0xff, 0xb2, 0xd2, 0x2f, 0xb6, 0x63, 0x34,
0xad, 0x93, 0xdf, 0x18, 0xe8, 0x85, 0x04, 0xec, 0x26, 0xc3, 0xf6, 0xa1,
0xbd, 0x13, 0xf8, 0xc5, 0xb0, 0xea, 0x1a, 0xbd, 0x90, 0xfd, 0x25, 0x6a,
0xb3, 0x77, 0x18, 0x46, 0x78, 0xca, 0x24, 0xf2, 0x4c, 0x8f, 0xb3, 0x41,
0xca, 0xa0, 0xb3, 0xd1, 0x43, 0xe0, 0xae, 0xc9, 0xff, 0x28, 0xe4, 0x67,
0x2d, 0x5f, 0x94, 0x52, 0x8f, 0x66, 0x2b, 0x4b, 0x89, 0x56, 0x1b, 0xd8,
0x38, 0xff, 0xd0, 0xa2, 0xbe, 0x19, 0xce, 0xfb, 0xa9, 0x1c, 0xeb, 0x47,
0xdf, 0x6a, 0x2e, 0xa5, 0xd1, 0xf9, 0x07, 0xb4, 0x72, 0x42, 0x85, 0x02,
0xcd, 0xeb, 0x86, 0x27, 0xbb, 0x36, 0xad, 0xdf, 0x9f, 0xc6, 0x02, 0x4e,
0x9b, 0x58, 0x11, 0x76, 0x3c, 0x54, 0xc3, 0xf7, 0x18, 0xdf, 0x8c, 0x54,
0x41, 0x7b, 0x50, 0x0c, 0xf5, 0x47, 0xe0, 0xc4, 0x1d, 0xfb, 0x92, 0xe3,
0x72, 0x28, 0x7b, 0x42, 0x8e, 0xf5, 0x99, 0x81, 0x14, 0x54, 0x6c, 0x8c,
0x39, 0x68, 0xb0, 0x43, 0x6b, 0x3c, 0x87, 0x20, 0xde, 0x91, 0x3b, 0x5b,
0x94, 0x0b, 0x87, 0xdc, 0x47, 0xcb, 0xac, 0x3c, 0xcf, 0x0c, 0xc0, 0xf9,
0xa9, 0x08, 0x5c, 0x86, 0x30, 0x6c, 0xd7, 0x54, 0xf0, 0x2e, 0x50, 0xfc,
0x74, 0x1b, 0x63, 0x81, 0x10, 0x9e, 0x82, 0xab, 0xf6, 0x44, 0xd2, 0x1f,
0xfe, 0xbc, 0xa7, 0xee, 0xd1, 0x25, 0xb2, 0xa1, 0x84, 0x1e, 0x70, 0x5e,
0x3e, 0x85, 0x09, 0x46, 0x78, 0xc2, 0x0e, 0x9c, 0xc7, 0x43, 0xee, 0x14,
0x4d, 0x98, 0x79, 0xde, 0x23, 0xc8, 0xf2, 0x60, 0x1c, 0x4a, 0xac, 0xf5,
0x07, 0x6f, 0x8c, 0x5c, 0x2d, 0xef, 0x82, 0xcd, 0xff, 0x38, 0xc1, 0xa3,
0xeb, 0x04, 0xa6, 0x7e, 0x46, 0xbb, 0x77, 0x1f, 0xf8, 0x9e, 0xcb, 0x87,
0x34, 0x74, 0x8f, 0x3b, 0x62, 0xaf, 0x4b, 0x39, 0x8c, 0xd8, 0x15, 0xe6,
0x66, 0x09, 0x4a, 0xdc, 0xbb, 0xf1, 0x08, 0xd8, 0xbf, 0x20, 0xf9, 0x8e,
0xa9, 0xd2, 0x09, 0x67, 0x48, 0x77, 0xd3, 0x26, 0xf2, 0x51, 0x35, 0xa3,
0x69, 0x02, 0x88, 0x6f, 0xf1, 0x53, 0x9b, 0x5c, 0x38, 0x90, 0xe7, 0xad,
0xdf, 0x02, 0x9c, 0x1c, 0x84, 0x6e, 0x07, 0x9a, 0x3a, 0xaa, 0xed, 0x2d,
0x55, 0xd1, 0x4b, 0x14, 0x95, 0x76, 0x0e, 0x7f, 0x3c, 0x74, 0x5b, 0x0a,
0x99, 0x75, 0xf5, 0x4f, 0x41, 0xb4, 0x0f, 0xd2, 0xf4, 0x32, 0xb3, 0xe2,
0x96, 0x38, 0x5c, 0x7f, 0x21, 0x70, 0xb8, 0x79, 0x32, 0xc9, 0x56, 0x3c,
0x90, 0x12, 0xad, 0x92, 0xe2, 0x35, 0x96, 0x76, 0x49, 0xba, 0xfd, 0x1d,
0xb1, 0x3a, 0x56, 0xa6, 0x25, 0x87, 0xe1, 0x48, 0x8f, 0x70, 0x22, 0xd5,
0x9d, 0xef, 0x32, 0xb4, 0x05, 0x5a, 0xe3, 0x1b, 0xbf, 0xd6, 0x02, 0xf2,
0x88, 0xd4, 0x0c, 0xc2, 0x5c, 0xa5, 0x4e, 0x85, 0xb9, 0xd5, 0x1f, 0x9e,
0x5c, 0x42, 0xa2, 0x28, 0x9a, 0x71, 0xd0, 0x12, 0x57, 0xf1, 0xa2, 0xc2,
0xfd, 0xa5, 0x05, 0x65, 0xb3, 0x82, 0xce, 0xf7, 0x1e, 0xb4, 0xe9, 0x46,
0x1a, 0x86, 0xe0, 0x1f, 0xd5, 0xb7, 0x14, 0x52, 0x7e, 0xb6, 0x29, 0xe4,
0xc4, 0xae, 0xe7, 0x24, 0xca, 0x8e, 0x45, 0xb8, 0x92, 0xf3, 0x23, 0xc1,
0xd9, 0x32, 0xeb, 0xb6, 0xd4, 0x15, 0xe4, 0xc5, 0x39, 0x56, 0xce, 0x05,
0xe5, 0xc7, 0x87, 0x50, 0xa4, 0x73, 0xc9, 0x54, 0x14, 0xf0, 0xcf, 0xae,
0xff, 0x0a, 0xd9, 0x9b, 0xf3, 0xb0, 0x0f, 0xc1, 0xff, 0x52, 0x29, 0x67,
0xb6, 0x5c, 0xca, 0x20, 0xe3, 0x93, 0x11, 0x52, 0xcf, 0x87, 0x13, 0xe9,
0x5c, 0x09, 0xb1, 0x2d, 0xce, 0xf9, 0x4f, 0x39, 0x6f, 0x0e, 0x53, 0xde,
0x87, 0x39, 0xb0, 0x63, 0xa0, 0x2d, 0x6c, 0xa5, 0x4d, 0x19, 0x67, 0xf6,
0x23, 0xc9, 0xf1, 0x2d, 0xa3, 0x3e, 0x63, 0xfe, 0x2b, 0x82, 0xcb, 0x61,
0xe4, 0x51, 0x33, 0xb8, 0x83, 0x28, 0x6b, 0x42, 0x84, 0x1c, 0xda, 0x88,
0xe2, 0x15, 0x5c, 0x93, 0x4f, 0x33, 0xd1, 0x92, 0xaf, 0x30, 0x70, 0xa6,
0x80, 0x2c, 0x6c, 0xfe, 0x37, 0xd4, 0x62, 0x96, 0x4c, 0x34, 0x8b, 0x6a,
0xf4, 0x0d, 0x68, 0xe4, 0x75, 0x05, 0xa0, 0x7c, 0x3d, 0x6a, 0x90, 0x48,
0x27, 0x8d, 0x42, 0xa6, 0x85, 0x30, 0xa7, 0x73, 0x9a, 0x2c, 0x69, 0xdf,
0x21, 0x60, 0xa0, 0x29, 0x83, 0xa0, 0x48, 0x30, 0x7a, 0x5e, 0x25, 0x55,
0x6d, 0x1d, 0x83, 0x66, 0xa3, 0x7c, 0xeb, 0x44, 0xd4, 0x0d, 0xf8, 0xa3,
0x72, 0x29, 0xd7, 0x9b, 0xf2, 0x44, 0xba, 0x9f, 0x81, 0xcc, 0x40, 0x6a,
0x17, 0x8a, 0xb6, 0xe5, 0x1c, 0xc4, 0x79, 0xa9, 0x64, 0xf0, 0x2a, 0x82,
```

FIG. 8c

```
0xff, 0x51, 0xda, 0xc3, 0x27, 0xea, 0xb3, 0x97, 0x81, 0x06, 0x9b, 0x6e,
0x13, 0xea, 0x82, 0xaf, 0xc4, 0x16, 0xec, 0x95, 0x0e, 0xae, 0x8d, 0xe9,
0x3f, 0xbe, 0x17, 0xea, 0x32, 0x5f, 0xba, 0x4c, 0x3e, 0xa3, 0x29, 0xc3,
0xe5, 0x83, 0x10, 0x69, 0xfc, 0xc6, 0x04, 0xf4, 0x43, 0xda, 0xba, 0x9e,
0x48, 0x17, 0x77, 0xf5, 0x10, 0xd8, 0xbe, 0x56, 0x3e, 0xaf, 0x19, 0xcc,
0x37, 0x50, 0xce, 0x5f, 0xfc, 0x09, 0xd3, 0xa8, 0xf7, 0xbc, 0x6c, 0xf3,
0x19, 0xc0, 0xef, 0x5a, 0x44, 0xf9, 0x17, 0x93, 0xb7, 0x03, 0xfd, 0xd0,
0x5c, 0xbd, 0x06, 0xe7, 0x9a, 0xd4, 0xba, 0x3e, 0xad, 0xe6, 0xd1, 0x37,
0xdb, 0x06, 0xc3, 0x81, 0x19, 0x7d, 0x40, 0x60, 0x33, 0xb2, 0x5b, 0x79,
0x06, 0x68, 0xe0, 0x1c, 0x50, 0xf3, 0x8c, 0xe4, 0xad, 0x0b, 0x57, 0x9e,
0x7e, 0xfd, 0x42, 0xd5, 0x12, 0xcc, 0x4c, 0x0a, 0xa7, 0x71, 0x14, 0x93,
0x60, 0x7d, 0x30, 0x48, 0xe1, 0x5f, 0x38, 0xd0, 0x8d, 0xc7, 0x4c, 0x03,
0x8e, 0x57, 0x74, 0x2e, 0x49, 0xfb, 0x64, 0x02, 0x75, 0xdd, 0x91, 0xce,
0xad, 0x9b, 0xf1, 0x0f, 0xc9, 0xfe, 0x8b, 0x08, 0x62, 0xb1, 0xa2, 0x25,
0x48, 0x89, 0x67, 0x19, 0x7b, 0x58, 0x0b, 0x88, 0xea, 0xcc, 0xac, 0x3c,
0x9e, 0x7b, 0x1f, 0x93, 0xdd, 0x7e, 0x96, 0x27, 0xaa, 0x90, 0xe1, 0x2a,
0xb1, 0x7e, 0x20, 0x59, 0x77, 0x04, 0x4e, 0xcc, 0x5a, 0x0d, 0x90, 0x23,
0xa6, 0x7c, 0xc0, 0x3a, 0xec, 0x4b, 0x37, 0x74, 0x1f, 0xf6, 0x66, 0xc3,
0x53, 0x12, 0x91, 0xf8, 0x03, 0x4d, 0x99, 0x5a, 0x1f, 0x6e, 0xa8, 0x3a,
0xf0, 0xac, 0xc3, 0xd8, 0x94, 0xe7, 0x17, 0xc5, 0xa3, 0x2e, 0x8a, 0xac,
0x34, 0xb8, 0x20, 0x48, 0x7c, 0xc8, 0x2f, 0xd0, 0x5e, 0x36, 0x94, 0x26,
0x84, 0xb6, 0x99, 0xe5, 0xc1, 0x20, 0xee, 0x3c, 0xde, 0xa6, 0xcc, 0x11,
0xbd, 0xa2, 0xfa, 0x25, 0x59, 0xa9, 0x30, 0xe1, 0x3f, 0xf7, 0xb7, 0xda,
0xa2, 0xc7, 0x1b, 0xd4, 0xa5, 0x48, 0x69, 0x0a, 0x75, 0x55, 0x27, 0x78,
0x61, 0x35, 0x75, 0xd9, 0x43, 0xf6, 0x3a, 0xd6, 0xb6, 0xe8, 0x36, 0xd2,
0x9d, 0xf0, 0xaf, 0x1f, 0x59, 0x81, 0x08, 0x68, 0xdf, 0x44, 0xfd, 0x03,
0xc2, 0x48, 0xf8, 0x5a, 0xe9, 0x66, 0x11, 0x8b, 0x43, 0xc9, 0xed, 0x3f,
0xc4, 0xe4, 0x24, 0xae, 0x7e, 0xd7, 0x3e, 0xe2, 0xcc, 0x09, 0xa0, 0x59,
0x82, 0xaa, 0x96, 0xe2, 0xaf, 0x3b, 0x85, 0xa9, 0x2b, 0xe3, 0x36, 0x63,
0x82, 0x27, 0xc1, 0x7f, 0xe8, 0x48, 0xcf, 0x67, 0x30, 0x76, 0x56, 0x03,
0x7c, 0x43, 0x71, 0xf8, 0x3e, 0xd5, 0x5c, 0xfb, 0x75, 0x05, 0xda, 0xa8,
0xfe, 0x3b, 0x98, 0xf2, 0x02, 0xbd, 0xdd, 0x5b, 0xf4, 0x32, 0x56, 0x77,
0x34, 0x68, 0xa3, 0x79, 0x08, 0x52, 0xfe, 0x75, 0x1e, 0x52, 0x71, 0xae,
0x0c, 0xf4, 0x80, 0xb5, 0x52, 0x9c, 0x20, 0x68, 0x3c, 0x7b, 0x50, 0x35,
0x80, 0xff, 0x2f, 0xc5, 0xe3, 0x3a, 0xb4, 0xd1, 0x9c, 0xc0, 0x19, 0xb6,
0x81, 0x1d, 0x55, 0x6f, 0x0a, 0x98, 0x73, 0xba, 0x4e, 0x2a, 0x80, 0xe3,
0x30, 0xbc, 0xf9, 0x1b, 0xc5, 0x73, 0xaa, 0x62, 0x2a, 0x72, 0xd1, 0x09,
0xbd, 0x41, 0xc5, 0xf5, 0x5a, 0x19, 0x94, 0xab, 0x30, 0x9b, 0x79, 0xfb,
0x2e, 0xa3, 0x64, 0x85, 0x30, 0x6a, 0xe9, 0xd1, 0x13, 0xc7, 0x56, 0x0d,
0x80, 0x4c, 0x19, 0xdd, 0x73, 0x43, 0xa3, 0xc9, 0xdc, 0xa4, 0xf6, 0x0e,
0xbc, 0x94, 0xfc, 0x0b, 0xbe, 0xdd, 0x24, 0xff, 0x38, 0xcd, 0x90, 0x21,
0x61, 0xa8, 0x10, 0xc7, 0x9d, 0x5b, 0x45, 0x80, 0x11, 0x5a, 0x75, 0x1a,
0x4b, 0x90, 0x79, 0x0c, 0xa4, 0x8c, 0x19, 0xb0, 0xfa, 0xd1, 0x47, 0xc6,
0x96, 0x23, 0x9c, 0x5f, 0xec, 0xce, 0x43, 0xd9, 0x79, 0x1a, 0x63, 0xd3,
0x10, 0xc9, 0x83, 0x07, 0xf3, 0x9a, 0xbd, 0xee, 0x9b, 0x1d, 0x5c, 0x80,
0x15, 0x92, 0xf8, 0x03, 0x50, 0xeb, 0x6d, 0x2c, 0xe3, 0xa7, 0xc6, 0xef,
0xaa, 0x1c, 0x59, 0xff, 0x0f, 0xd4, 0x40, 0xc9, 0x7a, 0x44, 0x73, 0x92,
0x32, 0x52, 0xcd, 0x91, 0xe5, 0x16, 0x9a, 0x7f, 0x32, 0x77, 0x23, 0xa1,
0x83, 0xdd, 0x70, 0x0c, 0x55, 0xd8, 0x64, 0x10, 0x49, 0xe8, 0xc1, 0x1c,
0xff, 0x99, 0x4d, 0x23, 0x74, 0xf7, 0x2d, 0xd6, 0xb6, 0xeb, 0x9e, 0xc8,
0x0b, 0xfb, 0x7e, 0x1b, 0x49, 0x74, 0x3b, 0x68, 0x2f, 0x71, 0x21, 0x7c,
0x8f, 0x44, 0x95, 0xbc, 0x5c, 0xed, 0x0c, 0xbc, 0x80, 0xf0, 0x4a, 0x2c,
0x7d, 0xec, 0xc4, 0x22, 0xd6, 0x9e, 0xe4, 0xc3, 0xab, 0xea, 0x24, 0xc4,
0x4e, 0xd0, 0xe1, 0x04, 0x5c, 0x96, 0x12, 0xf5, 0x41, 0xd8, 0xb1, 0x3e,
```

FIG. 8d

```
0x94, 0x02, 0x8f, 0xbb, 0x3b, 0xde, 0xa6, 0x2a, 0x6a, 0xea, 0x48, 0xaf,
0xcf, 0x15, 0x6c, 0x56, 0x0d, 0xd8, 0xaa, 0xec, 0xbe, 0x68, 0x21, 0x85,
0x3e, 0xa3, 0x8e, 0x4b, 0x06, 0x79, 0x61, 0x2e, 0x80, 0xe1, 0x3a, 0xb1,
0x81, 0xa0, 0x6b, 0x04, 0x92, 0xeb, 0x27, 0xdc, 0xbd, 0x0f, 0xef, 0x3c,
0x58, 0xb1, 0x38, 0xca, 0xfe, 0xaa, 0xd9, 0x02, 0x4f, 0xb6, 0x37, 0xff,
0x7e, 0xb1, 0x1e, 0xd4, 0x9d, 0x88, 0x02, 0x53, 0xb6, 0x7d, 0x3a, 0xb2,
0x8e, 0x41, 0x60, 0x79, 0x26, 0x5b, 0x7b, 0x32, 0x50, 0xb0, 0x5f, 0xbe,
0x08, 0xed, 0x98, 0xc9, 0xe1, 0x42, 0xaf, 0xca, 0x36, 0xeb, 0x73, 0x1b,
0x80, 0xa7, 0x53, 0xdc, 0x29, 0xc0, 0x90, 0xe2, 0x1a, 0xa3, 0x37, 0x66,
0xb1, 0x4d, 0x2a, 0x80, 0x5c, 0x3b, 0x72, 0xfb, 0x68, 0x3c, 0x6f, 0x9a,
0x3f, 0x84, 0xb4, 0x2c, 0x6c, 0x85, 0x10, 0xe5, 0xc5, 0x54, 0x2b, 0xef,
0x6a, 0x45, 0x91, 0xff, 0x39, 0xb6, 0x8f, 0x6d, 0x27, 0x8d, 0xe5, 0x2d,
0xbf, 0x79, 0x35, 0x52, 0x8b, 0x42, 0xac, 0xde, 0xc7, 0x13, 0xf2, 0xcf,
0xad, 0xfb, 0x15, 0xbc, 0x45, 0xce, 0x9a, 0x26, 0xe6, 0x47, 0xf7, 0xbe,
0x18, 0xd0, 0x6a, 0x4e, 0x94, 0x64, 0x21, 0x9b, 0x72, 0xf2, 0x50, 0x1e,
0x6f, 0x59, 0x3f, 0x89, 0xf1, 0x28, 0x9c, 0xc4, 0x42, 0xe6, 0x4f, 0xb9,
0x61, 0x34, 0xf0, 0x6d, 0xdb, 0x0f, 0xcc, 0xf2, 0x07, 0xc1, 0x93, 0xcf,
0xfe, 0x02, 0xc0, 0xf1, 0x88, 0xd5, 0x24, 0xe4, 0x67, 0xae, 0x54, 0x19,
0x8d, 0x5c, 0xf3, 0x17, 0x68, 0xd1, 0x09, 0xc5, 0x2f, 0xd5, 0x7a, 0x3d,
0x72, 0x02, 0x57, 0xd0, 0x6b, 0x0e, 0xf4, 0x85, 0xe0, 0x08, 0xbd, 0xf0,
0x0f, 0xd3, 0x8f, 0x1c, 0x94, 0xbd, 0x2a, 0xf0, 0xcc, 0x22, 0xe2, 0x54,
0xc3, 0xeb, 0x4e, 0x32, 0x7d, 0xa1, 0x73, 0x14, 0x86, 0xb1, 0x05, 0x71,
0x98, 0x1c, 0xd8, 0x45, 0xfc, 0x3d, 0xc8, 0x80, 0xa7, 0x4b, 0xf9, 0x06,
0xc8, 0xe8, 0x69, 0x2d, 0x73, 0x5a, 0x32, 0x62, 0x7e, 0x35, 0x50, 0xe9,
0x69, 0x02, 0x7a, 0x59, 0x17, 0x78, 0x8e, 0x33, 0x54, 0xae, 0x86, 0x09,
0xff, 0xa9, 0xbf, 0xe1, 0x06, 0xc6, 0x9f, 0xdd, 0x0d, 0xea, 0xc1, 0x66,
0xd0, 0x5a, 0x13, 0x89, 0x69, 0x06, 0x89, 0xf9, 0x26, 0xca, 0x92, 0x3e,
0x9f, 0x68, 0x2c, 0x75, 0x5b, 0xe4, 0x16, 0xaa, 0x3f, 0x4b, 0x95, 0x66,
0x14, 0xa2, 0x74, 0x35, 0x8d, 0xd3, 0x29, 0xf9, 0xbd, 0x02, 0x9e, 0x47,
0x8d, 0xae, 0x56, 0xf5, 0x4b, 0x14, 0xb5, 0xfc, 0xae, 0xe8, 0x35, 0xb0,
0x89, 0x47, 0xb8, 0x5a, 0x31, 0x94, 0x73, 0x44, 0x7b, 0x30, 0xa7, 0xda,
0x07, 0xe4, 0x79, 0xa0, 0x0e, 0x68, 0xa3, 0x74, 0x06, 0xa6, 0x90, 0xd6,
0x1f, 0xfd, 0xb7, 0xd4, 0x27, 0xf4, 0xca, 0x4a, 0xe2, 0x62, 0x0b, 0x78,
0xa3, 0x64, 0x04, 0x59, 0xe2, 0x24, 0xaf, 0x66, 0x31, 0x93, 0x0f, 0xb2,
0xff, 0xa0, 0xbc, 0x18, 0xc3, 0xd8, 0x8e, 0xae, 0x2a, 0xf8, 0xc1, 0xa8,
0xdb, 0xc9, 0x28, 0xe0, 0x92, 0xf2, 0x3c, 0xc9, 0x2a, 0x81, 0x59, 0x43,
0x7a, 0x2e, 0x6b, 0x8a, 0xb6, 0x2f, 0x96, 0x1c, 0xaf, 0x81, 0xee, 0xd1,
0x24, 0xc8, 0x5b, 0x37, 0x79, 0xab, 0x18, 0xe0, 0xb9, 0x45, 0xad, 0xd9,
0xa7, 0x36, 0x69, 0x22, 0x84, 0xb8, 0xe8, 0x28, 0xdb, 0x40, 0xc5, 0xfd,
0x4d, 0x12, 0x77, 0x95, 0x3e, 0x6c, 0xda, 0xb8, 0xef, 0x27, 0x6e, 0x9c,
0xe5, 0x8e, 0x22, 0x68, 0x48, 0x9e, 0x6f, 0x1e, 0xff, 0x9f, 0xd8, 0x1f,
0xc1, 0xfb, 0x1b, 0xc6, 0x9f, 0xf7, 0x41, 0x5e, 0x74, 0x34, 0x59, 0xbf,
0x46, 0xf4, 0xc6, 0x38, 0xfb, 0x1d, 0x5d, 0xba, 0x65, 0x09, 0x4b, 0x93,
0x55, 0x69, 0x9d, 0x2c, 0xc3, 0xa6, 0xf0, 0x2f, 0xd3, 0xb3, 0xed, 0x1a,
0xc4, 0x92, 0xd5, 0x86, 0xf3, 0x1c, 0xd4, 0x79, 0x47, 0x08, 0xdf, 0x8f,
0x40, 0x56, 0x0d, 0xdc, 0x73, 0x96, 0x4c, 0x32, 0x67, 0x0a, 0x4e, 0xb0,
0x64, 0x10, 0x7d, 0xb3, 0x48, 0xe8, 0x16, 0xd8, 0xb9, 0xfa, 0x14, 0x4b,
0xa4, 0x6e, 0x3a, 0xfa, 0x0a, 0x4a, 0xa7, 0x32, 0xa0, 0xf4, 0xaf, 0x98,
0xe3, 0x0b, 0x69, 0x84, 0x23, 0xfc, 0x7e, 0x19, 0x4a, 0x90, 0xee, 0xbb,
0xdd, 0x70, 0x0f, 0x5a, 0x8a, 0x61, 0x05, 0x84, 0xb5, 0xe0, 0x34, 0xc6,
0xe8, 0x84, 0x24, 0x68, 0x10, 0x84, 0x40, 0xbb, 0x6b, 0xab, 0xd0, 0x0b,
0x87, 0xde, 0x12, 0xbb, 0x41, 0x72, 0x06, 0x66, 0x8b, 0x3c, 0x6b, 0xe6,
0x55, 0x17, 0x8b, 0xd2, 0x9f, 0xff, 0x16, 0xd9, 0x92, 0x78, 0x17, 0x51,
0xa1, 0x85, 0x2f, 0xef, 0x88, 0xd2, 0x2d, 0xea, 0xbf, 0x0e, 0xe5, 0x7a,
```

FIG. 8e

```
0x17, 0x52, 0x85, 0x97, 0x13, 0x4f, 0x8a, 0x65, 0x43, 0x76, 0x11, 0x50,
0xb6, 0x62, 0x3f, 0x95, 0xd9, 0x83, 0x23, 0x65, 0xe7, 0x82, 0xa2, 0x1e,
0x56, 0xca, 0x14, 0xe4, 0xb6, 0xfd, 0x79, 0xc3, 0x41, 0xd8, 0x1c, 0xf6,
0x8f, 0xc3, 0xa2, 0x23, 0x53, 0x95, 0xb1, 0x29, 0xf4, 0xd1, 0x53, 0xc6,
0x8a, 0xdf, 0x18, 0x6b, 0x83, 0x4d, 0x11, 0x66, 0xb9, 0x4c, 0xf3, 0xcc,
0x58, 0x04, 0x96, 0xc5, 0xf7, 0xb2, 0x0a, 0x8a, 0x54, 0x2d, 0x9a, 0xb1,
0xf5, 0xd0, 0xaa, 0x23, 0x5a, 0x91, 0x66, 0x0c, 0x57, 0xa5, 0xc1, 0x38,
0xde, 0xa4, 0xfa, 0x05, 0x39, 0x55, 0x7f, 0xf3, 0x3a, 0xb4, 0x52, 0xeb,
0x8b, 0x28, 0xe4, 0xa4, 0xcb, 0x4b, 0xab, 0x8e, 0x03, 0xdc, 0xa7, 0x24,
0x4c, 0xb6, 0x66, 0x28, 0xab, 0x33, 0xe0, 0xb8, 0xd9, 0x45, 0xa6, 0x13,
0x53, 0xb0, 0x66, 0x19, 0x8a, 0x6e, 0x43, 0xa2, 0xdc, 0xb8, 0x40, 0x66,
0xf8, 0x26, 0xd4, 0xb5, 0xfe, 0x2d, 0xe3, 0x39, 0xd2, 0x8b, 0xeb, 0x27,
0xc2, 0x3a, 0xf5, 0xa5, 0xc6, 0x2c, 0xfc, 0xbd, 0x3a, 0xf2, 0xa3, 0x3e,
0x5a, 0x99, 0x1f, 0xe7, 0x92, 0x35, 0x74, 0x44, 0x69, 0x02, 0x61, 0x87,
0x38, 0x6e, 0xe4, 0x5f, 0x04, 0x92, 0x7a, 0x26, 0x62, 0x9d, 0x52, 0xd2,
0x9a, 0x41, 0xe9, 0x1e, 0xd7, 0x8b, 0x37, 0xb2, 0x9f, 0xe8, 0x29, 0x5e,
0x79, 0x3a, 0x6d, 0x1d, 0xad, 0xfb, 0xcb, 0x36, 0x4e, 0x1a, 0x8f, 0xe9,
0x3d, 0xf7, 0xbb, 0xd9, 0x1c, 0xfe, 0x44, 0x96, 0xca, 0x58, 0x1d, 0x8b,
0xea, 0xcb, 0x29, 0xa7, 0x71, 0xd3, 0x2f, 0xa8, 0x60, 0xb5, 0x37, 0x57,
0xef, 0x0f, 0xd6, 0x34, 0xb5, 0x6f, 0x3a, 0xf0, 0x0c, 0xd3, 0x8a, 0xec,
0x02, 0x6b, 0x8f, 0x57, 0x0b, 0x70, 0xe7, 0xc7, 0x36, 0xf4, 0x90, 0xd6,
0x35, 0xfc, 0xcb, 0x31, 0x71, 0x02, 0xe7, 0xa6, 0xc5, 0x70, 0x3f, 0x90,
0x08, 0xa2, 0xba, 0x72, 0x9e, 0x02, 0x57, 0x73, 0x11, 0x50, 0x8a, 0x5f,
0x04, 0x4a, 0x88, 0x67, 0x97, 0x07, 0x72, 0x85, 0x25, 0xab, 0x70, 0x05,
0x69, 0xca, 0x95, 0xdf, 0x30, 0xcb, 0xa6, 0xf0, 0xd1, 0x0d, 0xcb, 0x86,
0xbc, 0x19, 0xdb, 0xb5, 0xe9, 0x30, 0xb9, 0xfd, 0x03, 0xb2, 0xcc, 0x5a,
0x2f, 0x9d, 0x71, 0x15, 0x49, 0x86, 0xa4, 0xde, 0x13, 0xd7, 0xbb, 0xeb,
0x44, 0x62, 0x07, 0x85, 0xc1, 0x6d, 0x30, 0xba, 0x85, 0x16, 0x4c, 0x99,
0x64, 0x31, 0x6e, 0x08, 0x75, 0x35, 0xd5, 0xb0, 0x7c, 0x18, 0x4b, 0xbf,
0x5f, 0x1a, 0x80, 0xda, 0x0a, 0xf5, 0x83, 0x17, 0x8d, 0x5f, 0x26, 0x64,
0xec, 0x4d, 0x99, 0x80, 0x59, 0x2d, 0x61, 0xc2, 0x47, 0xcf, 0xfc, 0x1f,
0xc3, 0x8c, 0x25, 0x61, 0x78, 0x03, 0x49, 0xad, 0x73, 0x9a, 0x1c, 0x54,
0xf7, 0x91, 0x29, 0x5a, 0x0c, 0x86, 0xea, 0x20, 0x5f, 0x83, 0x46, 0xf6,
0x22, 0xd6, 0xb4, 0xfd, 0x9d, 0xcf, 0xb1, 0x1b, 0xf0, 0xa1, 0xd3, 0x16,
0xe8, 0x53, 0xdc, 0xbb, 0xd6, 0x37, 0xf1, 0xbe, 0x53, 0xfb, 0x0f, 0xbd,
0x7d, 0xe9, 0x4d, 0x18, 0x75, 0x95, 0x2e, 0x4d, 0xec, 0x5a, 0x40, 0x73,
0x08, 0x6c, 0x83, 0x1c, 0x68, 0x36, 0x8c, 0x73, 0xff, 0x07, 0xd1, 0xf5,
0x2e, 0xc9, 0x67, 0x33, 0x4e, 0x9d, 0x62, 0x31, 0x88, 0x9b, 0xdb, 0x40,
0xee, 0xa5, 0xd7, 0x09, 0x70, 0xa3, 0x2a, 0x84, 0xd3, 0xa0, 0xed, 0xba,
0xe3, 0xa3, 0x41, 0x65, 0x0c, 0xff, 0x8f, 0xdb, 0x04, 0xf9, 0xa3, 0x46,
0x71, 0xc6, 0x42, 0xdf, 0xbd, 0xac, 0xfe, 0x9e, 0xc8, 0x1f, 0xbe, 0xda,
0xac, 0xf8, 0x1c, 0x98, 0x7c, 0xa6, 0x35, 0x87, 0xe4, 0x3d, 0xbc, 0xf9,
0x9b, 0xd3, 0x23, 0xec, 0x59, 0x09, 0xb2, 0x8a, 0xc5, 0x38, 0xd6, 0x9d,
0xe1, 0x31, 0xbe, 0xa4, 0xf0, 0xd0, 0x16, 0x89, 0x5f, 0x36, 0x7c, 0x41,
0x60, 0xe3, 0x30, 0x75, 0xba, 0x53, 0x35, 0x64, 0xc7, 0x2d, 0x99, 0x67,
0x0e, 0x4b, 0x92, 0x79, 0x2c, 0x9d, 0x6f, 0x1f, 0x5c, 0x95, 0x29, 0xbd,
0x44, 0xff, 0xc2, 0x1d, 0xab, 0x7e, 0xfb, 0x34, 0xae, 0xf2, 0x40, 0xbf,
0x86, 0xee, 0xac, 0x23, 0xb8, 0x6a, 0x4f, 0xaf, 0x77, 0xe5, 0x0c, 0xc1,
0xed, 0x88, 0x03, 0xb6, 0xd5, 0x17, 0xb1, 0x76, 0x11, 0x46, 0x87, 0x54,
0xe6, 0xbb, 0xde, 0x04, 0xb7, 0x52, 0x18, 0x7a, 0x55, 0x12, 0xf1, 0xc1,
0x4e, 0xb3, 0x66, 0x42, 0x7e, 0x39, 0x6a, 0xcc, 0x98, 0x22, 0xa2, 0x69,
0x2f, 0x79, 0x4f, 0x0b, 0x89, 0x6d, 0x12, 0x68, 0x43, 0x79, 0xc8, 0x38,
0xf3, 0x0f, 0x68, 0xa1, 0x4f, 0x68, 0x90, 0x18, 0x4e, 0xb1, 0x7d, 0xc1,
0x3b, 0xd2, 0xf1, 0x70, 0x20, 0x60, 0x82, 0x46, 0xb7, 0x51, 0x15, 0x73,
```

FIG. 8f

```
0x55, 0x28, 0x9f, 0xdf, 0xb0, 0xe8, 0x14, 0xc0, 0x84, 0x0a, 0x4c, 0x88,
0xd9, 0x25, 0xed, 0x7e, 0x9f, 0x49, 0x1a, 0xf5, 0xa8, 0xdf, 0xc5, 0x14,
0xe9, 0x42, 0xda, 0xb2, 0xd5, 0x0a, 0xf5, 0xa5, 0x61, 0x90, 0x3a, 0x74,
0xd9, 0x0e, 0xc0, 0x8f, 0xce, 0x15, 0x9f, 0xe1, 0x47, 0xcf, 0x0e, 0x4b,
0xde, 0x83, 0x1d, 0x9d, 0x59, 0x23, 0x8d, 0x5b, 0xa7, 0x1c, 0xff, 0x41,
0x54, 0x6b, 0xf8, 0x24, 0xd3, 0x9d, 0xff, 0x29, 0x8d, 0x5f, 0x3c, 0x6c,
0xf5, 0x3f, 0xd7, 0x9e, 0x25, 0x87, 0x67, 0x2d, 0x99, 0xd6, 0x22, 0xee,
0xb8, 0xd8, 0x1d, 0xf0, 0x33, 0x5a, 0xfb, 0x02, 0xca, 0xdb, 0x21, 0xe3,
0x42, 0xf6, 0xcb, 0x36, 0xe5, 0x08, 0x9d, 0x6b, 0x45, 0xb9, 0x19, 0xf0,
0xcc, 0x07, 0xe0, 0xc6, 0x32, 0xe4, 0x5f, 0x15, 0x87, 0x9f, 0x47, 0x10,
0x9f, 0xee, 0xb0, 0x1a, 0xff, 0x85, 0xca, 0xde, 0x3a, 0xc3, 0x6f, 0x0b,
0x4e, 0x9c, 0x66, 0xef, 0x21, 0xc9, 0xf8, 0xad, 0x11, 0x5e, 0xa5, 0x09,
0xff, 0xb9, 0x8a, 0x33, 0x60, 0x7f, 0x30, 0x5a, 0xb4, 0x7d, 0x25, 0x47,
0xa3, 0x6e, 0x3e, 0x7f, 0xdb, 0x06, 0xe7, 0x5e, 0x98, 0x4f, 0x23, 0x46,
0x70, 0x56, 0x27, 0x8d, 0x69, 0x2d, 0x70, 0x9d, 0xbb, 0x3b, 0xeb, 0xd0,
0x40, 0xbe, 0xfa, 0x43, 0xd3, 0x6b, 0x2a, 0x7c, 0xe7, 0x92, 0x34, 0x5b,
0xb9, 0x72, 0x38, 0xb2, 0x19, 0xef, 0xab, 0x9a, 0x20, 0x8d, 0xaf, 0x34,
0xfb, 0xcf, 0xab, 0xe1, 0x60, 0x35, 0x7a, 0x10, 0x5b, 0x9f, 0x84, 0x0d,
0xb5, 0x87, 0xc2, 0x8f, 0x3f, 0xa2, 0x66, 0xb7, 0x7d, 0xac, 0x2b, 0x9b,
0x7f, 0xb4, 0x18, 0xe9, 0x8e, 0xdc, 0x83, 0x29, 0x99, 0x74, 0x42, 0x95,
0x70, 0x0b, 0x92, 0xfd, 0x2d, 0x6d, 0xc3, 0xe0, 0x41, 0xcc, 0x07, 0x94,
0x3c, 0x64, 0xa3, 0x04, 0x8a, 0xfc, 0x47, 0xbd, 0x2a, 0xcc, 0x8a, 0x32,
0xa3, 0x8c, 0x6b, 0x2b, 0x96, 0xc5, 0xde, 0x68, 0x3c, 0x73, 0xe4, 0xcd,
0x02, 0xbc, 0xfe, 0x9b, 0xd3, 0x07, 0xf7, 0x8d, 0xe4, 0x34, 0xd3, 0xb5,
0x17, 0x51, 0xa6, 0x28, 0xd0, 0xf4, 0xb4, 0xe8, 0xa9, 0xde, 0xc5, 0x0a,
0xf1, 0xb4, 0x89, 0xfa, 0x14, 0x68, 0xa5, 0x02, 0x71, 0x94, 0x18, 0x76,
0x9c, 0x35, 0xdd, 0xa5, 0xc8, 0x0b, 0xbf, 0x8a, 0xe8, 0x02, 0x53, 0xdd,
0x66, 0x0f, 0x4c, 0xc7, 0x71, 0xe2, 0x0a, 0x6c, 0x96, 0x49, 0x02, 0x7b,
0x1a, 0xc2, 0xa5, 0xce, 0x2f, 0xb1, 0x45, 0x64, 0xe5, 0x4d, 0x17, 0x73,
0xeb, 0x11, 0x85, 0xcf, 0x55, 0x05, 0x61, 0xd6, 0x47, 0xff, 0x59, 0xce,
0x26, 0x55, 0xa1, 0x62, 0x3a, 0xff, 0xbf, 0x22, 0xf3, 0xc9, 0xaa, 0x44,
0xd1, 0x91, 0x22, 0x61, 0x78, 0x2c, 0x6b, 0xdc, 0xc3, 0x27, 0xf3, 0x57,
0x19, 0xb1, 0x92, 0xda, 0x83, 0xf7, 0x05, 0x57, 0xe0, 0x4e, 0x38, 0xe7,
0x77, 0x49, 0x1f, 0x9b, 0xb2, 0x12, 0x5b, 0x94, 0x4a, 0x21, 0x75, 0x4f,
0x1b, 0x74, 0xaf, 0x53, 0x12, 0x7c, 0x5b, 0x22, 0x87, 0xf8, 0xc9, 0x85,
0x13, 0x72, 0x60, 0x02, 0x7c, 0x38, 0x64, 0x81, 0x1f, 0xd1, 0x54, 0x35,
0xa2, 0x28, 0x8b, 0xf2, 0x33, 0xe1, 0xb0, 0xd7, 0x08, 0xb9, 0x8a, 0x4d,
0x22, 0x71, 0xe0, 0x4a, 0x2e, 0xac, 0x90, 0xbb, 0x79, 0xd7, 0x2b, 0xfd,
0x56, 0x37, 0xb8, 0x58, 0xc0, 0x28, 0xcc, 0xf7, 0x58, 0xec, 0x46, 0x87,
0xfc, 0x1f, 0xdd, 0x9b, 0xc9, 0x3d, 0xf1, 0x61, 0xba, 0x4b, 0x2e, 0xfa,
0x3a, 0xdb, 0x7b, 0xa5, 0x23, 0x96, 0x3f, 0x84, 0xaa, 0x04, 0xc9, 0xe7,
0xb5, 0x11, 0x8a, 0x60, 0x83, 0x52, 0x19, 0x79, 0xb7, 0x05, 0xf4, 0xaa,
0xc0, 0xfa, 0x56, 0x8e, 0x0f, 0x4b, 0xb5, 0x83, 0xe8, 0x3d, 0x6c, 0x1d,
0x55, 0x3f, 0xae, 0x7a, 0xbb, 0x12, 0xb6, 0xce, 0x03, 0xfa, 0x89, 0xd4,
0x2c, 0xdb, 0x3f, 0xf8, 0xaa, 0xc3, 0xda, 0x33, 0xee, 0x60, 0xcc, 0x28,
0xc3, 0xfc, 0xa9, 0xd9, 0x99, 0x35, 0x6a, 0x45, 0xb1, 0x30, 0x9a, 0xcd,
0x1a, 0xbf, 0xf6, 0xaa, 0x4e, 0x98, 0x05, 0xe4, 0x80, 0xcf, 0x50, 0xc0,
0x5a, 0x27, 0x6f, 0x3f, 0x54, 0xf6, 0x6b, 0x12, 0xec, 0x60, 0xa8, 0x1a,
0xf5, 0x63, 0x21, 0xf9, 0x3b, 0xa8, 0x7e, 0xb3, 0x1c, 0x8e, 0xf0, 0x16,
0xdf, 0x90, 0xae, 0x3a, 0x8a, 0x9e, 0x08, 0x6b, 0x99, 0x55, 0x05, 0x67,
0x2a, 0x81, 0xaf, 0x25, 0xd6, 0x90, 0xaa, 0x1c, 0x64, 0x9e, 0x17, 0xf3,
0xc8, 0x0e, 0xbd, 0x67, 0xe3, 0x49, 0x35, 0x67, 0x20, 0x52, 0xaf, 0xea,
0x2e, 0xd7, 0x9b, 0xee, 0x36, 0x58, 0x8c, 0x4a, 0x12, 0x7d, 0x3f, 0xaf,
0xe5, 0x9a, 0xd7, 0x30, 0x5d, 0xa4, 0x0e, 0xf3, 0xc5, 0x8e, 0xdc, 0x2c,
```

FIG. 8g

```
0xff, 0x73, 0x9f, 0x22, 0x62, 0xb0, 0x5a, 0x36, 0x72, 0xa1, 0x7d, 0x25,
0x61, 0x85, 0x0f, 0xa3, 0x8b, 0x3b, 0xe1, 0x77, 0x98, 0x48, 0x03, 0x6f,
0x54, 0xe3, 0x0a, 0xc3, 0x95, 0xdc, 0x3f, 0xff, 0x53, 0x44, 0x93, 0x2e,
0xe8, 0xc6, 0x71, 0xbd, 0x3f, 0xf7, 0x0e, 0xab, 0x7e, 0xcb, 0x10, 0xe7,
0x7a, 0xa3, 0x2d, 0x91, 0xb2, 0x3d, 0xd7, 0x7c, 0x99, 0xca, 0x85, 0x0c,
0x51, 0xc9, 0x5c, 0x05, 0xd1, 0x70, 0xaa, 0x7a, 0x43, 0x68, 0x0f, 0x77,
0xe3, 0x27, 0xd1, 0x3d, 0xc3, 0xea, 0xa8, 0xbc, 0xf8, 0x11, 0xda, 0x7a,
0x07, 0x5d, 0xcb, 0x83, 0xc1, 0xe7, 0x4b, 0x33, 0x85, 0x5c, 0xef, 0x1f,
0xc4, 0x99, 0xf1, 0xaa, 0xdb, 0x99, 0xce, 0x02, 0x4a, 0xb9, 0x5f, 0x27,
0x70, 0xe3, 0xc5, 0x29, 0xde, 0x9b, 0xeb, 0x21, 0x74, 0x63, 0x1b, 0x95,
0xc5, 0xe2, 0x88, 0x34, 0xa4, 0x67, 0x13, 0x4a, 0x99, 0x59, 0x3e, 0xeb,
0x96, 0xd3, 0x13, 0xf2, 0xc2, 0x06, 0xe3, 0xc7, 0x18, 0xf0, 0x55, 0xcb,
0x65, 0x9f, 0x0c, 0x5c, 0xbc, 0x1b, 0xed, 0xc6, 0x2a, 0xad, 0x7c, 0xf2,
0x50, 0x20, 0x6b, 0xac, 0x83, 0xe1, 0x0e, 0x5c, 0x7a, 0x18, 0x49, 0x9d,
0x62, 0x1d, 0x71, 0xdb, 0x42, 0xfe, 0x81, 0xbc, 0x1e, 0xdb, 0xcb, 0x43,
0xfc, 0x85, 0x07, 0xb9, 0x4f, 0x39, 0xa6, 0xd6, 0x98, 0xeb, 0x2f, 0x88,
0xe7, 0x46, 0x27, 0xca, 0xff, 0x30, 0xd7, 0xba, 0x18, 0x57, 0xf3, 0xa3,
0x24, 0x82, 0x4b, 0x38, 0x73, 0x54, 0x35, 0xa3, 0xff, 0x28, 0xdd, 0x54,
0x0a, 0x8e, 0xa8, 0xbd, 0xe0, 0x3c, 0x9c, 0x4e, 0x12, 0x7d, 0x5e, 0x0b,
0x4c, 0x7a, 0x38, 0x6d, 0x8f, 0xfb, 0x0f, 0xd5, 0x88, 0xa2, 0x1a, 0x71,
0xb1, 0x6b, 0x02, 0xc7, 0x44, 0xf2, 0xce, 0x08, 0x6e, 0x46, 0xab, 0x56,
0xd6, 0x23, 0xf0, 0xb3, 0xd4, 0x09, 0xaf, 0x7c, 0x31, 0x4a, 0x77, 0x94,
0x41, 0x68, 0x8f, 0x45, 0x95, 0xbc, 0x43, 0xe6, 0x23, 0xbd, 0xf2, 0x2e,
0xd6, 0x7a, 0xa4, 0x38, 0x91, 0xcc, 0x5d, 0x18, 0x74, 0xe8, 0x08, 0xc4,
0x60, 0x24, 0xb5, 0x9b, 0xcd, 0xfc, 0x28, 0xc2, 0xe0, 0xa9, 0x34, 0x9c,
0x69, 0x21, 0x48, 0xa8, 0x68, 0x04, 0x77, 0x5b, 0xc4, 0x2a, 0x56, 0xde,
0x15, 0xf2, 0x76, 0x46, 0x18, 0x7b, 0xb1, 0x3f, 0xbb, 0x92, 0x68, 0x07,
0x8f, 0xa1, 0x70, 0x46, 0xaa, 0x90, 0x70, 0x0e, 0x5c, 0xce, 0x18, 0xe4,
0xc5, 0x9d, 0xcf, 0x6b, 0x44, 0x7e, 0xac, 0x3a, 0xf5, 0x1f, 0x59, 0x78,
0x02, 0x89, 0xd8, 0xb2, 0xfd, 0x2c, 0xd4, 0xba, 0xf9, 0x25, 0xc0, 0xe2,
0xad, 0x1d, 0x79, 0xa6, 0x4c, 0x09, 0xff, 0x54, 0xcf, 0x2c, 0x4f, 0xa7,
0x90, 0x33, 0x55, 0x9f, 0xfa, 0x17, 0xd9, 0x76, 0x02, 0x93, 0x62, 0x80,
0x27, 0x6e, 0xdf, 0x17, 0xf6, 0xb7, 0xd8, 0x24, 0xe7, 0xbc, 0x2a, 0xf6,
0x6a, 0x31, 0x78, 0x04, 0x7d, 0x3f, 0x71, 0x94, 0x41, 0x55, 0xdd, 0x6b,
0x10, 0xfe, 0x40, 0xd4, 0xb3, 0xa0, 0x88, 0x33, 0xd6, 0x8b, 0xf0, 0x4c,
0x3b, 0x7e, 0x64, 0x0a, 0x51, 0x88, 0xf0, 0xc6, 0x06, 0xbd, 0x7f, 0xeb,
0x39, 0xbd, 0xe3, 0x96, 0x1b, 0xa5, 0x76, 0x9e, 0x64, 0x28, 0x96, 0xe4,
0xc2, 0x24, 0xf3, 0x6c, 0x15, 0xf8, 0xa8, 0xdd, 0x21, 0x57, 0xeb, 0x89,
0xf9, 0xcd, 0x3f, 0xbe, 0x95, 0xfe, 0x90, 0xad, 0x0a, 0x88, 0xef, 0x19,
0xc1, 0xea, 0x11, 0x98, 0x7d, 0xc8, 0x2d, 0xfc, 0xd0, 0x6a, 0x22, 0x59,
0x72, 0xa3, 0x38, 0x75, 0x90, 0x5d, 0x13, 0x7f, 0x3d, 0x54, 0xca, 0xf0,
0x2d, 0xb6, 0x8f, 0x40, 0xec, 0x97, 0xc1, 0xfd, 0x11, 0x6b, 0xb3, 0x7e,
0x3e, 0x94, 0x29, 0xb0, 0xfd, 0xcb, 0x36, 0xc0, 0xec, 0x43, 0xc6, 0x56,
0x96, 0x5f, 0x0a, 0x8a, 0x6f, 0x15, 0x80, 0xd0, 0x0c, 0xdf, 0xc7, 0xa7,
0xff, 0xd1, 0x17, 0xc6, 0xf9, 0x08, 0xb6, 0x8c, 0x4e, 0x23, 0x7a, 0x90,
0x28, 0x5a, 0xf9, 0x4b, 0x13, 0x66, 0xa9, 0x03, 0xde, 0xbc, 0xa7, 0xec,
0xca, 0x17, 0x6a, 0x3f, 0x7a, 0xf4, 0x2e, 0xcb, 0x60, 0xa2, 0x4a, 0x10,
0xea, 0xcd, 0x38, 0xef, 0xc6, 0xb0, 0x03, 0x5f, 0xa0, 0x55, 0x0a, 0xa1,
0x82, 0x31, 0x52, 0x7c, 0xb6, 0x3e, 0xc6, 0x04, 0x4f, 0x32, 0x83, 0xe6,
0x2c, 0x51, 0x71, 0x3c, 0x68, 0x27, 0x4a, 0x73, 0x94, 0x34, 0x5c, 0xe0,
0x46, 0xab, 0x66, 0x15, 0xa1, 0x44, 0xc7, 0xea, 0x08, 0xdf, 0x55, 0x1d,
0xb0, 0xe6, 0xd0, 0x2a, 0xf3, 0x6f, 0x93, 0x38, 0x69, 0xd1, 0x76, 0xab,
0x0d, 0x78, 0x5e, 0x25, 0x83, 0xd0, 0xee, 0x1d, 0xc8, 0xe9, 0x70, 0x39,
0x59, 0x87, 0x4a, 0x0f, 0x7a, 0x92, 0x2f, 0x76, 0xd0, 0x2b, 0xae, 0xff,
```

FIG. 8h

```
0x51, 0xc4, 0xa5, 0x4b, 0x75, 0x94, 0x50, 0x39, 0x64, 0x8e, 0x52, 0x86,
0x24, 0x98, 0x33, 0xef, 0xab, 0xbf, 0xe5, 0x04, 0xda, 0x42, 0xc2, 0x95,
0xe5, 0x2e, 0xc7, 0x76, 0x20, 0x81, 0x55, 0x34, 0x81, 0xaa, 0x29, 0xe0,
0x5b, 0x98, 0x4c, 0x0c, 0x8b, 0xf8, 0x28, 0x82, 0x63, 0x43, 0x96, 0x1d,
0x46, 0x77, 0xfb, 0x2c, 0xdb, 0x7c, 0xc7, 0x44, 0xe4, 0xb4, 0xd2, 0x11,
0xf5, 0x76, 0x1d, 0x6a, 0xa9, 0xde, 0x1b, 0x62, 0x8b, 0x02, 0xdc, 0xbb,
0xf6, 0xaa, 0xda, 0xbd, 0x03, 0xcd, 0x76, 0xb4, 0x25, 0xef, 0x8c, 0xc4,
0x31, 0x8b, 0xa7, 0x37, 0x86, 0x9b, 0xbb, 0xf5, 0x05, 0x52, 0x96, 0x64,
0xc3, 0x07, 0xe1, 0xbd, 0x15, 0xe9, 0x51, 0x1d, 0xca, 0x3b, 0xdf, 0xb6,
0x9e, 0x49, 0x2a, 0x74, 0x5b, 0x0a, 0x8a, 0xc4, 0x1a, 0xe0, 0xb4, 0xd6,
0x1e, 0xfa, 0xbc, 0x04, 0xf0, 0x9a, 0x42, 0xcb, 0x35, 0xe2, 0x69, 0x2c,
0xfb, 0xbe, 0x1e, 0xe2, 0xbc, 0x0e, 0xee, 0xbd, 0x6e, 0xe2, 0x5d, 0x1c,
0x65, 0x80, 0x39, 0x53, 0xb6, 0x7b, 0x1d, 0x61, 0xa8, 0x56, 0xfe, 0x3e,
0xc0, 0xf1, 0x11, 0xd4, 0x44, 0xff, 0x7e, 0xae, 0x12, 0xd6, 0xb1, 0xe5,
0x19, 0x73, 0xb8, 0xda, 0xab, 0xff, 0x0a, 0x6c, 0xe6, 0x8b, 0x3f, 0x94,
0xbd, 0x36, 0xfd, 0x8b, 0x29, 0x62, 0x90, 0x49, 0x37, 0x9f, 0xe6, 0xbe,
0x78, 0x0c, 0x99, 0xc0, 0xeb, 0xb2, 0x45, 0x8e, 0x1b, 0x59, 0x80, 0x2f,
0x56, 0xfa, 0x18, 0xd3, 0x7f, 0x07, 0x4d, 0xe4, 0x5e, 0xf8, 0x1a, 0x68,
0xd0, 0x26, 0x6e, 0x45, 0x83, 0x34, 0xaa, 0x46, 0xb0, 0x7d, 0x23, 0x5d,
0x7e, 0xa2, 0x30, 0x8b, 0xf9, 0x55, 0x18, 0x67, 0xf5, 0x05, 0xd9, 0xa8,
0xbc, 0xdc, 0x45, 0xee, 0x95, 0x30, 0x64, 0x95, 0x51, 0x6a, 0x95, 0x49,
0x1c, 0x73, 0x55, 0x11, 0x77, 0x98, 0x02, 0xa1, 0x7f, 0x13, 0x5e, 0x80,
0x2a, 0x6a, 0x95, 0x36, 0x4d, 0xcc, 0xa3, 0xd6, 0x0c, 0xf8, 0xc9, 0xa0,
0xf3, 0x33, 0xe0, 0x09, 0xbd, 0x7e, 0x12, 0x65, 0xa4, 0x4c, 0x6e, 0xb7,
0x76, 0x02, 0x48, 0xcc, 0x6a, 0x25, 0x7b, 0x5b, 0xa9, 0x3d, 0x96, 0x4d,
0x21, 0x78, 0xc0, 0x93, 0xcb, 0x14, 0xd5, 0x73, 0x0e, 0x58, 0x6c, 0x1b,
0xd7, 0x02, 0xed, 0xaf, 0xd6, 0x8b, 0x2c, 0x57, 0xfc, 0xd0, 0x70, 0x4c,
0x22, 0x86, 0x6c, 0x35, 0xcd, 0x0e, 0xc0, 0xe3, 0x9a, 0xaa, 0x69, 0x3d,
0xa3, 0xd9, 0x37, 0xaa, 0x76, 0x0c, 0xa2, 0x48, 0xed, 0xb4, 0x14, 0xd9,
0x9b, 0xe9, 0xcc, 0x11, 0xfb, 0x40, 0xd6, 0xb4, 0xf7, 0x04, 0xc4, 0x66,
0xb2, 0x7b, 0xa8, 0x37, 0x96, 0x63, 0x8d, 0x53, 0x33, 0x92, 0x69, 0x11,
0x79, 0xf8, 0x06, 0xc6, 0xdc, 0x37, 0xe6, 0xa9, 0xc3, 0xdb, 0xaa, 0xe9,
0xbc, 0x20, 0xef, 0xcd, 0x41, 0xec, 0x99, 0xce, 0xf5, 0x45, 0xc5, 0xe7,
0x02, 0x85, 0x3e, 0x76, 0x4b, 0x28, 0x75, 0x5c, 0x19, 0x89, 0xc9, 0x76,
0xed, 0x26, 0xd9, 0x8e, 0xcf, 0x29, 0x89, 0xe4, 0x2d, 0xbf, 0x92, 0xe7,
0x3a, 0xbe, 0xfa, 0x37, 0xc3, 0x64, 0xf2, 0x02, 0xd4, 0x3b, 0xa8, 0x50,
0x33, 0x61, 0xb0, 0x21, 0xed, 0xa7, 0xdf, 0xa2, 0xbe, 0x6c, 0x23, 0x7b,
0x60, 0x09, 0xc6, 0x41, 0x15, 0xad, 0x3c, 0xf2, 0xc9, 0x12, 0xf8, 0xa6,
0xdd, 0x6c, 0x3b, 0x75, 0x24, 0x4a, 0xc5, 0xf3, 0x1f, 0x5f, 0x7c, 0xc0,
0x27, 0xdc, 0xb9, 0x76, 0x90, 0x33, 0x62, 0xae, 0x54, 0x22, 0x73, 0x56,
0x1f, 0x93, 0x6d, 0x4f, 0x2b, 0x71, 0xe3, 0x3d, 0xd3, 0x08, 0xea, 0xc5,
0x22, 0xe6, 0xc9, 0x14, 0xff, 0xd0, 0x25, 0xbe, 0xa7, 0x47, 0x8b, 0x28,
0x73, 0x89, 0x0d, 0x5e, 0x7f, 0x29, 0x60, 0x80, 0x3a, 0x50, 0x7c, 0x34,
0x68, 0xbd, 0x4f, 0x07, 0xa5, 0x73, 0x1a, 0x67, 0xa0, 0x17, 0xed, 0xbf,
0xa8, 0xdb, 0xb7, 0x0f, 0x9a, 0x47, 0x59, 0x93, 0x37, 0x4b, 0xb8, 0x5d,
0x07, 0xfa, 0x9f, 0x1b, 0x50, 0xf5, 0x64, 0x1e, 0xa0, 0x71, 0x07, 0x7f,
0xe1, 0x15, 0xcb, 0x7c, 0xaf, 0x63, 0xf6, 0x28, 0xd9, 0x7d, 0xf8, 0x54,
0xca, 0x2f, 0x4d, 0x7d, 0x3e, 0x9b, 0xca, 0xff, 0x1a, 0xb2, 0xea, 0x86,
0x53, 0x2d, 0x8d, 0x63, 0x95, 0x50, 0x2b, 0x78, 0x47, 0x9f, 0xfd, 0x14,
0xeb, 0x8d, 0x0c, 0x77, 0x96, 0xb6, 0xff, 0x12, 0x56, 0x6c, 0x3e, 0xf6,
0x03, 0xd4, 0x88, 0xfe, 0x0b, 0xc0, 0xef, 0xa9, 0xc5, 0xe5, 0x0d, 0xac,
0xcd, 0x49, 0x9a, 0x51, 0x26, 0x8e, 0x6c, 0x42, 0x76, 0xaf, 0x2f, 0x4a,
0x85, 0x61, 0x98, 0x39, 0xd7, 0x5f, 0xe5, 0xbd, 0x16, 0xfe, 0xae, 0xd4,
0x40, 0xf5, 0x08, 0xcd, 0xfc, 0xa8, 0xc4, 0xdd, 0x18, 0xa4, 0x3a, 0x82,
```

FIG. 8i

```
0xc0, 0x31, 0xdc, 0xb5, 0xfa, 0x5c, 0x94, 0x22, 0x63, 0x90, 0x37, 0xeb,
0xcd, 0xb0, 0xf7, 0x1e, 0xd4, 0x86, 0xf4, 0x2e, 0xaa, 0x45, 0x6a, 0xcc,
0x8c, 0xb1, 0x0e, 0x8a, 0xf1, 0x43, 0xda, 0x97, 0x2e, 0xa5, 0x45, 0x58,
0xea, 0x80, 0x10, 0x95, 0xba, 0x05, 0x9c, 0x3f, 0x84, 0x6c, 0x08, 0xd1,
0xeb, 0x33, 0x56, 0x90, 0x4f, 0x39, 0x67, 0x99, 0xf4, 0xb8, 0xd7, 0x07,
0xe1, 0xaa, 0xc4, 0xe6, 0x05, 0x8d, 0xc8, 0x50, 0xae, 0x64, 0xd2, 0x3a,
0xe0, 0x4e, 0x34, 0x9b, 0xec, 0xcb, 0x92, 0x2b, 0x64, 0xb6, 0x4b, 0x38,
0x67, 0x90, 0x31, 0x83, 0x60, 0x2e, 0x76, 0x8f, 0xec, 0x1a, 0xbd, 0xf6,
0xab, 0xd6, 0x15, 0xfc, 0x90, 0x0c, 0x6f, 0xef, 0xc2, 0x03, 0xea, 0x52,
0x1f, 0x7a, 0x95, 0x3f, 0x68, 0x92, 0x47, 0x22, 0x77, 0xb4, 0x4d, 0x1b,
0x77, 0x56, 0x0d, 0x8f, 0x72, 0xe9, 0xd0, 0x26, 0xfe, 0x61, 0x84, 0x4a,
0x28, 0x70, 0xd9, 0xca, 0x06, 0xfd, 0x56, 0x81, 0x40, 0x6b, 0x02, 0x60,
0xb2, 0x65, 0x1a, 0x90, 0x78, 0xc1, 0x10, 0xe0, 0x5c, 0x40, 0xdb, 0x33,
0xc8, 0x60, 0xb2, 0x1b, 0x69, 0xfd, 0x84, 0x2b, 0xb8, 0x1b, 0xdf, 0x58,
0x6d, 0xe7, 0x1a, 0xc2, 0xe3, 0xb3, 0x94, 0x18, 0x62, 0x87, 0x0c, 0xd9,
0xa1, 0xe0, 0x20, 0xcc, 0x60, 0x73, 0x1f, 0x85, 0x34, 0x7b, 0x62, 0x19,
0xa4, 0x69, 0x2d, 0x78, 0xd6, 0x29, 0xb4, 0x56, 0xa7, 0x02, 0xd6, 0x88,
0x47, 0xb1, 0x1e, 0xdd, 0xa1, 0xe7, 0x1c, 0xca, 0xe4, 0xb2, 0x4a, 0x02,
0xdd, 0xb5, 0xff, 0x37, 0x5a, 0x75, 0x0b, 0x62, 0x7e, 0x34, 0x56, 0xbf,
0x4e, 0xdd, 0xb6, 0x98, 0x1d, 0xa6, 0xcb, 0x72, 0xf6, 0x0b, 0xc6, 0xf0,
0x32, 0xd2, 0xb8, 0xe8, 0x12, 0xd7, 0x8d, 0xc1, 0xa0, 0x29, 0xb4, 0xf3,
0x30, 0x54, 0x8a, 0x6f, 0x11, 0xa0, 0xce, 0x0a, 0xac, 0x37, 0x90, 0x44,
0x50, 0x94, 0x1f, 0xa2, 0xe3, 0x2a, 0xc3, 0x8f, 0xe9, 0x0e, 0xca, 0xdb,
0x3d, 0xed, 0x80, 0xb5, 0x25, 0x85, 0xac, 0x5a, 0x13, 0x80, 0xd1, 0x4c,
0x9d, 0xbb, 0x0b, 0xdb, 0x38, 0x70, 0x43, 0xa4, 0x8d, 0x37, 0x4c, 0x8e,
0x57, 0x2b, 0xfa, 0xa8, 0xc5, 0xf1, 0xaf, 0x2e, 0x79, 0xbb, 0x4b, 0x03,
0x32, 0x9c, 0xef, 0x43, 0xce, 0xff, 0x3a, 0xbd, 0xf1, 0x44, 0xda, 0x93,
0x07, 0x71, 0xdc, 0x1a, 0xf2, 0x66, 0x23, 0xa5, 0x71, 0x09, 0x66, 0x8a,
0x50, 0x0e, 0x7f, 0x5e, 0x26, 0x81, 0xf9, 0xa5, 0x3e, 0x6a, 0x13, 0x9c,
0xd8, 0xb2, 0xe2, 0x1d, 0xc8, 0xee, 0x72, 0xa4, 0x29, 0x85, 0x3e, 0x56,
0x6c, 0x33, 0x87, 0x43, 0xa4, 0x58, 0x1b, 0x93, 0x78, 0x02, 0x5d, 0x86,
0x9d, 0x34, 0x63, 0xea, 0x39, 0xdc, 0x6c, 0x45, 0x93, 0x04, 0xa5, 0xe3,
0x4c, 0x39, 0xf0, 0x8e, 0xc2, 0xe1, 0x14, 0xf2, 0xac, 0xc2, 0xde, 0x0c,
0xbc, 0x7a, 0xfb, 0x4b, 0x30, 0x71, 0x47, 0x95, 0x68, 0x1f, 0x9c, 0x43,
0xf9, 0x06, 0xe3, 0x7a, 0xbc, 0x28, 0xe9, 0x70, 0x39, 0xe5, 0x5c, 0xa8,
0x90, 0xf1, 0xc1, 0x0c, 0xff, 0xcb, 0xb5, 0xf3, 0x0d, 0x81, 0x3c, 0x6d,
0x4d, 0x24, 0x73, 0x54, 0x11, 0xf9, 0x8c, 0xad, 0xe4, 0x16, 0xc3, 0x5d,
0xaf, 0x0f, 0x5a, 0x80, 0x23, 0x6e, 0xb4, 0x3a, 0xe9, 0x8e, 0x42, 0x77,
0xc0, 0x95, 0xc7, 0xde, 0x31, 0xfc, 0xb9, 0xd3, 0x2e, 0xf8, 0xc2, 0xa7,
0xd7, 0x12, 0x57, 0x92, 0xcc, 0x24, 0xc2, 0x7c, 0x49, 0x2f, 0x80, 0x5a,
0x3e, 0x9f, 0x02, 0xe2, 0xc9, 0x19, 0xe9, 0xce, 0x9e, 0xfa, 0x12, 0xe0,
0xbf, 0x85, 0xe3, 0x43, 0xd5, 0xa0, 0xf9, 0x2b, 0x51, 0xf1, 0x83, 0x05,
0x57, 0x89, 0x16, 0xd3, 0xb9, 0xf7, 0x1f, 0xc8, 0x8c, 0xaa, 0x6c, 0x25,
0x55, 0x85, 0x67, 0x2d, 0x62, 0x78, 0x39, 0x4a, 0x97, 0x61, 0x16, 0x9d,
0xdd, 0xbd, 0xa9, 0xff, 0x04, 0xc7, 0x30, 0x6e, 0xa9, 0x61, 0xc6, 0x39,
0xfc, 0x56, 0x03, 0xa5, 0x8d, 0x17, 0x79, 0xc4, 0x50, 0x27, 0x8a, 0x54,
0x1d, 0x5e, 0x71, 0x23, 0xa3, 0xdf, 0xb8, 0xd8, 0x04, 0x98, 0xbb, 0xe6,
0xb5, 0x36, 0x5b, 0xd1, 0x6d, 0x4b, 0x96, 0x74, 0x25, 0x8e, 0xa8, 0xe3,
0xca, 0x0e, 0xf8, 0x61, 0xc2, 0x15, 0xfe, 0xa5, 0x4f, 0x3c, 0x62, 0x13,
0x4c, 0x90, 0x5d, 0x15, 0x64, 0x7a, 0x39, 0x4e, 0x94, 0xb9, 0x21, 0xeb,
0x73, 0x4f, 0xa6, 0xf2, 0x05, 0xd4, 0x9f, 0xfb, 0xba, 0x25, 0x68, 0x91,
0x37, 0x5c, 0x7f, 0x08, 0x4b, 0xb2, 0x62, 0x27, 0x6a, 0x3a, 0xa5, 0x71,
0x23, 0x47, 0xbb, 0x6f, 0xb1, 0xc9, 0x20, 0xd5, 0xb6, 0xfa, 0xa8, 0x81,
0x3b, 0x5b, 0x74, 0x2e, 0x59, 0xd0, 0x18, 0xdd, 0x40, 0xfc, 0xb5, 0xd3,
```

FIG. 8j

```
0x0f, 0xe8, 0xa8, 0xc8, 0xf1, 0x33, 0xd4, 0x58, 0x78, 0x23, 0x69, 0x35,
0x72, 0x8e, 0xf1, 0x53, 0xd7, 0x80, 0x18, 0x49, 0x9c, 0x83, 0xc4, 0xf3,
0x2d, 0xd4, 0x42, 0xf9, 0x05, 0xd7, 0x6f, 0xce, 0xa4, 0x34, 0x96, 0xce,
0x45, 0x5d, 0x90, 0x1f, 0xac, 0xf5, 0x68, 0x3d, 0x7b, 0x9d, 0x1d, 0x83,
0xaf, 0xfb, 0x0a, 0xda, 0xba, 0xed, 0x48, 0x2d, 0x78, 0x9b, 0x1b, 0x82,
0x9e, 0x54, 0x2f, 0xcd, 0x0b, 0xe4, 0x9f, 0xf4, 0xb1, 0xd2, 0x35, 0xef,
0xbf, 0xa8, 0xdb, 0x06, 0xf3, 0x45, 0x79, 0xb3, 0x0a, 0xd1, 0x92, 0x2a,
0x6e, 0xb8, 0x4c, 0x11, 0x7b, 0xe9, 0x41, 0xc0, 0xfe, 0xa8, 0xbc, 0xf2,
0x2f, 0xda, 0x8a, 0xd4, 0x05, 0xff, 0xcb, 0x10, 0xe8, 0x8d, 0xda, 0x0c,
0x97, 0x3b, 0x5d, 0x8f, 0x4a, 0x2f, 0x61, 0x0b, 0xd9, 0xa9, 0xe6, 0xc0,
0x08, 0xf9, 0x80, 0xbe, 0x93, 0x03, 0x4a, 0x8d, 0x53, 0x2a, 0x7e, 0x59,
0x1d, 0x67, 0xb5, 0x09, 0xcd, 0xf3, 0x12, 0xbf, 0xe3, 0x48, 0xb0, 0x0c,
0xc2, 0x28, 0xed, 0xb5, 0xd5, 0x20, 0x5d, 0x44, 0x6e, 0xb8, 0x5e, 0x22,
0x80, 0xb4, 0x30, 0xee, 0x7f, 0xda, 0x02, 0xef, 0x83, 0x13, 0xfd, 0x57,
0x81, 0x47, 0x14, 0xa9, 0xdb, 0x08, 0xee, 0x3e, 0x29, 0xcd, 0x54, 0x37,
0x62, 0x83, 0x02, 0xbe, 0x61, 0xde, 0x4a, 0x28, 0xd2, 0xb8, 0x87, 0x38,
0x78, 0xb9, 0x2d, 0x85, 0x59, 0x05, 0x67, 0x92, 0x49, 0x22, 0x7f, 0x63,
0x2d, 0x9a, 0xe0, 0x37, 0x69, 0xf7, 0x1a, 0x58, 0xe3, 0x8e, 0x22, 0x96,
0xac, 0x54, 0x89, 0x0e, 0x70, 0x4d, 0x16, 0x74, 0x93, 0x1f, 0x4f, 0xb6,
0x7a, 0x98, 0x2c, 0x5b, 0xb0, 0x64, 0x34, 0x86, 0x18, 0xfd, 0xa3, 0xe1,
0x1c, 0xca, 0xec, 0xb0, 0x8f, 0x19, 0x4b, 0x9d, 0x70, 0x3d, 0x9d, 0x32,
0x6f, 0xd5, 0x21, 0xed, 0xa0, 0xbe, 0xff, 0x05, 0xd6, 0x8a, 0xee, 0x9d,
0x2f, 0x91, 0x47, 0x7d, 0x9a, 0x24, 0xda, 0x76, 0x39, 0x61, 0x87, 0x57,
0x0e, 0x97, 0xda, 0xac, 0x0a, 0x98, 0xd9, 0xaa, 0xe9, 0x40, 0x9a, 0x12,
0x49, 0xb9, 0x6d, 0xae, 0x2b, 0xa0, 0xc6, 0x31, 0xe4, 0xb6, 0xd4, 0x2a,
0x90, 0x48, 0xc9, 0x9a, 0x5d, 0x86, 0x99, 0xf1, 0x17, 0xd4, 0xa6, 0xfa,
0x3a, 0xc4, 0xa6, 0xf3, 0x6d, 0x04, 0xe7, 0xac, 0xf6, 0x1b, 0x69, 0xd7,
0x25, 0xed, 0xba, 0xdc, 0x0f, 0xcd, 0xff, 0xac, 0xc4, 0x5a, 0x16, 0xac,
0x83, 0x41, 0xa0, 0x86, 0xcb, 0x34, 0xec, 0x64, 0xcb, 0x2d, 0xe0, 0xa4,
0xc8, 0x2b, 0xd7, 0x5d, 0xe4, 0xc2, 0x35, 0xee, 0x56, 0x40, 0xc3, 0x85,
0xf7, 0x1e, 0xc7, 0xec, 0x48, 0xba, 0x72, 0x09, 0x7f, 0x94, 0x4d, 0x39,
0x76, 0xff, 0x29, 0x8a, 0xd2, 0x55, 0x14, 0xee, 0x59, 0xad, 0x7b, 0xc7,
0x13, 0x5d, 0x40, 0xa0, 0xb1, 0x3c, 0x49, 0x82, 0x5f, 0xac, 0xe8, 0xcb,
0x3d, 0x6b, 0x17, 0x93, 0xfd, 0xbb, 0x9d, 0x2d, 0xf4, 0x77, 0x3c, 0x7e,
0xff, 0x2f, 0x87, 0x4e, 0x0f, 0x72, 0x61, 0xc5, 0x25, 0xfb, 0x56, 0x35,
0xe8, 0x6b, 0x44, 0x8f, 0x0d, 0x94, 0x45, 0x6c, 0xff, 0xb2, 0x81, 0x12,
0xd2, 0xb4, 0x22, 0x71, 0xa2, 0x51, 0x32, 0x6c, 0x86, 0x0a, 0x59, 0x85,
0x45, 0x96, 0x20, 0x59, 0x47, 0x8d, 0xa4, 0x41, 0x9d, 0x87, 0x51, 0x29,
0x63, 0x93, 0x51, 0x1c, 0x75, 0xec, 0x8d, 0xd0, 0x26, 0xc7, 0xe6, 0x4f,
0x10, 0x67, 0xbe, 0x07, 0xf5, 0x78, 0x18, 0x5d, 0xf4, 0x7d, 0x41, 0x95,
0x80, 0x0b, 0x64, 0xac, 0x14, 0xe6, 0xa5, 0x09, 0x4f, 0x77, 0x40, 0x9a,
0x82, 0xd9, 0x33, 0x54, 0xf6, 0xc0, 0x25, 0xe2, 0x5e, 0xcd, 0xb2, 0x11,
0xf2, 0x98, 0xb2, 0xca, 0x26, 0xe4, 0x63, 0x3b, 0x89, 0xdf, 0x6f, 0x26,
0x78, 0xe5, 0x10, 0xc8, 0xfc, 0x1c, 0x6f, 0x07, 0xaa, 0xec, 0xce, 0xaa,
0x4d, 0x02, 0xe4, 0xaf, 0x47, 0xba, 0xe5, 0x16, 0xc5, 0x56, 0xed, 0x1e,
0xd2, 0xb9, 0xf6, 0x77, 0x8a, 0xa2, 0x15, 0x79, 0xd0, 0x08, 0xde, 0xb9,
0x69, 0x35, 0xe8, 0x83, 0x1b, 0x54, 0x37, 0xf5, 0x4d, 0x05, 0xe5, 0x3c,
0xc4, 0x8c, 0xe1, 0x1f, 0xa0, 0xed, 0x18, 0xb1, 0xd1, 0x3c, 0xbe, 0x9c,
0xdc, 0xc5, 0x08, 0xfb, 0x6a, 0x17, 0xaf, 0x9c, 0xee, 0xbf, 0x30, 0xde,
0xa2, 0x0a, 0x4d, 0xfc, 0x5a, 0x03, 0xb4, 0x3c, 0xfd, 0xa4, 0x8c, 0x4c,
0x38, 0x9b, 0xd5, 0x45, 0x96, 0x04, 0xeb, 0xbd, 0x1b, 0xfd, 0xce, 0x98,
0x7d, 0x24, 0x70, 0xdd, 0xc0, 0xa8, 0xe5, 0x03, 0x64, 0x2a, 0x92, 0xb3,
0x75, 0x13, 0x63, 0xa3, 0x02, 0x84, 0x40, 0x6e, 0x4d, 0x2c, 0x62, 0x87,
0x49, 0x0d, 0x90, 0xf8, 0x33, 0xc1, 0x95, 0xf6, 0x18, 0xbf, 0x95, 0x53,
```

FIG. 8k

```
0x2a, 0x8d, 0xdb, 0x4f, 0x27, 0x77, 0x56, 0x32, 0x85, 0x6a, 0x1a, 0x89,
0x6d, 0x93, 0x26, 0x5f, 0x98, 0x3f, 0xa3, 0x7f, 0x5b, 0x37, 0x96, 0x07,
0xe1, 0x3d, 0xcb, 0x95, 0xb3, 0x52, 0x75, 0x26, 0xf4, 0x8b, 0xc2, 0x02,
0xcf, 0xe2, 0x87, 0x9f, 0x27, 0x83, 0xaa, 0x59, 0xfe, 0x0d, 0x76, 0xb8,
0x42, 0xcd, 0x98, 0x27, 0xfd, 0x71, 0xe2, 0x11, 0x81, 0x3d, 0x70, 0xcd,
0x35, 0xe8, 0xd2, 0x44, 0x83, 0x02, 0x8d, 0x43, 0xb9, 0x82, 0x3a, 0xa0,
0x74, 0x96, 0x2c, 0x76, 0x5d, 0x23, 0xca, 0xdf, 0xb0, 0x20, 0x7f, 0xb9,
0x36, 0xaa, 0x6f, 0x3a, 0x55, 0x78, 0x2e, 0x4d, 0xf4, 0xc8, 0x3a, 0x97,
0x2f, 0x62, 0x1b, 0xb3, 0xf5, 0xc6, 0x15, 0xdc, 0x43, 0xea, 0xca, 0x8e,
0xbd, 0x22, 0xe9, 0xa2, 0xbf, 0xde, 0x06, 0xf4, 0xb7, 0xd3, 0x1a, 0xb5,
0x77, 0x08, 0x4e, 0xd0, 0x56, 0x34, 0x71, 0xdf, 0xbc, 0x3b, 0xc4, 0xa2,
0xf2, 0xc1, 0x10, 0xf6, 0xb4, 0xcb, 0xdb, 0x38, 0xf8, 0x07, 0xcf, 0xb1,
0x83, 0xcc, 0x02, 0xe3, 0xb1, 0xdb, 0x1f, 0x4e, 0xb3, 0x5d, 0xea, 0x48,
0x20, 0xf8, 0xa8, 0x92, 0x17, 0x50, 0xac, 0x5e, 0x9a, 0x2e, 0x5f, 0xb8,
0xd1, 0x44, 0xc8, 0x6d, 0x1a, 0x9d, 0x56, 0xf4, 0x70, 0x37, 0x61, 0x79,
0x0c, 0x59, 0xa4, 0x50, 0x2b, 0xec, 0x9d, 0x23, 0x97, 0x77, 0x0d, 0x6d,
0x3c, 0xcf, 0xfa, 0x6a, 0x17, 0xe7, 0xcf, 0xae, 0x1f, 0xbb, 0xf3, 0xa2,
0xda, 0x84, 0x16, 0x70, 0x58, 0xff, 0x0c, 0xd9, 0x5e, 0xc9, 0x23, 0xe1,
0xc3, 0xaa, 0xdc, 0x02, 0x6b, 0xa5, 0x55, 0x11, 0xfc, 0xd1, 0x88, 0x37,
0x4d, 0x9b, 0x5d, 0x36, 0x9d, 0x83, 0x2f, 0x4b, 0xf8, 0x5d, 0xce, 0x0d,
0x59, 0x73, 0x93, 0x3c, 0x66, 0x9a, 0x58, 0xd7, 0x44, 0xf0, 0x2f, 0xa7,
0x7d, 0xee, 0x8f, 0x02, 0x61, 0x74, 0x13, 0x5c, 0x88, 0x38, 0x9b, 0x7e,
0x24, 0x4a, 0x9b, 0x59, 0x2a, 0x78, 0xe8, 0x4d, 0x21, 0xf7, 0x68, 0x29,
0x7b, 0x42, 0xa1, 0xd5, 0x97, 0x2c, 0x83, 0x0e, 0x8b, 0x61, 0x34, 0xc9,
0xda, 0x39, 0xeb, 0x76, 0x43, 0xae, 0x0c, 0xe8, 0x69, 0x8f, 0xef, 0x2e,
0xbe, 0xde, 0x47, 0xaf, 0x05, 0xdb, 0xad, 0xe9, 0xbc, 0x31, 0xca, 0xf8,
0x89, 0xb4, 0x15, 0x68, 0xb7, 0x4f, 0xc2, 0xf2, 0xad, 0x26, 0x48, 0xb0,
0x87, 0x2f, 0x56, 0x0f, 0xe4, 0x51, 0x69, 0x0b, 0xc2, 0x42, 0xf0, 0x9b,
0x3d, 0x8f, 0x64, 0x29, 0x8e, 0xf7, 0x83, 0x0e, 0x91, 0x62, 0x45, 0xb4,
0x20, 0xdf, 0x77, 0xa2, 0x43, 0x55, 0xa2, 0xe3, 0x0d, 0xd6, 0x7a, 0xff,
0x07, 0x5f, 0xd1, 0x10, 0x9a, 0x76, 0x39, 0x87, 0xfa, 0x32, 0xc6, 0xdb,
0x28, 0xfe, 0x74, 0x24, 0x81, 0xb1, 0x72, 0xca, 0x0d, 0xbc, 0x3e, 0xd0,
0xf7, 0x99, 0xe2, 0x20, 0xbc, 0x53, 0xdc, 0x40, 0xe7, 0x0b, 0xbc, 0x81,
0xc7, 0x61, 0xa0, 0x12, 0x89, 0xae, 0x47, 0xbe, 0x15, 0xfe, 0x5b, 0x75,
0x19, 0xfa, 0xc5, 0xab, 0xed, 0xd0, 0x81, 0x06, 0x6d, 0x9f, 0xbf, 0x1d,
0xfb, 0xc7, 0x8b, 0x19, 0x3c, 0xac, 0x08, 0x4f, 0x7c, 0x96, 0x26, 0xd4,
0x7e, 0x20, 0x4f, 0x7f, 0x42, 0x72, 0x8d, 0x02, 0x5d, 0xd9, 0x46, 0xcf,
0xfe, 0x2e, 0x9d, 0x5d, 0x1d, 0x72, 0xe1, 0x9c, 0x3c, 0xf6, 0x9b, 0x75,
0x8e, 0x3f, 0xaa, 0x8b, 0x2e, 0x56, 0xb3, 0x02, 0xe3, 0xc2, 0xaa, 0xe7,
0x14, 0x46, 0xac, 0x52, 0xf0, 0x17, 0x87, 0xfa, 0x7d, 0xc6, 0x30, 0xed,
0xc2, 0x22, 0xae, 0x60, 0x0x72, 0xba, 0x27, 0xac, 0xc0, 0x97, 0xf1, 0xaf,
0x28, 0xc5, 0xe1, 0xb1, 0x1d, 0x9c, 0x7e, 0x15, 0x54, 0xaf, 0x02, 0xc8,
0xe3, 0x54, 0x1f, 0xe8, 0x69, 0x26, 0x57, 0xa2, 0x23, 0x4b, 0xcb, 0x78,
0xfd, 0x05, 0xce, 0x66, 0xab, 0x7a, 0xff, 0x15, 0xde, 0x41, 0xbf, 0xf0,
0x3b, 0xd5, 0x94, 0xe8, 0x6e, 0xc4, 0x0c, 0xe5, 0xb9, 0x3b, 0x54, 0x6f,
0x27, 0x4a, 0xac, 0xfe, 0x41, 0x89, 0x0f, 0x6c, 0x2c, 0x57, 0x75, 0xf6,
0x84, 0x2a, 0xcb, 0x9d, 0xf8, 0x10, 0x69, 0x3e, 0x9a, 0xfc, 0xc2, 0x14,
0xd0, 0xf1, 0x21, 0xbe, 0x39, 0x9f, 0x7b, 0x97, 0x06, 0x81, 0xdf, 0x11,
0xca, 0x88, 0xb9, 0x09, 0x6e, 0xbb, 0x24, 0xd8, 0xb7, 0xef, 0x15, 0xc9,
0xf9, 0x81, 0xd6, 0x64, 0x2b, 0x51, 0x7e, 0x38, 0x69, 0x94, 0xdf, 0x31,
0xcb, 0xb7, 0x29, 0xa9, 0x52, 0x0f, 0x5e, 0x80, 0x06, 0x70, 0xf7, 0x16,
0x96, 0xe9, 0x48, 0x18, 0x75, 0x54, 0x39, 0x74, 0x5e, 0x19, 0x4f, 0x90,
0x5e, 0x45, 0xf0, 0xbf, 0x9d, 0xd1, 0x4a, 0x3d, 0x7d, 0x12, 0xa1, 0x8e,
0x47, 0xff, 0x7f, 0xbe, 0x6f, 0x0a, 0xa0, 0x41, 0x5d, 0x9d, 0x1d, 0x8b,
```

FIG. 8I

```
0xc6, 0x59, 0x30, 0x4e, 0x99, 0x71, 0x23, 0x7a, 0x5a, 0x0a, 0x7a, 0x32,
0x48, 0x9d, 0x7c, 0x29, 0x66, 0x86, 0x03, 0xe0, 0xc1, 0x13, 0x99, 0x58,
0xb9, 0x30, 0xef, 0xcb, 0xa9, 0xdf, 0x42, 0xb6, 0x13, 0x54, 0xe3, 0x62,
0x37, 0xb6, 0xa3, 0xee, 0x30, 0x5a, 0x92, 0x65, 0x2d, 0x93, 0x6c, 0xa6,
0xe9, 0x12, 0xde, 0x35, 0x60, 0xa5, 0x49, 0x90, 0xf8, 0x52, 0x29, 0xeb,
0x5b, 0xd4, 0x4c, 0x04, 0x61, 0x28, 0x6f, 0x92, 0x48, 0x1e, 0xa9, 0x8d,
0xca, 0x1a, 0xf9, 0xba, 0xd7, 0xb3, 0x05, 0x5c, 0x78, 0x41, 0x6e, 0xe9,
0x36, 0xbc, 0xe4, 0xa9, 0xd5, 0x3b, 0xba, 0x4d, 0x2c, 0xb3, 0x85, 0xcf,
0xeb, 0x20, 0xc3, 0xe2, 0xaa, 0xfd, 0x04, 0xcf, 0xe4, 0xaf, 0x09, 0x5b,
0x30, 0x71, 0xec, 0xa7, 0xbd, 0xf9, 0x36, 0xd5, 0xa6, 0xc8, 0x11, 0xe6,
0x90, 0xf4, 0x2f, 0xbc, 0x7f, 0xeb, 0x4b, 0x34, 0xf3, 0x1b, 0xd3, 0xaf,
0xee, 0x04, 0xd8, 0x9a, 0xbd, 0xfc, 0x1b, 0xd2, 0xb2, 0xf3, 0x3c, 0xd9,
0xad, 0xf0, 0xb2, 0x95, 0x40, 0x78, 0xdd, 0x21, 0xe6, 0x66, 0x91, 0x46,
0x7f, 0x04, 0x6e, 0xcf, 0xa0, 0x8b, 0xa7, 0x1e, 0x86, 0xe8, 0x47, 0x84,
0xb8, 0x08, 0xda, 0xb1, 0xe3, 0x0d, 0xcc, 0x47, 0x85, 0x5b, 0x1f, 0xb4,
0xf5, 0xd0, 0x2b, 0xac, 0x6f, 0x36, 0xa4, 0x8d, 0x15, 0xaa, 0x97, 0xff,
0x9d, 0xd3, 0x37, 0xe8, 0xb0, 0xdb, 0x10, 0x46, 0xee, 0x6e, 0x09, 0x76,
0x57, 0x26, 0x87, 0xfb, 0x94, 0xda, 0x08, 0xcf, 0x7f, 0x98, 0x48, 0x26,
0x61, 0x78, 0xdc, 0xa1, 0xf2, 0x02, 0x5e, 0xa6, 0x40, 0x98, 0x0a, 0x84,
0x42, 0x63, 0x7c, 0x2e, 0x75, 0x3d, 0x7d, 0xde, 0x96, 0x18, 0x87, 0x56,
0x26, 0x73, 0x5a, 0x06, 0x6f, 0x41, 0x69, 0x36, 0x51, 0xce, 0x5f, 0xde,
0x0f, 0xc4, 0xa5, 0x71, 0x09, 0x90, 0x76, 0x61, 0x26, 0x6a, 0xad, 0x51,
0x2e, 0x91, 0x72, 0x42, 0x7f, 0x05, 0x55, 0x90, 0x12, 0x4b, 0x6c, 0x31,
0xf6, 0x5e, 0xcc, 0x87, 0x09, 0xb1, 0xd7, 0x17, 0xf9, 0xbc, 0x2f, 0xea,
0x74, 0xff, 0x3c, 0xdb, 0x02, 0xc6, 0x67, 0x16, 0xcf, 0x8b, 0x1d, 0x4d,
0x86, 0x63, 0xff, 0x28, 0x98, 0xf0, 0x77, 0x45, 0x7f, 0x1b, 0x58, 0xe7,
0x04, 0xdc, 0xc8, 0x40, 0xf3, 0x69, 0x32, 0x74, 0x47, 0xb3, 0x5b, 0x08,
0x78, 0x3c, 0x91, 0xb5, 0x84, 0x35, 0xa4, 0x44, 0x98, 0xec, 0x3e, 0xbd,
0x22, 0xa9, 0x61, 0x1d, 0x59, 0xf2, 0x15, 0xc6, 0xff, 0x97, 0x1e, 0x57,
0x7b, 0x99, 0x2f, 0xfb, 0x76, 0xdd, 0x52, 0x2a, 0xb8, 0xd7, 0x9b, 0xc0,
0x1f, 0xf7, 0xa2, 0xc1, 0x44, 0xfc, 0xcc, 0x0b, 0xe0, 0xc3, 0x9b, 0xf3,
0x22, 0xe2, 0xc2, 0xaa, 0x1a, 0x9a, 0x7c, 0x23, 0x68, 0x37, 0x8f, 0xe0,
0xb7, 0xd7, 0x3b, 0xe6, 0xc3, 0x41, 0xf9, 0x17, 0xdd, 0xc9, 0x5f, 0xee,
0x26, 0xd6, 0xc0, 0x70, 0xcc, 0x23, 0xdf, 0x94, 0x0c, 0x70, 0xa0, 0x3a,
0x4d, 0x7c, 0x28, 0x6d, 0x95, 0x48, 0x68, 0x21, 0x0a, 0x4c, 0x68, 0x99,
0x77, 0x2c, 0x91, 0xe2, 0x6d, 0x43, 0xf6, 0x33, 0xc1, 0x9a, 0x39, 0xaf,
0x07, 0xc3, 0xa6, 0xd8, 0x0c, 0xc4, 0x8e, 0xb5, 0x7b, 0x19, 0x5a, 0x78,
0xc2, 0x1f, 0xe1, 0xc4, 0x11, 0xed, 0x8c, 0xd2, 0x23, 0xfc, 0x63, 0xd3,
0x20, 0xe6, 0xb7, 0xdc, 0x1d, 0xc8, 0x74, 0x12, 0x4c, 0xe3, 0x80, 0xbc,
0x3f, 0xd2, 0x76, 0xb0, 0x4e, 0x0c, 0xcb, 0x41, 0xb6, 0xd1, 0x4d, 0x13,
0x63, 0xcb, 0xa5, 0xed, 0x91, 0x0e, 0x4c, 0xe8, 0x5e, 0x10, 0x53, 0x27,
0x6c, 0x9f, 0x39, 0xac, 0x93, 0x3e, 0x4a, 0xb8, 0x7c, 0x9d, 0x29, 0x76,
0xc8, 0x03, 0xf0, 0xad, 0xcc, 0xfb, 0x16, 0x54, 0x6b, 0x44, 0xaa, 0x10,
0x97, 0x7c, 0xbf, 0x75, 0x3f, 0xa6, 0x0e, 0xb7, 0x46, 0xa0, 0x87, 0x2f,
0xff, 0x80, 0xbc, 0x43, 0xcf, 0x19, 0xbd, 0xfd, 0xa8, 0xea, 0xc0, 0x3f,
0xce, 0xe4, 0xa5, 0xc7, 0x9b, 0xb8, 0xd1, 0x17, 0xb4, 0xfa, 0x37, 0xb0,
0x24, 0xa2, 0xca, 0x72, 0xe7, 0x16, 0x54, 0xdc, 0x6a, 0x24, 0x52, 0x32,
0x74, 0xf1, 0x4f, 0x39, 0xfd, 0xa7, 0xd7, 0xb2, 0x0b, 0x9c, 0x81, 0x43,
0x7d, 0x2c, 0x66, 0xae, 0x53, 0xba, 0x7e, 0x05, 0x4e, 0x8c, 0x5d, 0x10,
0x65, 0xa9, 0x57, 0xf3, 0x92, 0xc3, 0x2a, 0xfd, 0x7c, 0x03, 0x62, 0x9d,
0x32, 0x77, 0xeb, 0x6b, 0x16, 0xe5, 0x8c, 0xb1, 0x27, 0x82, 0x3b, 0x6b,
0x1a, 0xf6, 0x3b, 0xa9, 0x79, 0xd2, 0xb5, 0xee, 0x06, 0xc6, 0x5a, 0x1e,
0x7d, 0xea, 0x16, 0xda, 0x59, 0x0e, 0xf9, 0x59, 0xdd, 0x4d, 0x3c, 0x6e,
0x46, 0x94, 0x77, 0x2a, 0xf7, 0x8f, 0x21, 0x61, 0xf1, 0x4c, 0x08, 0xa1,
```

FIG. 8m

```
0xe9, 0x22, 0x84, 0xda, 0x57, 0xf7, 0x10, 0x4e, 0x9e, 0x56, 0x1d, 0x7b,
0xf2, 0x51, 0x2b, 0x7f, 0x5b, 0x15, 0x85, 0x68, 0x08, 0x82, 0x36, 0xf3,
0x6e, 0x2d, 0xec, 0x6c, 0x51, 0xd0, 0x6a, 0x0b, 0xee, 0x8a, 0x51, 0x03,
0x8b, 0xa9, 0x76, 0xb8, 0x40, 0xfa, 0x91, 0xe0, 0x62, 0xa3, 0x1d, 0x97,
0x44, 0x70, 0x4f, 0x30, 0x61, 0xd8, 0x37, 0xfa, 0xb7, 0xd4, 0x1b, 0xf3,
0x97, 0x31, 0xe2, 0xa9, 0xf4, 0xbd, 0x39, 0xff, 0x91, 0xd8, 0x2d, 0xcf,
0x5f, 0x0b, 0x6e, 0x38, 0xa2, 0xc4, 0xee, 0x1b, 0xdb, 0xba, 0xa3, 0x2a,
0x86, 0x38, 0x55, 0xf2, 0xc2, 0x05, 0xd2, 0xae, 0x50, 0xba, 0x80, 0xd4,
0x2c, 0x9b, 0x63, 0x41, 0x7e, 0xe2, 0x8c, 0xf2, 0x2b, 0xc9, 0x74, 0xac,
0x30, 0x87, 0xa6, 0x37, 0x90, 0xb0, 0x8a, 0xe3, 0x0b, 0xbc, 0xdd, 0xab,
0x02, 0xbb, 0xe3, 0xa0, 0xc7, 0x34, 0xd7, 0x5d, 0x8d, 0x53, 0x37, 0xa4,
0x72, 0x1e, 0xb5, 0xe0, 0xc6, 0x07, 0xeb, 0x61, 0xa8, 0x72, 0xc5, 0x02,
0xe0, 0xc8, 0x32, 0xf8, 0xa0, 0x19, 0x54, 0x89, 0x12, 0x49, 0xa0, 0x87,
0x22, 0xa5, 0x87, 0x46, 0xbb, 0x6d, 0x30, 0xf9, 0x5f, 0xd5, 0x20, 0xed,
0x7e, 0xcc, 0x17, 0xbc, 0x3c, 0xcc, 0xe4, 0x09, 0xc8, 0xe0, 0x13, 0xf6,
0x7e, 0xae, 0x52, 0x02, 0x63, 0x8e, 0x4e, 0x0c, 0x7a, 0x49, 0x15, 0x5b,
0x72, 0x2a, 0x7c, 0xc2, 0x46, 0x02, 0x7c, 0xb6, 0x36, 0xa8, 0xe6, 0xcc,
0x16, 0x8c, 0x44, 0x53, 0x8c, 0x5b, 0x06, 0xf4, 0xcf, 0xad, 0x0d, 0x70,
0x9d, 0x46, 0xff, 0x98, 0x33, 0xdd, 0x65, 0x02, 0x4f, 0xfe, 0x1c, 0xd8,
0xa1, 0x2f, 0x4c, 0xb5, 0x62, 0x03, 0x52, 0x94, 0xee, 0x43, 0xbf, 0xd8,
0x1f, 0xfc, 0x2c, 0xc3, 0x7c, 0x1b, 0x60, 0x86, 0x4c, 0x39, 0x7a, 0x55,
0x14, 0x67, 0x87, 0x20, 0xf4, 0xbb, 0xd4, 0x02, 0xe7, 0x8d, 0x5e, 0x3b,
0x83, 0x97, 0xcd, 0x33, 0xd8, 0x3e, 0xe8, 0x61, 0x26, 0xa0, 0x8c, 0xd2,
0x41, 0xc4, 0xa7, 0xdc, 0xa5, 0xfc, 0xc3, 0x07, 0xde, 0x3c, 0xf3, 0x9b,
0xd6, 0x19, 0xb7, 0xa5, 0x29, 0xbb, 0x4b, 0x0b, 0x57, 0xa8, 0x6d, 0x02,
0x96, 0x57, 0x85, 0x62, 0x26, 0xae, 0x7a, 0xc2, 0x25, 0xe6, 0x99, 0xd2,
0x23, 0xe9, 0xaa, 0xc7, 0xde, 0xa0, 0xc1, 0x3b, 0xcc, 0xdb, 0x19, 0xa8,
0x69, 0xef, 0x9c, 0x18, 0xf9, 0x8b, 0x43, 0x56, 0x71, 0x29, 0xd6, 0xac,
0xfb, 0x2e, 0x82, 0x42, 0x6b, 0x8f, 0xe9, 0x20, 0xda, 0x85, 0x6d, 0x10,
0x58, 0x9f, 0x25, 0xe6, 0xa7, 0x7c, 0x93, 0x12, 0x72, 0xc0, 0x0e, 0xd6,
0x9d, 0xff, 0xbd, 0x19, 0xcd, 0x6f, 0x08, 0x5b, 0x74, 0x12, 0x68, 0xa9,
0x45, 0xf5, 0x36, 0xc5, 0xef, 0xaf, 0xd8, 0x2f, 0xfe, 0xba, 0xe1, 0xb1,
0x11, 0x72, 0x9b, 0x50, 0x2a, 0xa5, 0xf0, 0xaf, 0x16, 0x47, 0x70, 0x9d,
0x0f, 0x90, 0xac, 0x85, 0xb7, 0x3e, 0x68, 0x1d, 0x75, 0xef, 0x6b, 0x27,
0x71, 0x57, 0x32, 0x81, 0xb9, 0x6e, 0x11, 0x54, 0x35, 0x82, 0xe5, 0x44,
0x6f, 0xe2, 0x92, 0xaf, 0x2c, 0x8e, 0xe7, 0x47, 0xf6, 0x28, 0xc0, 0xed,
0x9b, 0x3a, 0x5f, 0x9b, 0x49, 0x17, 0x66, 0x40, 0xa3, 0x78, 0x3e, 0x5f,
0x26, 0x70, 0xf1, 0x7f, 0x93, 0x0b, 0x5a, 0xe6, 0x2f, 0xca, 0x42, 0x60,
0x72, 0x24, 0xd7, 0xb4, 0xf0, 0xa4, 0x0d, 0x64, 0x3d, 0xa2, 0xe1, 0xbb,
0x13, 0x4e, 0xb8, 0x5c, 0x3b, 0xa7, 0x2b, 0xbb, 0xeb, 0xb3, 0x79, 0x45,
0xc2, 0x36, 0xe3, 0xcd, 0x43, 0xf9, 0x79, 0x34, 0x7f, 0x3e, 0x74, 0x5c,
0x28, 0x8b, 0xe9, 0xa0, 0xb3, 0xcb, 0x3e, 0xe6, 0x73, 0xd0, 0xa4, 0x26,
0x59, 0x6c, 0x0b, 0xa0, 0x71, 0x28, 0x53, 0x9d, 0x49, 0x2d, 0xfd, 0x6b,
0xc8, 0x45, 0x6d, 0x2c, 0xd2, 0xfb, 0xb3, 0x1f, 0x59, 0xf7, 0x22, 0x4a,
0xf1, 0xd1, 0x0e, 0xaf, 0x95, 0x4d, 0x03, 0xcd, 0x40, 0x9b, 0xe1, 0x60,
0x1e, 0xe6, 0xa9, 0xc1, 0xfd, 0x64, 0x09, 0x9d, 0x8a, 0x13, 0x6a, 0xfe,
0xcf, 0x3b, 0xbe, 0x5c, 0xd1, 0xa2, 0x10, 0x46, 0x7c, 0xff, 0x05, 0xcc,
0xf0, 0xb5, 0xd6, 0x88, 0xf5, 0x10, 0xbf, 0xff, 0xa8, 0x03, 0x50, 0xb1,
0x25, 0xfa, 0xb4, 0x97, 0x83, 0x1f, 0xab, 0xe4, 0xc3, 0x91, 0x07, 0x62,
0x86, 0x35, 0xe7, 0xb9, 0xd3, 0x17, 0x48, 0xa6, 0xf9, 0x26, 0xd6, 0xa0,
0xf8, 0x17, 0xd8, 0x8a, 0x49, 0x1c, 0xfa, 0x97, 0x0d, 0x5a, 0x76, 0x29,
0x68, 0xac, 0x57, 0xe6, 0x14, 0xc6, 0xe0, 0x9f, 0xf7, 0x37, 0xd1, 0x4e,
0x2e, 0xf2, 0x89, 0x06, 0x8e, 0x53, 0x0f, 0x89, 0xe5, 0x19, 0x86, 0xd2,
0x47, 0xac, 0x05, 0x83, 0xe6, 0x91, 0xbc, 0x13, 0xe2, 0x8a, 0x09, 0x9b,
```

FIG. 8n

```
0x5e, 0x3d, 0x8d, 0xe0, 0x82, 0xc9, 0x6d, 0x09, 0x7b, 0x9a, 0x53, 0xff,
0xc2, 0x1f, 0xe3, 0x94, 0xf2, 0x0d, 0xc7, 0xa4, 0x8b, 0x40, 0x72, 0x25,
0x9a, 0x88, 0xd7, 0x22, 0xf5, 0xc6, 0x3f, 0x52, 0x1a, 0x75, 0xa2, 0x22,
0x86, 0x3a, 0x6b, 0xb5, 0xd0, 0x1c, 0x88, 0x41, 0x59, 0x7b, 0x0a, 0x4e,
0xc6, 0x63, 0x2b, 0x4d, 0x92, 0xe0, 0x1e, 0xd7, 0x60, 0x77, 0x33, 0x4b,
0xde, 0x64, 0x0c, 0x51, 0x36, 0xab, 0xf5, 0xce, 0x1c, 0x4f, 0x92, 0x67,
0x25, 0x8b, 0x71, 0x91, 0x38, 0x79, 0x61, 0x03, 0x83, 0x57, 0x9e, 0x6e,
0x07, 0x91, 0x5d, 0x23, 0xd9, 0x9e, 0xf5, 0xbd, 0x07, 0xc8, 0x81, 0x25,
0x64, 0x92, 0x4a, 0x0b, 0xb1, 0x69, 0x17, 0x83, 0x6d, 0x1d, 0x68, 0xdc,
0xc1, 0x22, 0xff, 0x75, 0xcb, 0xb4, 0x3a, 0xf1, 0x8d, 0xcc, 0xf8, 0x21,
0xd1, 0x63, 0x3f, 0x7b, 0xac, 0x20, 0xf6, 0xd1, 0x81, 0xbf, 0x03, 0x4f,
0x31, 0xac, 0x95, 0xcf, 0x34, 0xdf, 0x6d, 0x31, 0x7b, 0x5f, 0x37, 0xb2,
0x58, 0x74, 0x26, 0x4a, 0xf7, 0xc9, 0x02, 0xd2, 0x3d, 0x4f, 0xba, 0x62,
0x2f, 0x78, 0xa2, 0xb6, 0xdb, 0x08, 0xf3, 0xc4, 0x14, 0xfb, 0xd2, 0x8c,
0x34, 0x5e, 0xe5, 0xb2, 0x31, 0xab, 0xe3, 0x21, 0xa7, 0x80, 0xdc, 0x19,
0xb5, 0x62, 0x86, 0x40, 0x98, 0xc9, 0xe8, 0x06, 0xc1, 0xa0, 0xfe, 0xce,
0x70, 0x15, 0x69, 0x3f, 0xa0, 0xff, 0xc8, 0x02, 0xde, 0xb5, 0xee, 0x0a,
0xd9, 0xbf, 0x98, 0xd0, 0x36, 0xc6, 0xe7, 0x31, 0xf3, 0xba, 0xd2, 0x84,
0xb5, 0x49, 0x39, 0x7e, 0x9a, 0x1a, 0xd8, 0xa9, 0xf1, 0xbc, 0x32, 0xce,
0x86, 0x45, 0xba, 0xfe, 0xa5, 0xc6, 0x45, 0xa5, 0x2f, 0x61, 0xa5, 0x35,
0x4a, 0x91, 0x62, 0x1d, 0x6f, 0x34, 0x97, 0x58, 0xab, 0x0b, 0xee, 0xcc,
0x36, 0x58, 0xa5, 0x4d, 0x25, 0xe8, 0x9f, 0xcd, 0xef, 0x13, 0x48, 0xfa,
0x60, 0xbc, 0x17, 0xca, 0xe7, 0xaa, 0x84, 0x18, 0xd3, 0x99, 0xe9, 0x14,
0x6b, 0x9f, 0x55, 0xf0, 0xb0, 0x11, 0xed, 0x9f, 0xd4, 0x04, 0xee, 0x64,
0x39, 0x9d, 0x6e, 0x42, 0x5d, 0x9e, 0x50, 0x0a, 0xaa, 0xc7, 0x98, 0x27,
0xf6, 0x81, 0x44, 0x74, 0xef, 0x32, 0xad, 0x77, 0xe9, 0x36, 0xcb, 0xf7,
0x0f, 0x55, 0x9f, 0x65, 0x2b, 0x78, 0x40, 0x8a, 0x9d, 0xea, 0x29, 0xbe,
0x76, 0x60, 0x2e, 0x4a, 0x86, 0x5f, 0x33, 0x54, 0x6d, 0x1a, 0x49, 0xf1,
0x6f, 0x1f, 0xb1, 0x60, 0x9a, 0x4e, 0x2e, 0x66, 0xef, 0x18, 0xd3, 0x62,
0xea, 0x4d, 0x3b, 0x75, 0x04, 0x51, 0x78, 0xf4, 0x25, 0xdd, 0x92, 0x02,
0x55, 0xeb, 0x84, 0x10, 0xf0, 0x85, 0xbd, 0xe2, 0x03, 0xd9, 0xa5, 0xc3,
0x0a, 0xaf, 0x41, 0x7b, 0xc3, 0x4c, 0x23, 0x93, 0x6d, 0xdf, 0x90, 0x15,
0x87, 0x65, 0x36, 0x5e, 0x92, 0x6e, 0x2d, 0xb1, 0x7f, 0x26, 0x50, 0x7f,
0x08, 0x48, 0xfb, 0xbb, 0x2f, 0x4e, 0xb7, 0x89, 0x32, 0xae, 0x6f, 0x2c,
0x7e, 0x65, 0x21, 0x4b, 0x88, 0x58, 0x97, 0x20, 0x84, 0xe1, 0x2b, 0xea,
0x7d, 0xbd, 0x2e, 0xec, 0x76, 0x16, 0x50, 0x69, 0x0d, 0x97, 0xd5, 0xba,
0x05, 0x56, 0xce, 0x49, 0x09, 0x91, 0x6c, 0x18, 0xa3, 0x36, 0x86, 0xf3,
0xb2, 0x14, 0xd2, 0x27, 0x4e, 0xc9, 0x7e, 0xe1, 0x0e, 0xd7, 0xab, 0xc1,
0xf7, 0x14, 0xbe, 0x8f, 0xfe, 0xcd, 0x2a, 0xad, 0x88, 0x4f, 0x0b, 0x7d,
0xda, 0x13, 0xe4, 0xa1, 0x04, 0x53, 0xaf, 0x24, 0xc0, 0x8e, 0xfd, 0x2c,
0xc4, 0xe1, 0xa9, 0x13, 0x9c, 0x6d, 0x36, 0xaa, 0x27, 0x9a, 0x35, 0x65,
0xd1, 0x50, 0x17, 0x65, 0x78, 0x29, 0x5a, 0xfc, 0x46, 0xd0, 0xec, 0x13,
0xde, 0x99, 0xbc, 0xff, 0x05, 0xbf, 0x3d, 0xeb, 0xc6, 0xaf, 0xfe, 0x1c,
0xc0, 0xdd, 0x9f, 0xe6, 0x05, 0xc6, 0xec, 0x98, 0xd6, 0x27, 0x97, 0x66,
0xed, 0x06, 0xda, 0x57, 0xcb, 0xff, 0x1a, 0xc1, 0xdf, 0xa4, 0xc4, 0x3b,
0xfc, 0xc8, 0x35, 0xd1, 0xa7, 0x53, 0x92, 0xb3, 0x04, 0xdc, 0x93, 0xcc,
0x25, 0xfa, 0xb7, 0xdc, 0xc2, 0x1e, 0x59, 0x3d, 0x97, 0x7c, 0xf9, 0x28,
0xbd, 0xf1, 0x50, 0xc0, 0x80, 0xe2, 0x1f, 0xd0, 0x44, 0x58, 0xec, 0xb7,
0x03, 0xa9, 0x57, 0x42, 0x87, 0x21, 0x92, 0x65, 0x36, 0x93, 0xdd, 0x24,
0xab, 0x7d, 0x96, 0x10, 0xd9, 0xba, 0xf6, 0x34, 0xc5, 0x75, 0x44, 0x7f,
0xc3, 0x8b, 0xf9, 0x93, 0x0a, 0x67, 0xb3, 0x60, 0x9b, 0x67, 0x1d, 0x5a,
0xc2, 0x4f, 0xed, 0x80, 0xd5, 0x14, 0xe3, 0xb5, 0x9d, 0x3d, 0xf7, 0xab,
0xca, 0xe8, 0x20, 0x97, 0x75, 0x5e, 0x2b, 0x72, 0x34, 0x6c, 0x58, 0x40,
0x82, 0x2a, 0x9e, 0x5b, 0x0a, 0x72, 0x42, 0x7f, 0x0c, 0x54, 0x7d, 0x21,
```

FIG. 8o

```
0x53, 0x77, 0x39, 0x62, 0xb8, 0x52, 0x12, 0xae, 0x45, 0x81, 0x24, 0x6e,
0x92, 0x0c, 0x4b, 0x91, 0x57, 0x07, 0xe5, 0x81, 0x9c, 0x12, 0x6a, 0xf4,
0x0e, 0x6a, 0xcf, 0x19, 0x68, 0x45, 0x7a, 0x3b, 0x6a, 0x9e, 0x87, 0x39,
0xa1, 0x83, 0xfe, 0xb4, 0xe1, 0x16, 0xa4, 0x5e, 0x77, 0xa2, 0x2d, 0xd8,
0x47, 0xaa, 0x68, 0x0d, 0x8a, 0x73, 0x94, 0x37, 0x65, 0xfc, 0x19, 0xb2,
0xf2, 0x5a, 0xe7, 0x0b, 0xcc, 0x78, 0x43, 0x69, 0x06, 0x4c, 0xe6, 0x60,
0x37, 0x67, 0x92, 0x4b, 0x21, 0xa4, 0xfe, 0x29, 0xd6, 0x5f, 0x40, 0x77,
0xe6, 0x3e, 0xd3, 0x10, 0xef, 0x41, 0xd4, 0x79, 0xfa, 0x0d, 0xc9, 0x47,
0xb9, 0x5d, 0x83, 0x46, 0x08, 0xc5, 0x8f, 0x2d, 0x4c, 0x8c, 0xae, 0x11,
0xe3, 0xbd, 0xa8, 0xf4, 0xc7, 0x1c, 0xe7, 0xa6, 0xca, 0x52, 0xf7, 0x77,
0xd4, 0x23, 0xda, 0xb8, 0xf2, 0x3a, 0xd7, 0xbd, 0x98, 0xfd, 0xab, 0x1c,
0xf3, 0x88, 0xcd, 0x7b, 0xc0, 0xf9, 0xa9, 0xd4, 0x36, 0xdc, 0xba, 0xea,
0x40, 0x87, 0x33, 0x57, 0x1e, 0xbe, 0x82, 0x44, 0x9c, 0x24, 0xff, 0x84,
0xc5, 0xf2, 0x1e, 0xbf, 0xe0, 0x46, 0x02, 0x68, 0xec, 0x46, 0x0f, 0x75,
0x36, 0x6a, 0xc7, 0xe4, 0x1e, 0xd4, 0x6b, 0x02, 0x77, 0xfd, 0x3c, 0xc3,
0xa7, 0xf8, 0x17, 0xc2, 0x87, 0xcf, 0x9e, 0x34, 0xc5, 0x8d, 0x45, 0xa5,
0x1b, 0xed, 0xac, 0xc4, 0xf4, 0x32, 0xc8, 0xa0, 0xfc, 0x1b, 0xd3, 0xb2,
0xe2, 0x8e, 0x0e, 0x57, 0x9f, 0x1b, 0xdb, 0x31, 0xc9, 0x57, 0x20, 0x89,
0x38, 0xa7, 0x8f, 0x2d, 0xb3, 0x8e, 0x1f, 0x6e, 0xea, 0x33, 0xac, 0xfb,
0x6d, 0x1f, 0x76, 0xdd, 0x0c, 0x69, 0xf5, 0x52, 0x38, 0x80, 0x02, 0x52,
0x8c, 0xa0, 0x0d, 0x70, 0xdd, 0x1b, 0xb5, 0x38, 0x8d, 0xa6, 0x68, 0x47,
0x91, 0x73, 0x15, 0x61, 0x43, 0xcb, 0x0f, 0x91, 0x40, 0x5e, 0xe2, 0x32,
0x1d, 0x4f, 0x7a, 0x18, 0x52, 0x88, 0x64, 0x20, 0xab, 0xfa, 0xb3, 0xd5,
0xa4, 0xeb, 0x2d, 0xc3, 0xdf, 0x47, 0xb0, 0x38, 0x52, 0xa6, 0x62, 0x0f,
0x7f, 0xa6, 0xe6, 0x21, 0xc7, 0x91, 0xda, 0x26, 0xab, 0x8b, 0x4a, 0x0c,
0x7d, 0x45, 0xad, 0xed, 0xb6, 0x19, 0x98, 0xde, 0x4f, 0x2a, 0x5f, 0xe4,
0x48, 0x22, 0x6f, 0x52, 0x06, 0x6d, 0xdd, 0x3a, 0x4f, 0x8c, 0x56, 0x16,
0x8f, 0xaa, 0x84, 0x23, 0x58, 0x7e, 0x02, 0x76, 0x5e, 0x39, 0xc1, 0x81,
0xf1, 0xb8, 0x10, 0x88, 0xb0, 0x97, 0xf8, 0xc1, 0x63, 0xe8, 0x07, 0xda,
0x6a, 0x45, 0xdf, 0xa1, 0x05, 0x98, 0x28, 0xcd, 0x91, 0xe9, 0x3a, 0xb7,
0xa4, 0x3d, 0xb9, 0x78, 0xd8, 0x26, 0xce, 0x3f, 0x72, 0xfa, 0x4a, 0x2e,
0x99, 0x82, 0x10, 0xe0, 0x54, 0xed, 0x02, 0xad, 0xce, 0x2c, 0xe9, 0x9e,
0x82, 0x32, 0x55, 0xde, 0xc2, 0x02, 0x9a, 0x66, 0xd3, 0x0a, 0xdf, 0xb7,
0xf4, 0xae, 0x31, 0x82, 0x13, 0x5c, 0x76, 0x0d, 0x4f, 0x87, 0x5b, 0x02,
0x8a, 0x72, 0x9f, 0xed, 0x0a, 0xd5, 0x8c, 0xf9, 0x2d, 0xcb, 0x77, 0x8c,
0x33, 0x62, 0xb7, 0x52, 0xd1, 0xf5, 0x2f, 0xb6, 0xff, 0x96, 0x25, 0x5d,
0x8e, 0x4c, 0x31, 0x70, 0x05, 0xd5, 0x7a, 0xa7, 0x0c, 0xf0, 0x90, 0xd1,
0xf9, 0x27, 0xbe, 0x85, 0xfb, 0xbf, 0x2a, 0xe1, 0x6e, 0x53, 0x0d, 0xd8,
0xae, 0xea, 0xc5, 0x2d, 0xed, 0x94, 0xd9, 0x49, 0x32, 0x8f, 0x47, 0xec,
0x64, 0x02, 0x51, 0xa1, 0x7a, 0x25, 0x5c, 0xa5, 0x39, 0x87, 0xbb, 0x36,
0x83, 0xf2, 0x6b, 0x14, 0x51, 0xa3, 0x60, 0x18, 0xe5, 0x89, 0xd4, 0x1c,
0xac, 0x65, 0xea, 0xb7, 0x14, 0xd2, 0xa4, 0xc2, 0xf2, 0x44, 0x65, 0x91,
0x28, 0xa2, 0x74, 0x17, 0xfc, 0x5b, 0xbf, 0x07, 0xd2, 0xf6, 0xb0, 0x7b,
0x2e, 0x4e, 0xf6, 0xb7, 0x60, 0xa1, 0x6e, 0x44, 0x90, 0x03, 0xed, 0xd1,
0xb7, 0xd9, 0x43, 0xee, 0x21, 0xd3, 0xb7, 0xfa, 0x33, 0xdc, 0x15, 0x61,
0x7d, 0x34, 0x4b, 0xb3, 0x65, 0x14, 0x53, 0xfc, 0xad, 0x1a, 0xf2, 0x6b,
0x04, 0x96, 0x6f, 0xcd, 0x55, 0x12, 0xe5, 0x3d, 0xdb, 0xcc, 0xad, 0xf6,
0x91, 0xb1, 0x41, 0xd3, 0x7f, 0xb9, 0x31, 0xac, 0x7d, 0x97, 0x12, 0xa1,
0x66, 0x03, 0x93, 0xc8, 0x3c, 0xec, 0xba, 0x65, 0x39, 0x4a, 0x9b, 0x52,
0x13, 0x67, 0xaf, 0x06, 0xd3, 0xad, 0x6b, 0x9f, 0x24, 0xd6, 0x41, 0xe1,
0x12, 0xc5, 0x8b, 0xec, 0xcc, 0x0f, 0xff, 0x5f, 0xb7, 0x46, 0xa3, 0xe0,
0x2e, 0xc0, 0xff, 0x81, 0x32, 0x58, 0x07, 0x49, 0xfd, 0x97, 0x31, 0x8b,
0x65, 0x22, 0x56, 0x70, 0x04, 0xa9, 0xd9, 0xba, 0xfa, 0x42, 0xc8, 0x8d,
0x3f, 0x84, 0xaa, 0x4a, 0x24, 0x64, 0x97, 0x1e, 0xeb, 0xa1, 0x86, 0x2b,
```

FIG. 8p

```
0x8b, 0xff, 0x2f, 0xcd, 0x1d, 0x69, 0x87, 0x48, 0x6d, 0x28, 0x91, 0xc0,
0x95, 0x38, 0x64, 0xa1, 0x4d, 0x22, 0xc5, 0xab, 0xe6, 0xca, 0x1f, 0xdc,
0x92, 0xbe, 0x3a, 0xd2, 0x09, 0x75, 0x42, 0x89, 0xc1, 0x18, 0x5e, 0xa0,
0x38, 0xa6, 0xc7, 0x86, 0x0a, 0x64, 0x7a, 0x16, 0x5a, 0xe8, 0x6e, 0x1a,
0x5d, 0xdf, 0x54, 0x15, 0x4a, 0xea, 0x5d, 0xd4, 0x21, 0xe5, 0x76, 0x43,
0x98, 0x1e, 0xa0, 0x77, 0xdf, 0x17, 0x82, 0xfa, 0xca, 0x26, 0xf4, 0x60,
0x77, 0x21, 0xff, 0x3e, 0xb8, 0x75, 0xa5, 0x30, 0x59, 0xfc, 0x48, 0x19,
0x75, 0x56, 0x26, 0x8c, 0xdb, 0x0d, 0x78, 0xb9, 0x66, 0x02, 0x49, 0x98,
0xc8, 0xf3, 0xa9, 0xc0, 0x73, 0x0f, 0x4f, 0xab, 0xee, 0xbc, 0x3c, 0xe5,
0x8f, 0x35, 0x52, 0x19, 0x85, 0x6a, 0x32, 0xdf, 0xb9, 0x1e, 0x6f, 0xec,
0x9b, 0xc2, 0x0c, 0x52, 0xcf, 0x6c, 0x10, 0xda, 0x53, 0x14, 0x75, 0xe5,
0xaf, 0x35, 0xc7, 0x9c, 0x3f, 0xf6, 0x06, 0x58, 0x73, 0xf4, 0x0f, 0x83,
0xd1, 0x99, 0x87, 0x50, 0x2b, 0x65, 0x7f, 0x05, 0x5b, 0xef, 0x70, 0x44,
0x9d, 0xe2, 0xcb, 0x32, 0xee, 0xa6, 0xd9, 0x23, 0xea, 0x82, 0x60, 0x2a,
0xbd, 0xf1, 0x21, 0xbf, 0x3d, 0xc7, 0x29, 0xff, 0x38, 0x88, 0xa5, 0xce,
0x2c, 0xc8, 0x7f, 0x39, 0x4a, 0xb2, 0x5c, 0xf5, 0x09, 0x5d, 0xff, 0x2e,
0xa6, 0xb8, 0x29, 0xa2, 0x64, 0x8c, 0x3d, 0xa0, 0xe6, 0xbb, 0x0c, 0x83,
0xdc, 0x14, 0xf4, 0x86, 0x9e, 0xb3, 0x28, 0xbd, 0x9a, 0xe1, 0xc1, 0x72,
0x1b, 0x9b, 0x38, 0xf8, 0x8f, 0xdc, 0x24, 0xb1, 0x66, 0x15, 0x5f, 0x8d,
0x21, 0xa4, 0xe2, 0x79, 0x07, 0x5d, 0x7e, 0xc7, 0x2a, 0xf5, 0xb0, 0xd5,
0x09, 0xe8, 0xa1, 0x51, 0x0d, 0xf4, 0x37, 0xcc, 0x7c, 0x30, 0xe7, 0x87,
0xb5, 0x24, 0x49, 0xa7, 0x34, 0xb3, 0x92, 0x55, 0x3e, 0x8b, 0xfd, 0x0f,
0xad, 0xcc, 0x47, 0xdf, 0x8a, 0x1c, 0xa6, 0x3c, 0xea, 0x62, 0x08, 0xfd,
0xbe, 0xa7, 0xf4, 0xc4, 0x35, 0xa4, 0x17, 0x8a, 0xb5, 0x60, 0x1d, 0x9e,
0x54, 0x6f, 0x45, 0x91, 0x06, 0x47, 0xfa, 0x8d, 0x41, 0x9f, 0x51, 0xde,
0x7d, 0x0a, 0x91, 0xa6, 0xba, 0x02, 0xf6, 0x7b, 0x96, 0x09, 0xb0, 0xfe,
0x9c, 0xd7, 0x2e, 0xcd, 0x9e, 0x81, 0xbb, 0x4f, 0x06, 0xe8, 0x58, 0xd8,
0x0a, 0xbf, 0xdb, 0x16, 0x4e, 0x92, 0x57, 0x32, 0x9a, 0x52, 0xbb, 0x62,
0x08, 0xda, 0x72, 0xf2, 0x4f, 0x03, 0xa4, 0x40, 0xed, 0xcf, 0x60, 0x20,
0x4f, 0xcc, 0x7a, 0xed, 0x3d, 0xd7, 0x2d, 0xcb, 0xf0, 0x3d, 0xc2, 0x2a,
0xcc, 0xfc, 0x97, 0x12, 0x5b, 0x8a, 0x67, 0x43, 0x8d, 0x1d, 0xb5, 0x70,
0x98, 0x80, 0x56, 0xa2, 0x1a, 0x5b, 0x72, 0x3b, 0xfb, 0x97, 0xc4, 0xf1,
0x84, 0xe0, 0xc1, 0x09, 0xeb, 0x60, 0x1a, 0x70, 0x25, 0x77, 0x95, 0xb4,
0x2c, 0xce, 0xe4, 0x57, 0xb8, 0x1a, 0x9e, 0x40, 0x72, 0x13, 0x55, 0x41,
0x8d, 0xe3, 0xc8, 0x28, 0xf5, 0x37, 0x82, 0xe5, 0x0b, 0xbf, 0xf1, 0x34,
0xd4, 0xa6, 0xc4, 0x17, 0xe3, 0x81, 0x36, 0xad, 0x65, 0xef, 0x40, 0x60,
0xdd, 0x4d, 0x23, 0x57, 0xed, 0x65, 0x19, 0x59, 0x7a, 0x0e, 0x6f, 0xae,
0x46, 0x25, 0xdc, 0x99, 0x88, 0x39, 0x70, 0xb2, 0x49, 0x30, 0x67, 0x82,
0x2c, 0xb8, 0xd9, 0xae, 0xea, 0x44, 0xd4, 0x1c, 0x8a, 0x41, 0x5b, 0xa0,
0x2e, 0x84, 0xf7, 0x5e, 0x2b, 0x7c, 0xa6, 0xc3, 0x11, 0xa9, 0x57, 0x0b,
0x92, 0x7d, 0xa6, 0x4e, 0x83, 0x59, 0x18, 0x66, 0xa7, 0x48, 0x1d, 0xd9,
0xb5, 0xe2, 0x20, 0xcb, 0xac, 0x5f, 0xf1, 0x2c, 0xd3, 0xaf, 0xe3, 0x03,
0xff, 0xb6, 0xd6, 0x9e, 0x18, 0x6e, 0x5b, 0x04, 0x6c, 0x49, 0x27, 0x73,
0xce, 0xa0, 0xde, 0xba, 0xd7, 0x38, 0xeb, 0x0d, 0x68, 0x45, 0x7b, 0x96,
0x2a, 0xf1, 0x7e, 0xc4, 0x26, 0xe1, 0xb2, 0xd8, 0x0e, 0x4d, 0x83, 0x5d,
0x06, 0xbb, 0x45, 0xae, 0x92, 0x7b, 0x1a, 0x5e, 0x88, 0x66, 0x31, 0x5a,
0xb0, 0x03, 0xfd, 0x96, 0x14, 0xd0, 0x86, 0x1e, 0x9c, 0x7e, 0xb2, 0x38,
0xc3, 0xa2, 0xdd, 0x31, 0xe7, 0xc4, 0x1c, 0xeb, 0x89, 0xb6, 0x14, 0x5b,
0xf6, 0xc7, 0x1e, 0xf0, 0x9d, 0xcc, 0xfd, 0xac, 0xeb, 0x11, 0x81, 0x61,
0x05, 0x79, 0x2e, 0xa4, 0xe7, 0xb0, 0xd3, 0x11, 0xde, 0x3b, 0xc7, 0x91,
0xbc, 0x08, 0xe8, 0x41, 0x76, 0xf0, 0x27, 0xc2, 0xe0, 0x47, 0xf7, 0x04,
0xd3, 0xb5, 0xe9, 0x89, 0xdc, 0x2f, 0x82, 0xa2, 0x4c, 0x0b, 0x61, 0xff,
0x31, 0x81, 0xbb, 0x48, 0x13, 0x69, 0x3b, 0x77, 0x45, 0x7f, 0x4e, 0x09,
0xc0, 0x40, 0xe9, 0xcd, 0xac, 0x1c, 0xfa, 0x91, 0x4d, 0x2d, 0x6a, 0x46,
```

FIG. 8q

```
0x91, 0x64, 0x1b, 0x87, 0xff, 0x9e, 0xc6, 0x04, 0x68, 0xac, 0x48, 0xd5,
0x91, 0x38, 0x65, 0x94, 0x75, 0x2f, 0xff, 0xb2, 0x90, 0xdf, 0x5a, 0x15,
0xfe, 0x40, 0xc6, 0xa1, 0xf6, 0x0f, 0xdf, 0x99, 0xd7, 0x6c, 0xcb, 0x25,
0x5c, 0xb9, 0x53, 0xea, 0x10, 0xc9, 0xe2, 0x8c, 0x1d, 0x47, 0x7e, 0xb8,
0x41, 0x8e, 0x5c, 0x37, 0x65, 0xf3, 0x75, 0x33, 0xa7, 0x45, 0x96, 0x11,
0x82, 0x53, 0x03, 0x61, 0x91, 0x49, 0x24, 0xf6, 0x98, 0xbf, 0xfb, 0x3b,
0x55, 0x7e, 0x21, 0x73, 0xb7, 0x64, 0x14, 0x4b, 0xe0, 0x59, 0x32, 0x98,
0x5c, 0xb6, 0x65, 0x37, 0x95, 0x6e, 0x1f, 0x9f, 0x72, 0x43, 0xa0, 0x0d,
0x51, 0x9b, 0x65, 0xf7, 0x36, 0xc7, 0x7d, 0x9c, 0x4f, 0x05, 0xd6, 0x8d,
0xf9, 0x24, 0xd8, 0xb9, 0xd2, 0x2a, 0xee, 0x88, 0xda, 0xa2, 0x2c, 0x92,
0xed, 0x88, 0xc7, 0xaf, 0x12, 0xf0, 0xad, 0x02, 0xf8, 0xb1, 0xd3, 0x3c,
0xb9, 0x56, 0x18, 0xf7, 0x3e, 0xda, 0x6c, 0x0b, 0x5f, 0xfb, 0x1f, 0xbe,
0xec, 0x9d, 0xcb, 0x20, 0x52, 0xa9, 0x6f, 0xcd, 0x30, 0x6b, 0xe0, 0x46,
0x21, 0xb7, 0x7b, 0x28, 0x4c, 0x87, 0x3c, 0xb2, 0x99, 0xf4, 0x2d, 0xae,
0x5c, 0x41, 0x6c, 0x0d, 0xf2, 0xd1, 0x97, 0x05, 0x68, 0xf8, 0xa1, 0xd5,
0x02, 0xc8, 0x99, 0xe1, 0x0d, 0x66, 0xcf, 0x5e, 0xe6, 0x28, 0xbc, 0x3e,
0xc5, 0xe2, 0xa6, 0xcb, 0x4b, 0x16, 0x62, 0x88, 0x0d, 0xf0, 0xc4, 0x3e,
0xfe, 0x93, 0xd7, 0x22, 0xa8, 0x7b, 0xca, 0xfd, 0x1a, 0xd5, 0x86, 0xfb,
0x14, 0xd2, 0x8b, 0xdb, 0x2b, 0xff, 0x36, 0x6b, 0xf3, 0xcf, 0x02, 0xbd,
0x77, 0xe0, 0x16, 0xc2, 0xe4, 0xa2, 0x29, 0x61, 0xb3, 0x7d, 0x9e, 0x52,
0x10, 0x67, 0xb1, 0x57, 0x22, 0x73, 0x57, 0x0f, 0x3d, 0x54, 0x69, 0x32,
0x79, 0xcb, 0x71, 0x87, 0x2b, 0x4e, 0x99, 0x5f, 0xd8, 0x27, 0xa9, 0x78,
0x8d, 0xb5, 0x1c, 0xe8, 0xa7, 0xc8, 0x4a, 0x02, 0x6a, 0x54, 0x11, 0x81,
0x3f, 0xf3, 0x24, 0xb6, 0x90, 0x02, 0xa6, 0x89, 0x6b, 0x3c, 0xa1, 0xf8,
0xc5, 0x1b, 0xee, 0x78, 0x46, 0x06, 0x84, 0xd4, 0x93, 0xf7, 0x31, 0xa2,
0x7f, 0x5b, 0x3c, 0xad, 0x25, 0xb6, 0x50, 0x19, 0x80, 0x43, 0x53, 0x24,
0x8a, 0xa6, 0xf9, 0x3d, 0xc1, 0x95, 0xda, 0x87, 0x1c, 0x57, 0x73, 0x31,
0x69, 0xd0, 0xa4, 0xdc, 0xb6, 0x2c, 0x5b, 0x7a, 0x06, 0x53, 0xb1, 0x66,
0xf5, 0x0e, 0xaf, 0x45, 0x8d, 0x05, 0x4d, 0xb3, 0x66, 0x33, 0x59, 0xa6,
0x4f, 0x17, 0xba, 0x87, 0xae, 0x27, 0x48, 0x9e, 0x59, 0x24, 0x8e, 0x6c,
0x35, 0x88, 0xee, 0xc7, 0x0a, 0x58, 0xe1, 0x1f, 0xf6, 0xa0, 0xd3, 0x13,
0xf8, 0xba, 0xe2, 0xb3, 0x77, 0xd1, 0x07, 0xe5, 0x94, 0x22, 0x51, 0xe2,
0xce, 0x14, 0xf1, 0x7d, 0x08, 0x81, 0xec, 0x48, 0xd3, 0x2b, 0x97, 0x74,
0x35, 0x86, 0x9b, 0xd0, 0x38, 0xe1, 0xad, 0xd9, 0xb9, 0x0d, 0x9a, 0xdd,
0x57, 0xea, 0x1c, 0xd5, 0xba, 0xeb, 0x07, 0x57, 0x93, 0x64, 0x0e, 0xa1,
0xdc, 0xbb, 0x3a, 0x69, 0x24, 0xb6, 0x53, 0xe6, 0xbe, 0x14, 0xfc, 0xce,
0x8b, 0xdb, 0x30, 0xf0, 0xbf, 0xa7, 0xfd, 0xb5, 0xd9, 0x4e, 0x2f, 0x70,
0x1b, 0x77, 0x37, 0x63, 0xf3, 0x09, 0x9c, 0xbd, 0x8f, 0xec, 0x26, 0x48,
0x72, 0x8c, 0xe4, 0x9f, 0xd2, 0x2d, 0xea, 0x3e, 0x88, 0x50, 0x2c, 0x70,
0xdd, 0xc7, 0x2f, 0xe8, 0x93, 0xd6, 0x0a, 0xf0, 0xc3, 0x97, 0xe3, 0x55,
0x1a, 0x72, 0xd2, 0xef, 0x3d, 0xb4, 0xf9, 0x44, 0xae, 0x12, 0x6d, 0x44,
0x96, 0x31, 0xa7, 0x67, 0x87, 0x48, 0x30, 0x75, 0x99, 0x49, 0x34, 0x8f,
0x18, 0xf4, 0xa2, 0x42, 0xbb, 0xfe, 0x36, 0x9e, 0xb4, 0x6c, 0x20, 0xb7,
0xe5, 0x42, 0xba, 0x70, 0x0e, 0x62, 0xe0, 0x50, 0xf1, 0x17, 0x6d, 0xf5,
0x8f, 0x7b, 0x27, 0x63, 0x8c, 0x58, 0x33, 0x81, 0x3e, 0x86, 0x65, 0x2c,
0x51, 0x91, 0x79, 0x35, 0xab, 0xcd, 0xe1, 0x2c, 0x57, 0xa6, 0xff, 0x17,
0xdb, 0x84, 0x04, 0x8d, 0x41, 0x6a, 0x33, 0x72, 0x56, 0x0f, 0x78, 0x63,
0x3c, 0x75, 0x1b, 0x62, 0x82, 0x05, 0x9d, 0xb4, 0xde, 0x0b, 0xeb, 0x8e,
0xb1, 0xcf, 0x3f, 0xff, 0x10, 0x53, 0x82, 0x02, 0xf5, 0xa7, 0x14, 0x49,
0xb6, 0x65, 0x19, 0x9f, 0xd5, 0xbb, 0xe9, 0xa3, 0x24, 0x64, 0x7a, 0x11,
0x46, 0xaf, 0x6f, 0x24, 0x7a, 0x5d, 0x07, 0x9e, 0xec, 0xb7, 0x8e, 0x11,
0x85, 0xcf, 0x07, 0x56, 0xea, 0xc0, 0x25, 0xd1, 0xfe, 0x4b, 0xce, 0xe9,
0x06, 0xc4, 0xe6, 0x57, 0xd5, 0x02, 0xa9, 0xc5, 0x68, 0x47, 0x8a, 0x68,
0x13, 0x80, 0x64, 0x0b, 0x48, 0x86, 0x9b, 0x53, 0x37, 0x69, 0xd9, 0x21,
```

FIG. 8r

```
0xfe, 0xa6, 0xc6, 0x07, 0xbe, 0xa6, 0x29, 0x52, 0xa8, 0x19, 0xe8, 0x3a,
0xfc, 0xbb, 0xd4, 0x17, 0xf5, 0xc6, 0x99, 0xfc, 0x12, 0xd3, 0xb5, 0xe8,
0x20, 0x46, 0x7b, 0x96, 0x1a, 0x8a, 0x74, 0x4b, 0xae, 0x64, 0xcc, 0x22,
0xdc, 0x97, 0xc7, 0xec, 0x20, 0xc1, 0xe6, 0xa8, 0xd3, 0x0c, 0xe4, 0xc2,
0x2b, 0xf2, 0xce, 0x7f, 0x43, 0x60, 0xb9, 0x4e, 0x27, 0x75, 0x5f, 0x20,
0x88, 0xbf, 0xa6, 0xc9, 0x31, 0x59, 0xd7, 0x25, 0xf9, 0x8c, 0xd2, 0x73,
0x02, 0x62, 0x82, 0x13, 0xf4, 0xa9, 0xc1, 0xdb, 0x84, 0xf9, 0x3b, 0xbd,
0xdf, 0x42, 0xcb, 0x37, 0x6c, 0x50, 0x33, 0xad, 0x69, 0x2f, 0x73, 0x99,
0x79, 0x3d, 0x85, 0x63, 0xa4, 0x16, 0x97, 0x3b, 0x58, 0x80, 0xa2, 0x25,
0xb2, 0x7a, 0xff, 0x27, 0xde, 0xb8, 0xcc, 0x1f, 0xad, 0xdb, 0xb9, 0xee,
0xc8, 0x30, 0xfc, 0xcf, 0xab, 0x14, 0xa1, 0x7e, 0x57, 0x37, 0x89, 0x71,
0x45, 0x81, 0xde, 0x0a, 0xc4, 0x66, 0xb3, 0x4f, 0x05, 0x67, 0xa3, 0x46,
0xa7, 0x0c, 0x4a, 0xbf, 0x5f, 0x3e, 0x70, 0x14, 0x6a, 0xfc, 0xbe, 0x41,
0xef, 0xb6, 0x0c, 0xe9, 0x8a, 0x39, 0xf9, 0x78, 0xad, 0x50, 0x09, 0xb0,
0x7c, 0x9a, 0x48, 0x24, 0x80, 0x5e, 0x93, 0x42, 0xa1, 0x6a, 0x52, 0x15,
0xfe, 0x9d, 0xd3, 0x16, 0xf8, 0xa9, 0xc3, 0xdb, 0x3a, 0xe5, 0x60, 0x41,
0x98, 0x7d, 0xa1, 0x67, 0x0b, 0x51, 0xb0, 0x3c, 0xe5, 0x9b, 0x35, 0x4a,
0x8c, 0x53, 0x36, 0x5f, 0x1f, 0x9f, 0x5b, 0x8e, 0x12, 0xa4, 0xf8, 0x88,
0xbf, 0x0b, 0xfe, 0xca, 0x1b, 0xe8, 0xb8, 0xdc, 0x1f, 0xc8, 0xf1, 0x02,
0xbe, 0x54, 0x2e, 0xc1, 0xa8, 0xfc, 0x12, 0x6e, 0xec, 0x5a, 0x3e, 0x9a,
0x0c, 0x53, 0x37, 0xf6, 0x6d, 0x4d, 0x2c, 0x59, 0xa1, 0x62, 0x05, 0x72,
0x8f, 0xf5, 0x30, 0xd2, 0x9c, 0xdc, 0x19, 0xf8, 0xd1, 0xa1, 0x3d, 0x76,
0xfa, 0x34, 0xd2, 0x8f, 0xdd, 0x2b, 0xef, 0x83, 0x6b, 0xdb, 0x23, 0xab,
0x80, 0xf0, 0x2b, 0xd7, 0xa0, 0x8f, 0x02, 0x69, 0xd0, 0x26, 0x5a, 0xbb,
0x2e, 0x9f, 0x10, 0x59, 0xe5, 0x27, 0x9c, 0x40, 0x5e, 0xff, 0x06, 0xd8,
0xb7, 0xf8, 0x30, 0xcc, 0x85, 0x20, 0xe1, 0xa5, 0x37, 0x7d, 0x2b, 0x66,
0x93, 0x4a, 0x06, 0x7b, 0x58, 0x98, 0x18, 0xfb, 0xd1, 0x1e, 0xed, 0xb9,
0xd5, 0x2f, 0xf1, 0x5d, 0xb7, 0x20, 0xff, 0xbb, 0xd8, 0x09, 0xf0, 0xb3,
0xd4, 0x02, 0xcc, 0xee, 0x71, 0x2d, 0x5b, 0x20, 0xdd, 0x7a, 0x9c, 0x49,
0x76, 0x8e, 0x4b, 0x0e, 0x60, 0xa6, 0x30, 0x96, 0xde, 0x89, 0xf4, 0x78,
0x21, 0x4e, 0x8a, 0x43, 0xba, 0x1c, 0xd7, 0x7f, 0xef, 0xb0, 0x97, 0x86,
0x03, 0x9e, 0x84, 0x1c, 0xe4, 0x8a, 0xd9, 0x27, 0x4b, 0xbb, 0x65, 0x02,
0x4b, 0xb9, 0x62, 0x33, 0x6c, 0x1d, 0xed, 0x5e, 0x98, 0x4a, 0x14, 0x67,
0xa1, 0x5b, 0x1f, 0x9b, 0x38, 0xa4, 0x7a, 0xe2, 0x04, 0xc4, 0x7c, 0xb7,
0x51, 0x30, 0xd9, 0x87, 0x3c, 0x9a, 0x83, 0xd9, 0x6f, 0xef, 0xc5, 0x1b,
0xbd, 0x74, 0xf2, 0xd0, 0x2a, 0xb3, 0x66, 0x9e, 0x50, 0x13, 0x6f, 0xdd,
0x09, 0xb3, 0x8d, 0x70, 0xc7, 0x02, 0xd9, 0xb6, 0xe6, 0x30, 0xd4, 0xaf,
0xf2, 0x2b, 0xb2, 0x78, 0x09, 0x6c, 0x39, 0x4b, 0x85, 0x67, 0xa8, 0x11,
0xda, 0x74, 0x97, 0x55, 0x2c, 0xa2, 0x7d, 0x40, 0x65, 0x7b, 0x35, 0x4c,
0xaf, 0x98, 0xd5, 0xa2, 0x41, 0x57, 0xd3, 0x27, 0xf3, 0xc2, 0x39, 0xfc,
0x8c, 0xd6, 0x4e, 0x74, 0x1a, 0x5b, 0xab, 0x0b, 0xdf, 0xc7, 0xac, 0xe3,
0x09, 0x63, 0xa5, 0x2f, 0x40, 0x64, 0xe5, 0x23, 0xd6, 0xbb, 0xf8, 0xa7,
0x12, 0x4f, 0xb9, 0x79, 0x11, 0xe3, 0x88, 0xd6, 0x29, 0xf0, 0x8f, 0xb0,
0x0e, 0x86, 0xc2, 0x23, 0xd6, 0xb0, 0xea, 0x30, 0xd4, 0xba, 0xe4, 0x09,
0xc5, 0xf9, 0x5d, 0x34, 0x4c, 0x99, 0x5d, 0x0d, 0xf4, 0x82, 0xad, 0x21,
0xfa, 0xb2, 0x47, 0x07, 0x8e, 0x3f, 0x63, 0x7f, 0x33, 0x60, 0x8f, 0x16,
0x4f, 0xc9, 0x82, 0x35, 0xee, 0x96, 0xac, 0x3b, 0x5c, 0xfb, 0x48, 0x25,
0xec, 0x57, 0x43, 0x80, 0x12, 0x64, 0x8c, 0x51, 0x0f, 0x63, 0xe0, 0x4c,
0xc0, 0x94, 0xce, 0x1a, 0x9a, 0xe1, 0x23, 0x8e, 0x44, 0x61, 0xae, 0x16,
0x6c, 0xc7, 0x23, 0xdc, 0xa8, 0xfd, 0xbe, 0x1c, 0xe7, 0x54, 0x05, 0x7f,
0xee, 0x14, 0xb2, 0x6b, 0x03, 0xa3, 0x5d, 0xb2, 0x67, 0x14, 0xa4, 0xfa,
0xbf, 0x29, 0xcd, 0x51, 0x3a, 0x7c, 0x5a, 0x2b, 0x97, 0xf7, 0xc5, 0x72,
0xcf, 0x16, 0x9e, 0x56, 0x6c, 0x32, 0x4a, 0x71, 0xd3, 0x33, 0xed, 0x8f,
0xa4, 0x35, 0x5a, 0xaf, 0x67, 0x15, 0x52, 0xe7, 0xce, 0x4e, 0x9c, 0x66,
```

FIG. 8s

```
0x03, 0x5a, 0x8a, 0x66, 0x0e, 0x4e, 0x86, 0x64, 0x41, 0x89, 0x17, 0xab,
0xce, 0xff, 0x1e, 0xa5, 0x3c, 0x66, 0xe4, 0x58, 0x10, 0x6f, 0xea, 0xc1,
0x23, 0xe1, 0xab, 0xcf, 0xfb, 0x02, 0xbc, 0xda, 0x96, 0xe9, 0x1d, 0x49,
0xbb, 0x75, 0x28, 0xec, 0x78, 0xc4, 0x11, 0x9c, 0xaf, 0x87, 0xf5, 0x21,
0xd2, 0xb3, 0xea, 0x1d, 0xc5, 0x80, 0xa7, 0x20, 0xf0, 0x63, 0xaf, 0xfd,
0x04, 0xbe, 0x57, 0xf8, 0xc4, 0x08, 0xef, 0xd0, 0x86, 0xf7, 0x4a, 0x12,
0x81, 0x57, 0x0c, 0x66, 0xc8, 0x3f, 0xfa, 0xb9, 0x32, 0x8a, 0xa0, 0xd8,
0x52, 0xe4, 0x20, 0xd3, 0x34, 0xeb, 0x40, 0x62, 0x9c, 0x48, 0xef, 0x99,
0xbd, 0xf3, 0x19, 0xd3, 0x7d, 0x51, 0x1e, 0x8e, 0xfd, 0xb3, 0x33, 0xca,
0xf2, 0xb2, 0x0a, 0x88, 0xb7, 0x65, 0x1e, 0x54, 0xf4, 0xc9, 0x20, 0xfb,
0x8c, 0xc8, 0x38, 0x70, 0xa3, 0x2d, 0xdb, 0xb8, 0xf2, 0x29, 0xc6, 0xff,
0x9b, 0x1d, 0xab, 0xf1, 0xcf, 0x28, 0xea, 0x7d, 0x65, 0x2e, 0x82, 0xe7,
0xcc, 0x15, 0xc1, 0x94, 0xce, 0x2e, 0x9e, 0x45, 0x60, 0x75, 0x0e, 0x51,
0x93, 0x49, 0x39, 0x7f, 0x5e, 0x0c, 0x9f, 0x86, 0xde, 0x03, 0x55, 0xb9,
0x1e, 0xa8, 0x65, 0xe3, 0x2d, 0x63, 0xa1, 0x51, 0x37, 0x7b, 0x43, 0x95,
0xf9, 0x3b, 0xd7, 0x77, 0x3f, 0x82, 0x31, 0x56, 0x71, 0x3e, 0x7a, 0xa2,
0x29, 0x87, 0x3e, 0x51, 0x35, 0xb0, 0x9a, 0xc4, 0xeb, 0x32, 0xd9, 0x8c,
0xa9, 0x78, 0x92, 0x23, 0x6e, 0xe3, 0x49, 0x2c, 0x89, 0x72, 0x90, 0x0a,
0x60, 0xb8, 0x88, 0x06, 0xe0, 0x7a, 0x13, 0x62, 0x80, 0x04, 0x69, 0xb1,
0x3d, 0xdb, 0xbd, 0x05, 0x89, 0x45, 0x6a, 0x0f, 0x7d, 0x95, 0xe2, 0x22,
0xff, 0x93, 0xc5, 0x07, 0x71, 0x91, 0x4c, 0x0c, 0x62, 0xe1, 0x97, 0x06,
0xfd, 0x75, 0x17, 0x46, 0x83, 0xa1, 0x19, 0x47, 0xb2, 0xe0, 0x32, 0x53,
0x98, 0x71, 0xc0, 0x0e, 0xdd, 0xb3, 0x42, 0x50, 0x99, 0x61, 0x27, 0x4c,
0xf5, 0x88, 0x14, 0xcd, 0xff, 0xa1, 0xbe, 0x1d, 0xdd, 0xa9, 0xca, 0xf7,
0x2f, 0xb1, 0xf1, 0x5b, 0x2d, 0xa4, 0x8a, 0xd7, 0x49, 0xcd, 0x87, 0x3b,
0xb9, 0x0d, 0xd5, 0xb6, 0xfd, 0x08, 0xd7, 0x72, 0x32, 0x68, 0x03, 0xb4,
0xde, 0x0f, 0xc6, 0x90, 0xe7, 0xd0, 0x14, 0xd8, 0x6e, 0xe9, 0xbe, 0xa7,
0xdf, 0x04, 0x6f, 0x5c, 0x1e, 0x67, 0xb4, 0x4f, 0x2b, 0xce, 0x10, 0xdb,
0x58, 0xb5, 0x0c, 0xc6, 0xf1, 0x3d, 0xbf, 0xf6, 0x9f, 0xde, 0x21, 0xca,
0x37, 0xa2, 0xe8, 0x2d, 0xce, 0xac, 0x47, 0xe5, 0x72, 0x30, 0x81, 0x5e,
0x24, 0xec, 0x8f, 0xdb, 0x29, 0x4e, 0xac, 0x5f, 0x36, 0x4b, 0xdf, 0x89,
0x2d, 0xdd, 0xa1, 0xc3, 0x43, 0xb4, 0x27, 0x62, 0xb6, 0x3f, 0xe5, 0xa6,
0x6d, 0x3b, 0xde, 0x82, 0x6d, 0x3e, 0x82, 0xb7, 0x02, 0x59, 0xa5, 0x4e,
0x1a, 0x95, 0xc9, 0x05, 0xdf, 0x7e, 0xad, 0x08, 0x69, 0xb5, 0x53, 0x3b,
0x8a, 0x2c, 0xe8, 0x8a, 0x29, 0x5e, 0x74, 0x1a, 0x4e, 0x7b, 0xc6, 0x20,
0xcf, 0xff, 0x60, 0x14, 0x93, 0xf7, 0x06, 0x53, 0xf2, 0x7e, 0x19, 0x60,
0x8f, 0x66, 0xae, 0x15, 0xb9, 0xcf, 0x97, 0x2a, 0x69, 0xa0, 0xf3, 0x21,
0xac, 0x33, 0x4d, 0xb5, 0x5a, 0x0f, 0x7f, 0x63, 0x1a, 0x88, 0xf3, 0x3d,
0xd4, 0x9e, 0xe3, 0x19, 0xf6, 0x38, 0x5f, 0xa4, 0x3f, 0xfe, 0x7a, 0xa1,
0x16, 0x9a, 0x6d, 0x46, 0x2c, 0x81, 0x59, 0x95, 0x6e, 0x4b, 0xba, 0x5a,
0x1d, 0xff, 0x8c, 0xbe, 0x0c, 0xf5, 0xad, 0xd5, 0x7f, 0xb5, 0x48, 0xa6,
0x6e, 0x19, 0xcd, 0x7a, 0xd8, 0x15, 0xab, 0x58, 0xba, 0x14, 0x5b, 0xea,
0x88, 0x16, 0xef, 0x9e, 0xd4, 0x55, 0xc2, 0x0d, 0xf9, 0x91, 0xc0, 0x07,
0xf4, 0xc4, 0x15, 0xd2, 0xfb, 0x2e, 0xcc, 0xf6, 0x6b, 0x33, 0xeb, 0x73,
0xbc, 0x32, 0xee, 0xc9, 0x37, 0xe0, 0x9e, 0xd8, 0x04, 0x6b, 0x45, 0x77,
0xd1, 0xed, 0x08, 0xc1, 0xe2, 0x9c, 0x11, 0x6a, 0x44, 0x98, 0x3d, 0xe5,
0x75, 0x32, 0x6d, 0xa3, 0xcf, 0x42, 0xea, 0x34, 0xc6, 0xe3, 0x2c, 0x9a,
0xec, 0x47, 0x78, 0xf8, 0x54, 0x83, 0x44, 0x67, 0x0a, 0x84, 0x9f, 0xee,
0x40, 0xc3, 0x31, 0xfc, 0xb3, 0x9b, 0x2f, 0xb8, 0x7e, 0x46, 0x06, 0x76,
0xab, 0x8a, 0xe6, 0xc5, 0x86, 0x1e, 0x5c, 0xdd, 0x53, 0x25, 0xe6, 0x89,
0xc4, 0x11, 0xd8, 0xb1, 0xfb, 0x0d, 0xd5, 0x75, 0x9a, 0x40, 0x6e, 0x26,
0x56, 0x78, 0x46, 0x13, 0x3e, 0xd3, 0x07, 0xfb, 0xc0, 0x98, 0xf4, 0x02,
0xbc, 0x80, 0xe8, 0x3e, 0xf9, 0x77, 0x28, 0xa6, 0x3a, 0x72, 0x5b, 0x34,
0x84, 0x1f, 0x8d, 0x64, 0x31, 0x59, 0xae, 0x50, 0x23, 0x95, 0x73, 0x43,
```

FIG. 8t

```
0x99, 0x82, 0x3c, 0xa1, 0x85, 0xa7, 0x22, 0x5d, 0x9c, 0x4d, 0x19, 0x7b,
0x97, 0x6e, 0x22, 0x60, 0xa4, 0xf4, 0xc8, 0x11, 0xb3, 0x40, 0x8e, 0xa7,
0x6a, 0x36, 0xf8, 0x85, 0xb0, 0x0a, 0x7b, 0xb5, 0x23, 0xbf, 0xe2, 0x86,
0x20, 0x56, 0xb0, 0x7c, 0x1e, 0x50, 0x6e, 0x41, 0x86, 0x23, 0xa1, 0xcc,
0x1b, 0xe5, 0xb3, 0xda, 0xba, 0xff, 0x6f, 0x1e, 0x87, 0xd4, 0x75, 0x25,
0x52, 0xe1, 0x6c, 0x10, 0x97, 0xff, 0xc8, 0x3c, 0xbe, 0x65, 0x28, 0x4e,
0x02, 0xcc, 0x30, 0xb2, 0x7c, 0xd0, 0x05, 0xa2, 0xff, 0x4a, 0x32, 0x65,
0x1e, 0x80, 0xad, 0x34, 0xe2, 0xc2, 0x15, 0xea, 0xcd, 0xa7, 0xc3, 0xe7,
0x5f, 0x2a, 0x76, 0x37, 0x55, 0x73, 0x31, 0x48, 0x99, 0x61, 0x23, 0x6c,
0xa8, 0x91, 0xd8, 0x03, 0xfe, 0xcc, 0xaf, 0xd9, 0x09, 0xf6, 0xab, 0xdc,
0xcb, 0x1b, 0xe9, 0x85, 0xd3, 0x2d, 0xe7, 0xae, 0x6b, 0x1b, 0xe3, 0x08,
0x48, 0xf1, 0xc5, 0x0f, 0xfe, 0xd1, 0xa9, 0x43, 0xf8, 0x10, 0xe7, 0xc4,
0x81, 0x33, 0x5b, 0x80, 0x2e, 0x68, 0xfe, 0x46, 0x22, 0x8e, 0xd2, 0x48,
0xc9, 0xef, 0x33, 0xd5, 0x61, 0x9f, 0x49, 0x10, 0xc4, 0x8f, 0xd7, 0x04,
0xf4, 0xab, 0xc0, 0xff, 0x09, 0xc5, 0x69, 0x10, 0x88, 0x3a, 0x9b, 0x2b,
0x8b, 0x54, 0x39, 0xde, 0x02, 0x47, 0x94, 0xd8, 0x0a, 0xca, 0x58, 0xeb,
0x28, 0x65, 0x9e, 0x5a, 0xd9, 0x0e, 0xef, 0xbc, 0x9f, 0xe2, 0x91, 0xf3,
0x39, 0xa9, 0x5a, 0x1a, 0x72, 0x96, 0xa7, 0xed, 0xc3, 0x42, 0xf4, 0x6d,
0x08, 0x5c, 0x7e, 0x93, 0x3c, 0x6c, 0x1f, 0x7a, 0xbe, 0xf0, 0xa4, 0xc5,
0x12, 0xe5, 0xad, 0xc8, 0xef, 0x37, 0xbf, 0x09, 0xcd, 0x4f, 0x3f, 0x63,
0x7e, 0x22, 0x4b, 0x93, 0x65, 0x3f, 0x50, 0x2a, 0x78, 0x95, 0x36, 0x61,
0xb5, 0x4d, 0x0a, 0x57, 0xee, 0xb3, 0x27, 0xbb, 0x74, 0x90, 0x3d, 0x6c,
0x2c, 0x74, 0x58, 0xcd, 0x2a, 0xac, 0x8f, 0x46, 0x19, 0xb0, 0xe1, 0xa8,
0xce, 0x1e, 0x9c, 0x7d, 0xd1, 0x04, 0xab, 0x29, 0x6b, 0x97, 0x52, 0x1a,
0x81, 0xfb, 0x2f, 0x9a, 0xf6, 0x70, 0x3d, 0x6a, 0x8b, 0x5a, 0x14, 0x99,
0x79, 0xdb, 0x3f, 0xf2, 0xb6, 0x53, 0x06, 0x71, 0xce, 0x17, 0x9a, 0xc4,
0xa5, 0xf1, 0xb5, 0x41, 0x8b, 0xa3, 0x3b, 0x89, 0xb5, 0x15, 0xe0, 0x80,
0x21, 0x49, 0x91, 0x66, 0x3f, 0x59, 0x76, 0x10, 0x49, 0xbe, 0x80, 0xea,
0x3b, 0xde, 0x51, 0x02, 0x7a, 0x5b, 0x27, 0x98, 0xd6, 0xb0, 0xf8, 0x2f,
0xd5, 0x02, 0xfa, 0xac, 0x10, 0x89, 0x48, 0xdf, 0x9e, 0x25, 0x89, 0x59,
0x1b, 0x7b, 0xdb, 0x80, 0xee, 0x18, 0xbf, 0xe6, 0x9d, 0xbc, 0x12, 0xf2,
0xc6, 0xa7, 0xe6, 0xbc, 0x02, 0xf0, 0xc7, 0x10, 0xfc, 0x99, 0xd8, 0x33,
0x76, 0x8b, 0x46, 0x9d, 0xd6, 0x15, 0xe1, 0xaa, 0xbf, 0xe6, 0x02, 0x99,
0x62, 0x3a, 0x6f, 0xce, 0xfc, 0x84, 0x07, 0x51, 0x74, 0xe5, 0x0e, 0xb4,
0xea, 0x6d, 0x42, 0xf4, 0x12, 0xbf, 0x74, 0xed, 0x02, 0xce, 0x7a, 0xb3,
0x4d, 0x26, 0xb8, 0xe8, 0x31, 0xc9, 0xe1, 0x28, 0x48, 0xa4, 0x72, 0x2f,
0x92, 0xd1, 0xfa, 0xad, 0x44, 0xec, 0x69, 0x31, 0x73, 0x59, 0x14, 0x72,
0xfa, 0x1e, 0xc1, 0x62, 0xcf, 0x4d, 0x33, 0xad, 0xf5, 0xb6, 0xd4, 0x17,
0xfc, 0xc2, 0x21, 0xd6, 0x8f, 0xf9, 0x2b, 0xce, 0x65, 0xc0, 0x21, 0xd7,
0xad, 0xe9, 0xc9, 0x16, 0x76, 0x50, 0x1b, 0x66, 0xb8, 0x46, 0x98, 0x52,
0xe5, 0x20, 0x69, 0x84, 0x44, 0x6d, 0xf7, 0x0d, 0xd3, 0x65, 0xa9, 0x53,
0x35, 0x65, 0x79, 0x2a, 0x53, 0xdf, 0x74, 0x2f, 0x81, 0x58, 0x16, 0x7e,
0x5f, 0x3f, 0x8f, 0x7a, 0x3a, 0x63, 0x80, 0xb8, 0x13, 0xcb, 0xfd, 0x6a,
0x31, 0x55, 0x85, 0x46, 0x93, 0x1f, 0x83, 0xae, 0xed, 0xb9, 0x0a, 0x95,
0x5e, 0x39, 0xc0, 0xf2, 0x43, 0xad, 0x69, 0x32, 0x52, 0x8f, 0xb9, 0x3a,
0x9c, 0xe2, 0x3e, 0xa0, 0x58, 0x1e, 0x61, 0xe7, 0x09, 0xda, 0xa2, 0x16,
0x9a, 0x7c, 0x3c, 0x6d, 0xef, 0xbf, 0x1a, 0xe2, 0x44, 0x5d, 0x80, 0x20,
0x6b, 0xa9, 0x0c, 0xf7, 0x9c, 0x26, 0xe6, 0x94, 0x2f, 0x56, 0xee, 0x03,
0x99, 0xf9, 0x6d, 0x08, 0x7a, 0x5e, 0x36, 0x78, 0x93, 0x39, 0x65, 0xb3,
0x53, 0x09, 0x5e, 0x97, 0x0f, 0xaa, 0x8b, 0x57, 0x3c, 0x86, 0x32, 0xb5,
0xef, 0x37, 0xd2, 0x9e, 0xeb, 0x5f, 0xd8, 0x35, 0xc9, 0xa6, 0xff, 0x04,
0xd7, 0xb9, 0x3b, 0x95, 0xb5, 0x42, 0xfa, 0x22, 0xbc, 0x91, 0xf3, 0xa2,
0x0a, 0x97, 0x40, 0xd6, 0xbe, 0x23, 0xcf, 0xff, 0x9c, 0xbd, 0x1c, 0xdd,
0xb0, 0xd3, 0x21, 0xf5, 0x5a, 0x39, 0xa5, 0x03, 0xdc, 0xb9, 0xf7, 0x0c,
```

FIG. 8u

```
0xd4, 0x5d, 0xfb, 0x49, 0x25, 0x7d, 0xd6, 0x1c, 0xe8, 0x8a, 0xa2, 0x18,
0x84, 0xc6, 0x3e, 0xfa, 0xbf, 0x1f, 0xde, 0x76, 0x60, 0x22, 0x84, 0xda,
0xc5, 0xb0, 0x33, 0xa1, 0x76, 0x5f, 0x37, 0x6e, 0xfa, 0x0c, 0xd5, 0x9d,
0x8a, 0x02, 0x5e, 0xa6, 0xc7, 0x0f, 0xbf, 0xe7, 0x2e, 0xbd, 0x7f, 0xd0,
0x43, 0xaf, 0xc9, 0x3d, 0xd8, 0x80, 0xab, 0x75, 0x22, 0xb1, 0x8c, 0xc9,
0x29, 0xe5, 0x9e, 0xd2, 0x06, 0xea, 0xa1, 0xe0, 0x1d, 0xc7, 0xdd, 0xaf,
0x48, 0x30, 0xce, 0x6c, 0xe1, 0x0e, 0x5f, 0x91, 0x49, 0xa6, 0x7b, 0x0f,
0x88, 0x26, 0xc1, 0x79, 0x48, 0x6e, 0x41, 0xb1, 0x19, 0x99, 0x5b, 0xd9,
0x31, 0x89, 0x05, 0x76, 0xe0, 0x10, 0xcd, 0x3e, 0xc4, 0xfb, 0x6e, 0x52,
0x06, 0x73, 0x93, 0x2c, 0x4c, 0xe4, 0x5a, 0x30, 0x74, 0x05, 0x4d, 0xa9,
0x74, 0xe2, 0x24, 0x71, 0x9d, 0x79, 0x26, 0x8d, 0x3b, 0x95, 0xc7, 0x10,
0xdd, 0x5d, 0x9c, 0x4c, 0x2d, 0x67, 0xcf, 0x58, 0x29, 0xdf, 0x8c, 0x16,
0x78, 0x5c, 0x08, 0xa2, 0xfe, 0xb6, 0x0d, 0x68, 0x47, 0x8f, 0xd8, 0x15,
0xff, 0xba, 0xcd, 0x43, 0xaf, 0x63, 0xbb, 0x4b, 0x1f, 0xd0, 0xfc, 0x8e,
0x23, 0x6a, 0x3f, 0x97, 0x51, 0xdb, 0x59, 0x18, 0x72, 0x86, 0x06, 0x5c,
0xb7, 0x11, 0xd2, 0x45, 0xe8, 0x37, 0x5b, 0xf2, 0x4c, 0x12, 0x66, 0xb4,
0x4f, 0x2a, 0x78, 0x43, 0x8d, 0x74, 0x38, 0x7c, 0xe5, 0x94, 0xfd, 0x1d,
0xbf, 0xa7, 0xf6, 0xcf, 0x05, 0xe2, 0x59, 0xfe, 0x3f, 0xaa, 0x09, 0x96,
0x16, 0xde, 0x8e, 0x36, 0x51, 0xe8, 0x7a, 0x24, 0x6b, 0xe3, 0xca, 0x5c,
0x98, 0x4a, 0x25, 0x63, 0x87, 0x20, 0xa8, 0xe7, 0xb4, 0xdd, 0x45, 0xc3,
0x0b, 0xa9, 0x80, 0xf7, 0x40, 0xbe, 0xe8, 0x96, 0x0e, 0xb6, 0x8e, 0xf2,
0x4e, 0x17, 0xcd, 0x6a, 0xe9, 0x78, 0x2b, 0x66, 0xc0, 0x38, 0xf1, 0xb4,
0xd8, 0x0e, 0xb1, 0xf7, 0x9a, 0x02, 0x68, 0xcb, 0x9f, 0xf1, 0xce, 0x2e,
0x4e, 0xa5, 0xdf, 0x2b, 0xf5, 0x79, 0x3c, 0x57, 0x89, 0x20, 0x97, 0xe3,
0x29, 0x86, 0xf5, 0x30, 0xb1, 0x78, 0x52, 0x35, 0xdf, 0x9e, 0xf5, 0x82,
0x04, 0x9f, 0x39, 0xe5, 0xc0, 0x34, 0xf8, 0x91, 0xe1, 0x6e, 0x1c, 0x55,
0xbb, 0x82, 0x19, 0x9f, 0xb7, 0xd8, 0x32, 0xf9, 0x89, 0xd3, 0x11, 0xff,
0xbf, 0x5b, 0xf2, 0x18, 0xc2, 0x65, 0x07, 0x85, 0x44, 0x74, 0x55, 0x1e,
0x65, 0x88, 0x2a, 0xc5, 0x78, 0xdc, 0x63, 0xf1, 0xa6, 0x28, 0xbb, 0xf4,
0xa5, 0xc7, 0x0b, 0xfd, 0x9b, 0x47, 0xa7, 0x2e, 0xbf, 0xff, 0xa8, 0xdb,
0xb7, 0x4a, 0x15, 0x7f, 0x63, 0x37, 0x8c, 0xef, 0x75, 0xd4, 0x15, 0xc5,
0x93, 0x7c, 0x2d, 0x6a, 0xd8, 0x3c, 0x58, 0xbb, 0x2e, 0xae, 0xee, 0x46,
0xbd, 0x19, 0xe0, 0x91, 0xa8, 0x70, 0x04, 0x81, 0x60, 0x7f, 0x1d, 0x4a,
0x7e, 0xae, 0x4e, 0xe2, 0x31, 0x48, 0x93, 0x6d, 0x18, 0x7b, 0x40, 0x70,
0xae, 0x07, 0xc7, 0xe0, 0xa9, 0x48, 0x04, 0x78, 0x51, 0x18, 0x9a, 0x5f,
0xe5, 0x8c, 0x14, 0xa6, 0x7b, 0x45, 0xd0, 0x1a, 0xc3, 0xfe, 0x84, 0xa4,
0x22, 0x62, 0xcf, 0x4c, 0x2b, 0xa4, 0xff, 0x8c, 0xd6, 0x0c, 0xe1, 0x3b,
0x5f, 0x7a, 0x93, 0x1c, 0x55, 0xa3, 0x64, 0x33, 0x93, 0x03, 0xa3, 0x4c,
0x28, 0x8b, 0xbc, 0x3a, 0xea, 0xa2, 0x29, 0x9b, 0xb8, 0xda, 0x9f, 0x13,
0x52, 0xb9, 0x8d, 0x3d, 0xd0, 0x70, 0x08, 0x5d, 0x73, 0x1c, 0x4b, 0xb8,
0x76, 0x13, 0xf1, 0x6d, 0x18, 0x7c, 0x58, 0x02, 0x82, 0xec, 0xc7, 0x2e,
0xf8, 0xaa, 0x19, 0x58, 0x93, 0x3d, 0x69, 0x26, 0x58, 0xee, 0xcd, 0x16,
0xad, 0x85, 0xdf, 0x09, 0x62, 0x91, 0x73, 0x06, 0x99, 0x7f, 0x3e, 0x51,
0xf5, 0x21, 0xc7, 0x41, 0xfd, 0xb9, 0xde, 0x34, 0xc6, 0xed, 0x22, 0xa8,
0x82, 0x0e, 0xae, 0xd8, 0xba, 0xeb, 0x9c, 0xcb, 0x1a, 0x8b, 0x65, 0x26,
0x79, 0xea, 0xa3, 0xc6, 0xed, 0xad, 0xd8, 0x08, 0xbe, 0x40, 0xeb, 0xc9,
0x09, 0xb1, 0x30, 0x6b, 0xa3, 0x47, 0x6a, 0x0a, 0xf2, 0x82, 0xa4, 0x0f,
0x88, 0xb3, 0x5b, 0x35, 0xa9, 0x6e, 0xb2, 0x8f, 0xd3, 0x02, 0xed, 0xc1,
0x38, 0xe7, 0xb7, 0xdb, 0x21, 0xca, 0x82, 0xe7, 0xd2, 0x52, 0xf5, 0x62,
0xd1, 0x11, 0xc7, 0xfa, 0x4a, 0x39, 0x76, 0xd5, 0x33, 0xf5, 0x20, 0x54,
0xfb, 0x39, 0xb0, 0x43, 0x98, 0xe6, 0x89, 0xd5, 0x20, 0xa0, 0x45, 0x8d,
0xd7, 0x40, 0xe5, 0xb0, 0x29, 0x64, 0x95, 0x52, 0x0d, 0x7d, 0xcc, 0x22,
0xbe, 0xfb, 0xaf, 0xdd, 0x09, 0xb3, 0x42, 0x50, 0xff, 0x5f, 0x22, 0x9f,
0xf9, 0xcf, 0x32, 0xc2, 0x60, 0xfc, 0xcd, 0x0b, 0xbc, 0x5d, 0xe7, 0x77,
```

FIG. 8v

```
0x25, 0x51, 0x7a, 0xa1, 0x70, 0x12, 0x55, 0xbe, 0x67, 0xe6, 0x26, 0x82,
0x51, 0x03, 0x61, 0xfc, 0x4c, 0xd9, 0xb7, 0xf4, 0x12, 0xbf, 0x63, 0x23,
0x5c, 0x7e, 0x38, 0x4e, 0x9f, 0x6e, 0x2e, 0x5e, 0x71, 0xe3, 0x52, 0xf0,
0x8e, 0x27, 0xe2, 0xa7, 0x55, 0x32, 0xc5, 0xea, 0x42, 0xd7, 0x05, 0xeb,
0x25, 0x51, 0xf6, 0x66, 0x29, 0x49, 0x95, 0x63, 0x82, 0x0a, 0x8b, 0x42,
0x54, 0xf6, 0x5e, 0x3e, 0x9d, 0x0f, 0xa8, 0x7e, 0x31, 0x51, 0x85, 0x6d,
0x0a, 0xe6, 0x60, 0xb2, 0x80, 0x03, 0x73, 0x94, 0x11, 0x84, 0xd2, 0xef,
0x2b, 0xc1, 0x66, 0x30, 0x5e, 0xe0, 0xc6, 0x08, 0xb4, 0x72, 0x35, 0x95,
0xf6, 0x13, 0xd4, 0xb3, 0xd9, 0x49, 0xe9, 0x65, 0x03, 0x77, 0x47, 0x9f,
0x87, 0x1e, 0x6f, 0x8b, 0xc0, 0x33, 0xca, 0x7d, 0x4b, 0x1f, 0x7d, 0xe4,
0x43, 0xaa, 0x1c, 0x67, 0xa0, 0x47, 0x99, 0x16, 0xaa, 0xd3, 0x09, 0xf6,
0x42, 0xd2, 0x91, 0xff, 0x39, 0xc8, 0x5d, 0xf8, 0x3b, 0xab, 0x28, 0x96,
0x79, 0x30, 0x5e, 0x9f, 0x4a, 0x2f, 0x74, 0xd5, 0x0e, 0xfc, 0xb0, 0xcf,
0xf3, 0x1e, 0xc0, 0xff, 0x9a, 0x17, 0x7b, 0xc6, 0x0e, 0xce, 0x3e, 0x93,
0xda, 0x8b, 0x16, 0x61, 0x72, 0x1e, 0x79, 0xba, 0x8e, 0x3d, 0xc9, 0x1b,
0xe7, 0xb5, 0xd5, 0x2c, 0xf4, 0xce, 0x19, 0x6f, 0x91, 0xa4, 0x14, 0x88,
0xb4, 0x6d, 0x20, 0xdf, 0xc0, 0xac, 0xec, 0x1b, 0x91, 0xad, 0x23, 0xee,
0x42, 0xc4, 0xe0, 0xb2, 0x63, 0x9b, 0x50, 0x14, 0x5f, 0xa8, 0x02, 0xf5,
0xb4, 0x73, 0x36, 0x54, 0xf7, 0x21, 0xd3, 0x7f, 0x48, 0x74, 0x33, 0x5f,
0x8c, 0x28, 0x84, 0xae, 0xd7, 0x2d, 0xea, 0x6a, 0x38, 0xf8, 0xd2, 0xa7,
0x02, 0x77, 0xe5, 0x11, 0xbc, 0xdd, 0xa9, 0x0f, 0x6c, 0x2d, 0x8a, 0xef,
0xd2, 0x34, 0xbf, 0xe0, 0x3c, 0x8e, 0x64, 0x2c, 0x7f, 0xb5, 0x63, 0x06,
0x4b, 0x9a, 0x1c, 0xbe, 0x93, 0xe0, 0xc0, 0x13, 0xe4, 0xa4, 0x0b, 0x84,
0xcb, 0xf0, 0x90, 0xb2, 0x49, 0x27, 0x66, 0x87, 0x12, 0x75, 0x93, 0x4d,
0x36, 0xd9, 0xb5, 0x40, 0x68, 0xa1, 0x6b, 0x1b, 0xbf, 0x43, 0xfd, 0xab,
0xc2, 0xf4, 0x39, 0xd4, 0x9f, 0x71, 0x09, 0x8f, 0x79, 0x59, 0x11, 0x89,
0x6a, 0x3c, 0xa5, 0xed, 0xcf, 0x27, 0xc1, 0x33, 0xcd, 0xf0, 0x46, 0x68,
0x02, 0x8c, 0x3f, 0xce, 0x5a, 0xc2, 0x74, 0x15, 0x64, 0x8d, 0x4c, 0x1e,
0xb8, 0xe9, 0x33, 0xbd, 0x7c, 0xe2, 0x50, 0x3f, 0x8d, 0x11, 0xec, 0x7c,
0xa1, 0x5e, 0x0d, 0xad, 0xdb, 0xb7, 0xf1, 0x06, 0xc9, 0xfe, 0x99, 0x3d,
0x58, 0x81, 0xcc, 0x10, 0xb6, 0x94, 0x4e, 0x28, 0xf3, 0x9f, 0x44, 0x6b,
0x8d, 0x5d, 0x3b, 0x97, 0xea, 0xca, 0xb2, 0x4e, 0x29, 0x77, 0x0d, 0x6e,
0x57, 0xf0, 0xba, 0xd5, 0x16, 0xea, 0x27, 0xd8, 0xb3, 0xf1, 0x6c, 0x0b,
0x76, 0x5a, 0x43, 0x72, 0xc8, 0x41, 0xf9, 0x35, 0x9a, 0x54, 0x1b, 0xe6,
0x83, 0xd9, 0x9e, 0x34, 0x4b, 0xb6, 0xd8, 0x03, 0xa9, 0x65, 0x23, 0x8d,
0xfa, 0x2f, 0xe5, 0x86, 0x02, 0x55, 0x7a, 0x25, 0x49, 0x99, 0x5f, 0x13,
0x4c, 0xfe, 0xa6, 0xd8, 0x40, 0xf8, 0xa2, 0xbe, 0x20, 0xc5, 0x89, 0x4f,
0x06, 0x6c, 0xfb, 0x55, 0x09, 0x7f, 0xa0, 0xb7, 0xff, 0x34, 0x6b, 0xa8,
0x47, 0xfc, 0x36, 0xd3, 0xa1, 0xf7, 0x30, 0xd5, 0x58, 0x06, 0x80, 0xfe,
0x22, 0xcf, 0x94, 0xc6, 0x1e, 0xab, 0xd0, 0x2b, 0xc0, 0xe6, 0x96, 0x3f,
0x69, 0x1a, 0x7a, 0x95, 0x45, 0x6b, 0x17, 0xba, 0xf3, 0x9a, 0x1d, 0x51,
0xe2, 0x71, 0x13, 0x86, 0x65, 0x3a, 0xc5, 0xec, 0x2b, 0xbf, 0xfe, 0x79,
0x17, 0x54, 0x84, 0x02, 0x9a, 0xac, 0xff, 0xc6, 0x92, 0x21, 0x4c, 0x9f,
0x71, 0x35, 0xa0, 0x8c, 0x54, 0x31, 0x88, 0xe4, 0xc8, 0x2e, 0xf3, 0x8c,
0x22, 0x5b, 0xb4, 0x65, 0xdf, 0x02, 0xa0, 0x3b, 0x5f, 0xb5, 0x06, 0xcb,
0xe8, 0x8c, 0x2c, 0x5d, 0xe1, 0x7b, 0xed, 0x07, 0xb0, 0x7b, 0xc5, 0x3a,
0xed, 0xd0, 0xa3, 0xe1, 0x0b, 0xbc, 0x80, 0xe4, 0x33, 0xc1, 0x57, 0x21,
0xa7, 0x30, 0x75, 0xde, 0x4b, 0xfd, 0x75, 0x2d, 0xdf, 0x41, 0xa7, 0x8f,
0xd5, 0x3b, 0xe1, 0x24, 0x79, 0xd0, 0x13, 0xe4, 0x7f, 0x06, 0x81, 0xb6,
0x58, 0x0c, 0x67, 0x91, 0x28, 0xc5, 0x61, 0xa8, 0x49, 0x0d, 0x63, 0xf8,
0x5b, 0x45, 0x89, 0x6e, 0x1a, 0x46, 0x79, 0xfa, 0x28, 0xc7, 0x58, 0xde,
0xbd, 0x36, 0xe0, 0x0a, 0x70, 0x43, 0xb0, 0x88, 0xc9, 0x2e, 0xeb, 0xbb,
0xd9, 0x98, 0x1a, 0x79, 0x93, 0x05, 0x49, 0xa0, 0xd6, 0x31, 0xf7, 0xb8,
0xe3, 0x5c, 0x46, 0x15, 0xaa, 0xe2, 0x03, 0x8a, 0xfb, 0x52, 0xc1, 0x75,
```

FIG. 8w

```
0x15, 0xcc, 0xac, 0x4b, 0x17, 0x81, 0xb3, 0x05, 0xed, 0x94, 0xd5, 0x18,
0xc1, 0x78, 0xff, 0xc9, 0x20, 0xe2, 0x54, 0x98, 0x65, 0x14, 0xf9, 0x99,
0xbe, 0x34, 0xca, 0x5c, 0xd7, 0x4f, 0x1f, 0xa4, 0x8b, 0x6b, 0x2d, 0xc7,
0x73, 0xf0, 0x27, 0xcb, 0x67, 0x8c, 0x10, 0x82, 0xe3, 0x55, 0x04, 0x9c,
0x68, 0x0f, 0xaf, 0x95, 0xbb, 0x76, 0xd9, 0x22, 0x6f, 0x5c, 0x12, 0x96,
0x55, 0xb0, 0x8c, 0x21, 0xb4, 0xd6, 0x43, 0xef, 0x26, 0xd2, 0xad, 0xe7,
0x7a, 0xf4, 0x3e, 0xd7, 0x7b, 0x9f, 0x2a, 0x83, 0xb7, 0xdd, 0x06, 0xff,
0x9a, 0xd4, 0xb8, 0x04, 0x9e, 0xeb, 0x3b, 0x8e, 0x1e, 0x73, 0x93, 0xab,
0x2a, 0xd1, 0xfc, 0x6d, 0x06, 0xa4, 0x45, 0x9e, 0x56, 0x0b, 0xfa, 0x50,
0xcc, 0xe2, 0x26, 0xad, 0x66, 0x92, 0x41, 0x6e, 0x20, 0x84, 0xdb, 0x6d,
0x34, 0x7d, 0xb6, 0x3f, 0xca, 0x0d, 0xe6, 0x42, 0xdd, 0x65, 0x97, 0x25,
0xfe, 0x65, 0xd4, 0x4b, 0xac, 0x67, 0x2a, 0x4b, 0xaa, 0x5c, 0x2e, 0x7e,
0x94, 0x3f, 0x79, 0xf5, 0x26, 0xc2, 0x7b, 0x47, 0x1c, 0x8a, 0x43, 0x75,
0xa4, 0x12, 0x70, 0xf7, 0x51, 0x1a, 0x93, 0x42, 0x59, 0xaa, 0x4f, 0x03,
0xab, 0xef, 0xd1, 0x3b, 0xb2, 0x80, 0xc4, 0x36, 0xe8, 0xcd, 0x1b, 0x5f,
0xf1, 0x51, 0x18, 0xb7, 0xee, 0xaa, 0xc6, 0xf3, 0x2c, 0x6e, 0xf7, 0x4c,
0x2f, 0x60, 0x72, 0x17, 0x94, 0x7b, 0x46, 0x16, 0x36, 0xab, 0x8a, 0x19,
0xb2, 0xeb, 0xca, 0x13, 0xa2, 0x3b, 0x62, 0xb5, 0x52, 0x31, 0x80, 0x60,
0x45, 0x7b, 0xab, 0x0b, 0xf7, 0xcd, 0x48, 0xee, 0x62, 0x13, 0x94, 0x3b,
0x55, 0xf2, 0x6b, 0x22, 0x84, 0xb8, 0x6c, 0x31, 0x95, 0x6e, 0x5c, 0xf1,
0x0c, 0xc9, 0xda, 0x13, 0xbf, 0x38, 0xc9, 0xa5, 0xf8, 0x25, 0xd7, 0x61,
0xa7, 0x6f, 0x23, 0x81, 0x9c, 0x02, 0xec, 0x57, 0xb6, 0x7f, 0x32, 0x76,
0xd2, 0x10, 0xe7, 0x8c, 0xf4, 0x41, 0xbd, 0x12, 0xec, 0xc2, 0x0d, 0xae,
0x5a, 0x3a, 0xa1, 0xcf, 0xf0, 0x0f, 0xbc, 0xfd, 0x38, 0xdd, 0x9c, 0xc8,
0x0a, 0xe3, 0xb5, 0xfb, 0x15, 0xd7, 0x8c, 0x75, 0x2e, 0x4c, 0x98, 0x61,
0xfb, 0x17, 0xd9, 0x76, 0x97, 0x44, 0x84, 0x39, 0xa4, 0x0b, 0x9a, 0x7c,
0x34, 0x4e, 0x85, 0x41, 0xb5, 0x08, 0xc9, 0x9d, 0xed, 0xab, 0xdd, 0xc0,
0x38, 0xff, 0xb5, 0xd8, 0x51, 0x0e, 0xe0, 0x6c, 0x30, 0x5b, 0x88, 0x4f,
0x32, 0xf0, 0x89, 0xd6, 0x15, 0xec, 0xad, 0xd0, 0xe4, 0x18, 0xc2, 0x5f,
0x45, 0x89, 0x21, 0xc3, 0x86, 0xbc, 0x30, 0xe1, 0x81, 0xb1, 0x16, 0xcb,
0x3d, 0xe7, 0xa1, 0xdd, 0xb3, 0x1e, 0x88, 0xb8, 0x4d, 0x2b, 0x7d, 0x48,
0xe7, 0x92, 0x08, 0x57, 0x8b, 0x50, 0x18, 0x7f, 0xef, 0x38, 0xbc, 0xf9,
0x2f, 0xb0, 0x82, 0x40, 0xd7, 0x0c, 0xe9, 0x90, 0x21, 0x52, 0xb7, 0x65,
0x0a, 0x92, 0xdd, 0x48, 0x6b, 0x2b, 0x4c, 0xda, 0x8d, 0xea, 0x08, 0x5a,
0x93, 0x65, 0x2b, 0x94, 0x5c, 0x89, 0x27, 0x49, 0x7b, 0x8f, 0x3c, 0x74,
0x97, 0x33, 0xb5, 0xf6, 0xd0, 0x1a, 0xbe, 0x7a, 0x2b, 0x4a, 0x9e, 0x59,
0x24, 0xf6, 0xb8, 0xdb, 0x2a, 0xd0, 0xfe, 0x62, 0xc2, 0x04, 0xd7, 0x5d,
0xea, 0x89, 0x19, 0x65, 0x79, 0x0d, 0x51, 0x88, 0x5b, 0x02, 0x67, 0x91,
0xf1, 0x9d, 0xbf, 0x44, 0xfb, 0x03, 0xd0, 0xe5, 0x82, 0xc4, 0x22, 0x4c,
0x9c, 0x6d, 0x0e, 0x58, 0x2e, 0x6f, 0xf0, 0xa0, 0xd8, 0x33, 0xa4, 0x02,
0x50, 0xe7, 0x7b, 0xc4, 0x24, 0xd6, 0x74, 0xff, 0x94, 0x2a, 0x4a, 0x84,
0x08, 0xf7, 0x3a, 0xd7, 0x9c, 0xbd, 0xfc, 0xa8, 0x6a, 0x28, 0xef, 0x40,
0xd2, 0xb1, 0xe5, 0x2e, 0xc7, 0x54, 0x76, 0x1a, 0x4d, 0xd1, 0x65, 0xa0,
0x22, 0x5c, 0xc1, 0x48, 0xfb, 0x94, 0xd9, 0x3c, 0xc9, 0x24, 0x73, 0xb3,
0x92, 0xfb, 0x83, 0xbe, 0x22, 0x71, 0xb3, 0x35, 0xdc, 0xad, 0xcc, 0xe7,
0x04, 0xc0, 0xf2, 0xb0, 0xd6, 0x31, 0xbf, 0x06, 0xdf, 0x5d, 0x1e, 0x49,
0x9c, 0x7e, 0xeb, 0x08, 0xd2, 0xb7, 0xed, 0x0e, 0xad, 0x6f, 0x02, 0x7c,
0x5d, 0x42, 0x84, 0x25, 0xe7, 0x93, 0x1c, 0x95, 0x73, 0x3c, 0xe0, 0xc1,
0x40, 0xce, 0x2b, 0xe4, 0xa5, 0xce, 0x2c, 0xc3, 0x7d, 0x5e, 0x24, 0x7f,
0xb7, 0x9c, 0x28, 0xa4, 0x58, 0x0b, 0xaa, 0x74, 0xf4, 0x3d, 0xc8, 0x8d,
0xab, 0x3f, 0x88, 0x53, 0x15, 0x70, 0xff, 0xce, 0x38, 0xa8, 0x63, 0x0b,
0x4a, 0x96, 0x52, 0x03, 0x7d, 0xd6, 0x15, 0xc6, 0x66, 0x44, 0x93, 0x12,
0x70, 0x5e, 0x04, 0x85, 0x42, 0xb9, 0x7d, 0xa2, 0x6f, 0x0f, 0x92, 0x6d,
0x06, 0x92, 0xdc, 0xc1, 0x98, 0xf2, 0x16, 0xbe, 0xf7, 0x74, 0xa7, 0x15,
```

FIG. 8x

```
0xb4, 0x61, 0x2b, 0x76, 0xef, 0xa9, 0x38, 0xe4, 0x04, 0xcf, 0x59, 0x13,
0xa0, 0x44, 0xfa, 0x89, 0x16, 0x46, 0x58, 0x21, 0x85, 0x44, 0x71, 0x59,
0x1b, 0x63, 0xec, 0x4e, 0xcb, 0xa7, 0xe6, 0x0b, 0xc4, 0x5e, 0x26, 0x53,
0x8d, 0x67, 0x31, 0x66, 0xcd, 0x4f, 0xbe, 0xea, 0x99, 0xb1, 0x11, 0x9e,
0x45, 0x64, 0xfa, 0x29, 0xd3, 0xa5, 0x5d, 0x24, 0xa3, 0xfb, 0x8e, 0x1e,
0x64, 0xf3, 0x4b, 0x1c, 0xe7, 0x08, 0xca, 0xde, 0x55, 0x3d, 0x6e, 0x1c,
0xfd, 0x8f, 0xcd, 0x2a, 0xbe, 0x91, 0xdc, 0x1a, 0xfc, 0xc0, 0x07, 0xe2,
0xc5, 0x5a, 0x90, 0x45, 0x6c, 0xf3, 0x1f, 0xd4, 0xb7, 0xec, 0x30, 0xc1,
0x61, 0xae, 0x53, 0xeb, 0xa6, 0xd3, 0x1c, 0xef, 0x42, 0xe4, 0xc4, 0x23,
0xf4, 0x9a, 0x19, 0xdc, 0x2a, 0xf5, 0xc0, 0x44, 0xff, 0xa2, 0x42, 0x69,
0x0b, 0x77, 0x56, 0x3d, 0x96, 0x2b, 0xcf, 0x7a, 0xde, 0x03, 0xc2, 0x8a,
0x16, 0x5c, 0x7d, 0x1c, 0x67, 0xa8, 0x32, 0xe8, 0xd1, 0x59, 0xba, 0x2c,
0x71, 0xf5, 0x8d, 0xbc, 0x3b, 0xe2, 0x9c, 0x0e, 0xff, 0x90, 0xa9, 0x73,
0x26, 0x8c, 0x71, 0x94, 0xff, 0x36, 0xd5, 0xb0, 0xf3, 0x20, 0xd4, 0x8f,
0xff, 0x35, 0x77, 0x18, 0x4d, 0xf3, 0xc5, 0x38, 0xdc, 0x77, 0xb4, 0x4d,
0x0e, 0x8e, 0xee, 0x82, 0x04, 0x47, 0x74, 0xac, 0x11, 0x84, 0x97, 0xac,
0x38, 0x4a, 0x94, 0x72, 0x14, 0xf2, 0xa7, 0xba, 0x33, 0x5f, 0xe0, 0x4f,
0x02, 0x64, 0x36, 0x50, 0x71, 0x29, 0x49, 0x95, 0x7d, 0x25, 0xa2, 0xdf,
0x17, 0xb3, 0x7e, 0x5d, 0x39, 0x83, 0xa3, 0xdb, 0x1e, 0xf7, 0x87, 0x26,
0x5d, 0x83, 0x48, 0xa4, 0x7f, 0x31, 0x95, 0x48, 0xd2, 0x0d, 0x67, 0xba,
0x53, 0x39, 0x95, 0x5c, 0x75, 0x15, 0xea, 0x36, 0xda, 0x9f, 0xcd, 0xe6,
0x07, 0x4f, 0xe9, 0x57, 0x34, 0xa6, 0xf6, 0x45, 0xd3, 0xaf, 0xfe, 0xc8,
0x41, 0xbc, 0x79, 0x3e, 0x81, 0x99, 0x02, 0xde, 0xa5, 0xc8, 0x0b, 0xed,
0x75, 0xca, 0x29, 0xb3, 0x77, 0x3e, 0xc6, 0x11, 0xf8, 0x3f, 0x51, 0xb7,
0x16, 0x88, 0xa1, 0x63, 0x12, 0x4d, 0xb4, 0x5e, 0x1c, 0xa1, 0xde, 0xca,
0x27, 0x70, 0x87, 0x5a, 0xa5, 0x0a, 0x96, 0xe1, 0xbb, 0x32, 0x4f, 0xb8,
0x98, 0xc8, 0xe8, 0x3f, 0xdd, 0x33, 0xc7, 0x66, 0xd4, 0xb4, 0xf9, 0x2d,
0xb0, 0x89, 0x47, 0xdb, 0x81, 0x12, 0xa3, 0x79, 0xf9, 0xa3, 0xbc, 0xec,
0xa8, 0xd9, 0xb6, 0xf7, 0x37, 0xcc, 0x0c, 0xb9, 0x77, 0x35, 0xdc, 0xaa,
0xf9, 0x11, 0x6e, 0x44, 0x94, 0x6d, 0x0d, 0xb4, 0x33, 0xfd, 0xbb, 0xdd,
0x0e, 0xd5, 0xb2, 0x6a, 0x8a, 0xa9, 0x3d, 0xee, 0x8b, 0xd5, 0x1c, 0xe2,
0xca, 0xae, 0x23, 0x8b, 0xb6, 0x4a, 0x1b, 0xad, 0x82, 0xb6, 0x95, 0x1e,
0x84, 0x63, 0x1b, 0x6e, 0x94, 0x09, 0x4a, 0x9b, 0x73, 0xf5, 0x0d, 0xc3,
0xf1, 0x1d, 0x6d, 0x8b, 0x53, 0x1b, 0x68, 0x99, 0x47, 0x13, 0x63, 0xdc,
0x4e, 0xe7, 0x2c, 0x5e, 0xbb, 0xa5, 0x21, 0xe1, 0x57, 0x41, 0xe9, 0x2d,
0xc4, 0x7e, 0xe3, 0x07, 0xc4, 0x41, 0x6b, 0x94, 0xae, 0x06, 0xe5, 0xcb,
0x1b, 0xf5, 0x40, 0x5c, 0x74, 0xfe, 0x14, 0xd9, 0x65, 0x20, 0x8b, 0x65,
0xb4, 0x52, 0xfd, 0x17, 0x5e, 0x77, 0x0f, 0x52, 0xe1, 0x6b, 0x05, 0x9d,
0x3b, 0xf0, 0xbd, 0x42, 0xd1, 0x16, 0x82, 0x59, 0x0d, 0x77, 0x5b, 0x19,
0x6f, 0xeb, 0x68, 0x2f, 0xfb, 0x9c, 0x06, 0x4c, 0x91, 0xb3, 0x26, 0xf0,
0xc5, 0x34, 0xd0, 0xe6, 0x9c, 0x02, 0x70, 0x3d, 0x53, 0x74, 0x1e, 0xe8,
0x33, 0xce, 0x73, 0xae, 0x02, 0x61, 0x7b, 0x31, 0x4d, 0x92, 0x59, 0x6c,
0xf8, 0x2a, 0x96, 0x5f, 0x32, 0xff, 0x42, 0xc1, 0xef, 0x9c, 0xd4, 0x3e,
0xec, 0xbc, 0x24, 0xdf, 0x59, 0x28, 0x7f, 0x60, 0x2f, 0x4c, 0xcc, 0xff,
0x42, 0xc0, 0x36, 0xda, 0xad, 0xfa, 0x97, 0xc3, 0x02, 0x8d, 0xab, 0x82,
0xdc, 0x07, 0x64, 0xbb, 0x7c, 0xb3, 0x02, 0x71, 0xf9, 0x9c, 0x36, 0x96,
0x78, 0xeb, 0x0f, 0x55, 0xfb, 0x49, 0x2d, 0x94, 0x6f, 0x31, 0xb9, 0x9e,
0x21, 0xa5, 0x5d, 0x3c, 0xaf, 0xf8, 0x0f, 0xd4, 0x9e, 0x06, 0x98, 0x80,
0xef, 0x34, 0xc8, 0x91, 0xbf, 0x29, 0xee, 0xd0, 0x56, 0x26, 0x92, 0x6d,
0x2f, 0x4c, 0xe6, 0x25, 0xcd, 0x3f, 0x98, 0xd0, 0x86, 0x47, 0xa3, 0x89,
0x3f, 0x63, 0xce, 0x2b, 0x72, 0xdf, 0x57, 0x08, 0x4f, 0x8b, 0x77, 0x42,
0x5c, 0x84, 0x2b, 0xab, 0xc3, 0xf8, 0x9f, 0x07, 0x60, 0xff, 0x49, 0x27,
0xca, 0x98, 0xfb, 0xb4, 0x0d, 0xf1, 0xd0, 0x04, 0xc7, 0x7b, 0xed, 0xd2,
0x90, 0x13, 0x68, 0x8a, 0x0a, 0x4f, 0xb2, 0x7c, 0x2b, 0x64, 0x7d, 0xc4,
```

FIG. 8y

```
0x13, 0xe6, 0x9e, 0xd7, 0xb4, 0x9e, 0x79, 0x0e, 0x95, 0xe6, 0x8c, 0x72,
0x23, 0x5b, 0x3e, 0x79, 0xa8, 0x1f, 0xf6, 0x53, 0x34, 0x8c, 0x9d, 0xf4,
0x2a, 0xd9, 0x90, 0xa9, 0x4a, 0x1f, 0x5d, 0xf2, 0x2c, 0xb0, 0x89, 0x1d,
0xd1, 0x85, 0xbe, 0x50, 0xd7, 0x8b, 0xec, 0x02, 0xd3, 0x8e, 0xe4, 0x86,
0x2e, 0x7b, 0x55, 0x3a, 0x7f, 0xe2, 0x2f, 0xbe, 0x1e, 0xa4, 0xdd, 0x5d,
0x1b, 0x85, 0x41, 0xb5, 0x8c, 0xc9, 0x0a, 0xe3, 0xc6, 0xa2, 0xbc, 0x90,
0xfe, 0xae, 0x30, 0xef, 0x03, 0xc3, 0xe3, 0x1a, 0xc1, 0x79, 0xe9, 0xad,
0x16, 0xbb, 0x7b, 0xd6, 0xae, 0xe9, 0x19, 0xbe, 0xa6, 0xf3, 0xcf, 0x15,
0x8d, 0x62, 0x44, 0xc5, 0x95, 0xb0, 0x16, 0x84, 0xea, 0x50, 0x18, 0xc3,
0x71, 0xa2, 0x39, 0x84, 0x42, 0xaa, 0x0e, 0x4e, 0xb8, 0xd9, 0x28, 0xe1,
0xc8, 0x31, 0xfd, 0x10, 0xc0, 0xde, 0xa0, 0x37, 0x66, 0xb1, 0x49, 0x07,
0x67, 0xe8, 0x36, 0xd5, 0x1e, 0x5b, 0xaf, 0x06, 0xd4, 0xb7, 0xeb, 0x32,
0xda, 0x5e, 0xce, 0x14, 0xc8, 0xe5, 0x4b, 0x13, 0x75, 0x43, 0x5d, 0xd5,
0x11, 0xde, 0xa7, 0xcb, 0x4c, 0xc1, 0x63, 0x9c, 0x3b, 0x66, 0xe9, 0x0c,
0xb0, 0x63, 0x39, 0x50, 0x6f, 0x42, 0xb8, 0x09, 0xcf, 0x9f, 0xc0, 0xed,
0x24, 0xca, 0x6a, 0x4e
```

FIG. 8z

PLANE DEPENDENT MATRIX BASED HALFTONING

FIELD OF THE INVENTION

This invention relates to imaging devices. More particularly, this invention relates to the formation of images by the placement of a colorant upon media.

BACKGROUND OF THE INVENTION

Imaging devices, such as electrophotographic printers and inkjet printers, form on media a representation of an image by controlling the placement of a colorant, such as particles of toner, liquid toner, or a small volume of ink, on the media. The surface of the media can be subdivided into a two-dimensional matrix of picture elements (pixels). Data defining the image is received by the imaging device. The data defines the image on a pixel by pixel basis in terms of the intensity of the primary colors of the color space used. The data supplied to the imaging device may correspond, on a pixel by pixel basis, to a color value for each pixel. The color value may express the intensity of each of the primary colors in terms of primary color values corresponding to each of the primary colors. For example, if the color value supplied to the imaging device corresponds to an RGB color space, the color value would include primary color values corresponding to the red, green, and blue colors in the color space. Commonly, eight bits are used to specify the intensity of each of the primary color values. The color value is formed from a combination of the primary color values. For example, in an RGB color space using eight bits to define each of the primary color values, the color value for each pixel includes twenty four bits.

The RGB color space is commonly used for displaying images on computer monitors. Computer monitors have the capability to generate the primary colors forming the pixels on the monitor at intensity levels corresponding to the primary color values. For example, with eight bits used to specify each of the red, green, and blue primary color values, 256 intensity levels of each of the primary colors can be generated, thereby allowing over 16 million intensity level combinations.

Imaging devices, such as electrophotographic printers or inkjet printers typically use a CMY or CMYK color space. In a CMY color space, the primary colors are cyan, magenta, and yellow. Ideally, black can be produced by combining the cyan, magenta, and yellow colorant. However, variations in the imaging process and the colorant can make it difficult to produce black by combining the cyan, magenta, and yellow colorants. Therefore, imaging devices frequently include a black colorant, used in place of a combination of cyan, magenta, and yellow colorants, when the color value for a pixel corresponds to black.

If the color values defining the image are specified in an RGB color space and the imaging device uses a CMY color space, a color space conversion is performed. The color space conversion operation may be performed in hardware or it may be performed in software. The result of the color space conversion is three, eight bit values specifying the intensity of the cyan, magenta, and yellow colorant.

Typically, imaging devices, such as electrophotographic printers and inkjet printers, are configured to operate, with respect to the placement of colorant on media, in a binary fashion. That is, the imaging device either places or does not place colorant on the pixel, rather than placing a varying quantity of the colorant, pixel by pixel, to correspond to the primary color values. Therefore to form a representation of the image on the media, colorant is placed on the media in a manner that simulates the effect that would result from placing colorant with a varying intensity corresponding to the primary color values.

A halftoning operation is used to simulate the intensity variation of the primary color values while placing colorant in a binary fashion on pixels. In a halftoning operation, the primary color values are used to determine the pixels on which colorant corresponding to the primary colors will be placed. Halftoning methods are described in the book Digital Halftoning, by Robert Ulichney, The MIT Press, 1987, incorporated by reference into this specification in its entirety.

The specific halftoning operation selected for forming the image can have a significant impact on the perceived quality of the result. Consider an image that includes, ideally, a substantially uniform background of a color that is formed in a halftoning operation, with a majority of pixels formed from colorant of one primary color and a minority of pixels formed from colorant of another primary color. In locations where, as a result of the halftoning operation, colorant of the majority primary color and colorant of the minority primary color overlap, a grainy appearance in the background color can result. Although error diffusion halftoning operations can reduce the grainy appearance resulting from the overlap of colorants, error diffusion halftoning operations are computationally and memory intensive. A need exists for a halftoning method that reduces the grainy appearance resulting from the overlap of colorant and is less computationally and memory intensive than error diffusion halftoning operations.

SUMMARY OF THE INVENTION

Accordingly, a halftoning method has been developed. The halftoning method includes adding a first value and a second value to form a sum. The halftoning method further includes placing a first colorant on the media if the sum exceeds a third value and either the second value exceeds the first value and the first value exceeds the third value or the first value equals or exceeds the second value and the third value equals or exceeds the second value. In addition, the halftoning method includes placing the second colorant on the media if the sum exceeds the third value and either the first value equals or exceeds the second value and the second value exceeds the third value or the second value exceeds the first value and the third value equals or exceeds the first value.

A storage device includes a computer readable medium. In addition, the storage device includes processor executable instructions stored on the computer readable medium. The processor executable instructions are configured to perform a halftoning process. The halftoning process includes adding a first value and a second value to form a sum. In addition, the halftoning process includes placing a first colorant on the media if the sum exceeds a third value and either the second value exceeds the first value and the first value exceeds the third value or the first value equals or exceeds the second value and the third value equals or exceeds the second value. Furthermore, the halftoning process includes placing the second colorant on the media if the sum exceeds the third value and either the first value equals or exceeds the second value and the second value exceeds the third value or the second value exceeds the first value and the third value equals or exceeds the first value.

A halftoning method includes adding a first value and a second value to form a sum. In addition, the halftoning method includes placing a first colorant on the media if the sum exceeds a third value, a fourth value equals or exceeds the sum, and either the second value exceeds the first value and the first value exceeds the third value or the first value equals or exceeds the second value and the third value equals or exceeds the second value. Furthermore, the halftoning method includes placing the second colorant on the media if the sum exceeds the third value, a fourth value equals or exceeds the sum, and either the first value equals or exceeds the second value and the second value exceeds the third value or the second value exceeds the first value and the third value equals or exceeds the first value. Additionally, the halftoning method includes subtracting a fourth value from the sum forming a difference and determining a smallest of the first value, the second value, and the difference exceeding the third value. Also, the halftoning method includes placing either the first colorant and the second colorant, the first colorant, or the second colorant on the media, if, respectively, the difference, the first value, or the second value corresponds to the smallest.

A system to form an image on media includes a computer configured to perform a halftoning process. The halftoning process includes adding a first value and a second value to form a sum. The halftoning process also includes generating data specifying placement of a first colorant on the media if the sum exceeds a third value and either the second value exceeds the first value and the first value exceeds the third value or the first value equals or exceeds the second value and the third value equals or exceeds the second value. In addition, the halftoning process includes generating the data specifying placement of the second colorant on the media if the sum exceeds the third value and either the first value equals or exceeds the second value and the second value exceeds the third value or the second value exceeds the first value and the third value equals or exceeds the first value. Furthermore, the system includes an imaging device including an imaging mechanism and a controller coupled to the imaging mechanism and configured to place the first colorant or the second colorant on the media according to the data.

An imaging device includes a controller configured to perform a halftoning process. The halftoning process includes adding a first value and a second value to form a sum, generating data specifying placement of a first colorant on the media if the sum exceeds a third value and either the second value exceeds the first value and the first value exceeds the third value or the first value equals or exceeds the second value and the third value equals or exceeds the second value. In addition, the halftoning process includes generating the data specifying placement of the second colorant on the media if the sum exceeds the third value and either the first value equals or exceeds the second value and the second value exceeds the third value or the second value exceeds the first value and the third value equals or exceeds the first value. The imaging device also includes an imaging mechanism configured to place the first colorant or the second colorant on the media according to the data.

DESCRIPTION OF THE DRAWINGS

A more thorough understanding of embodiments of the halftoning method may be had from the consideration of the following detailed description taken in conjunction with the accompanying drawings in which:

Shown in FIG. 1 is a schematic representation of a halftoned region showing overlap between cyan and magenta colorants.

Figure 2:
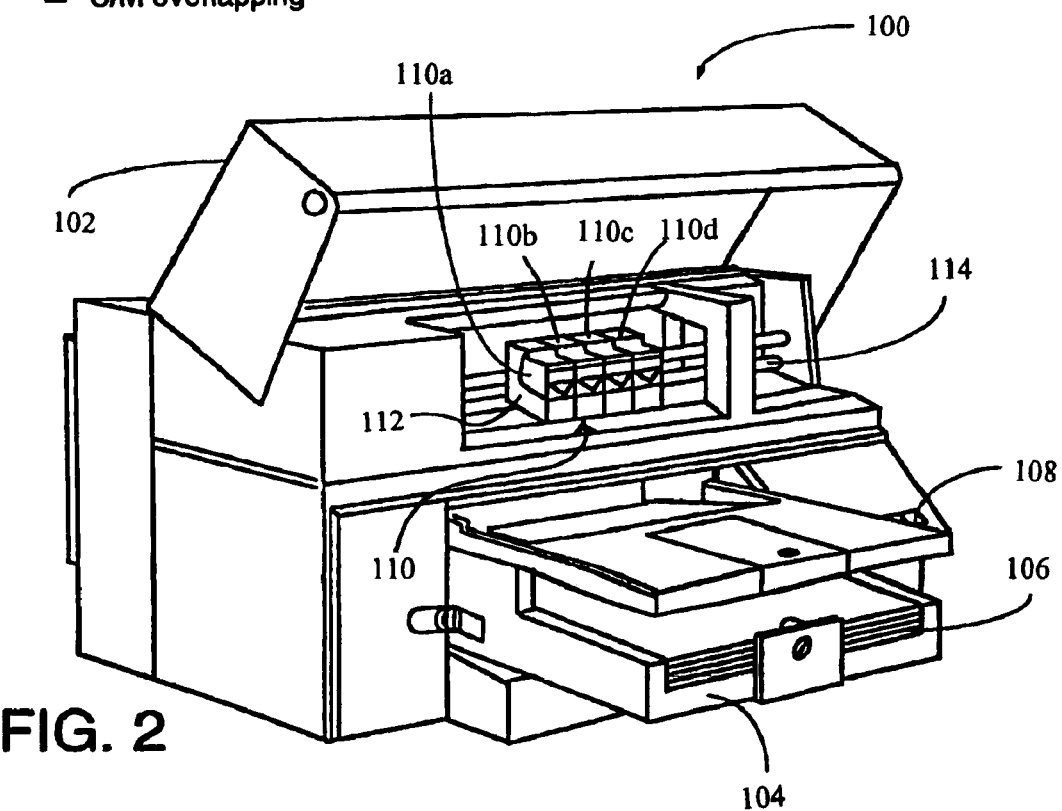

Shown in FIG. 2 is an exemplary ink-jet printer.

Figure 3:
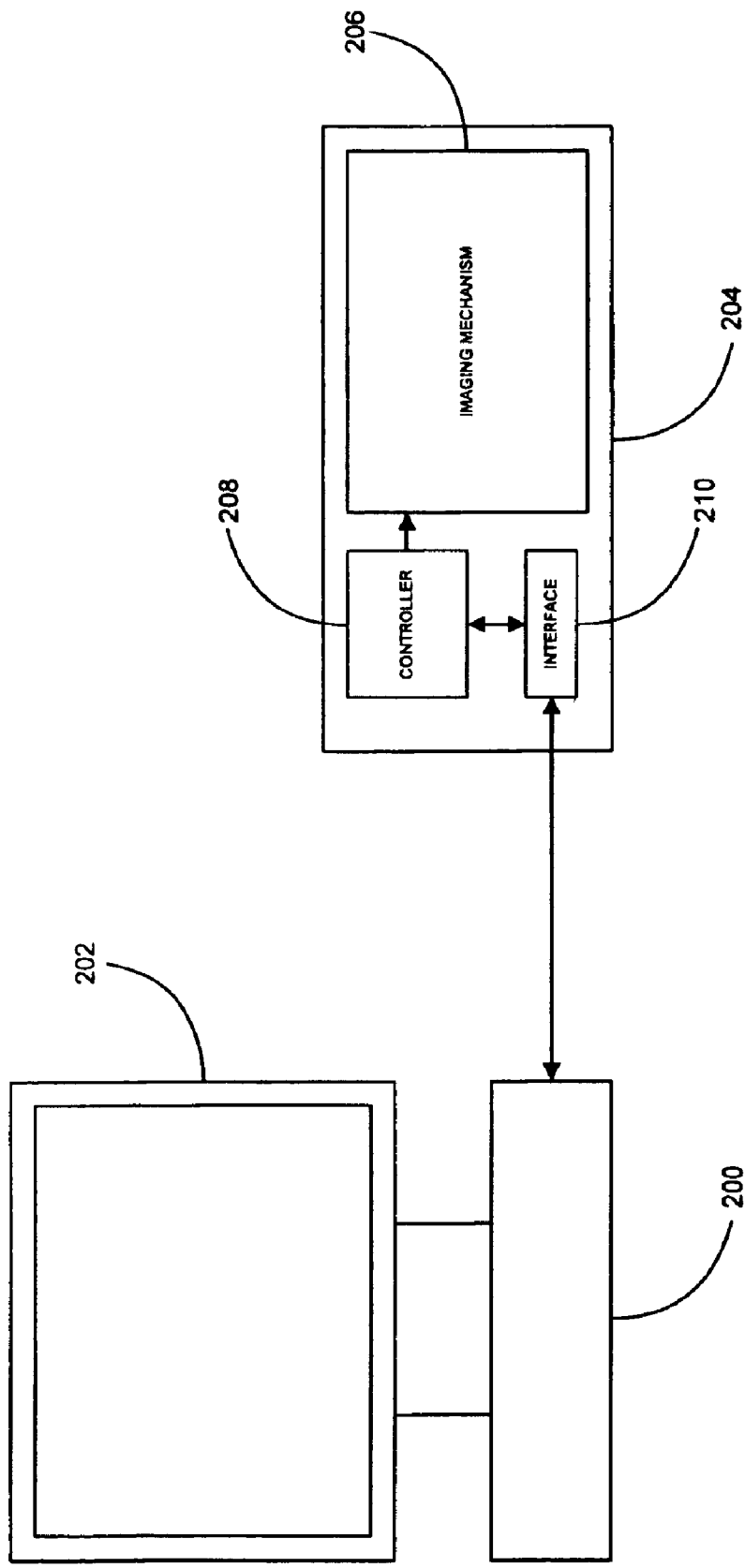

Shown in FIG. 3 is a block diagram representation of a system used for forming images on media.

Figure 4:
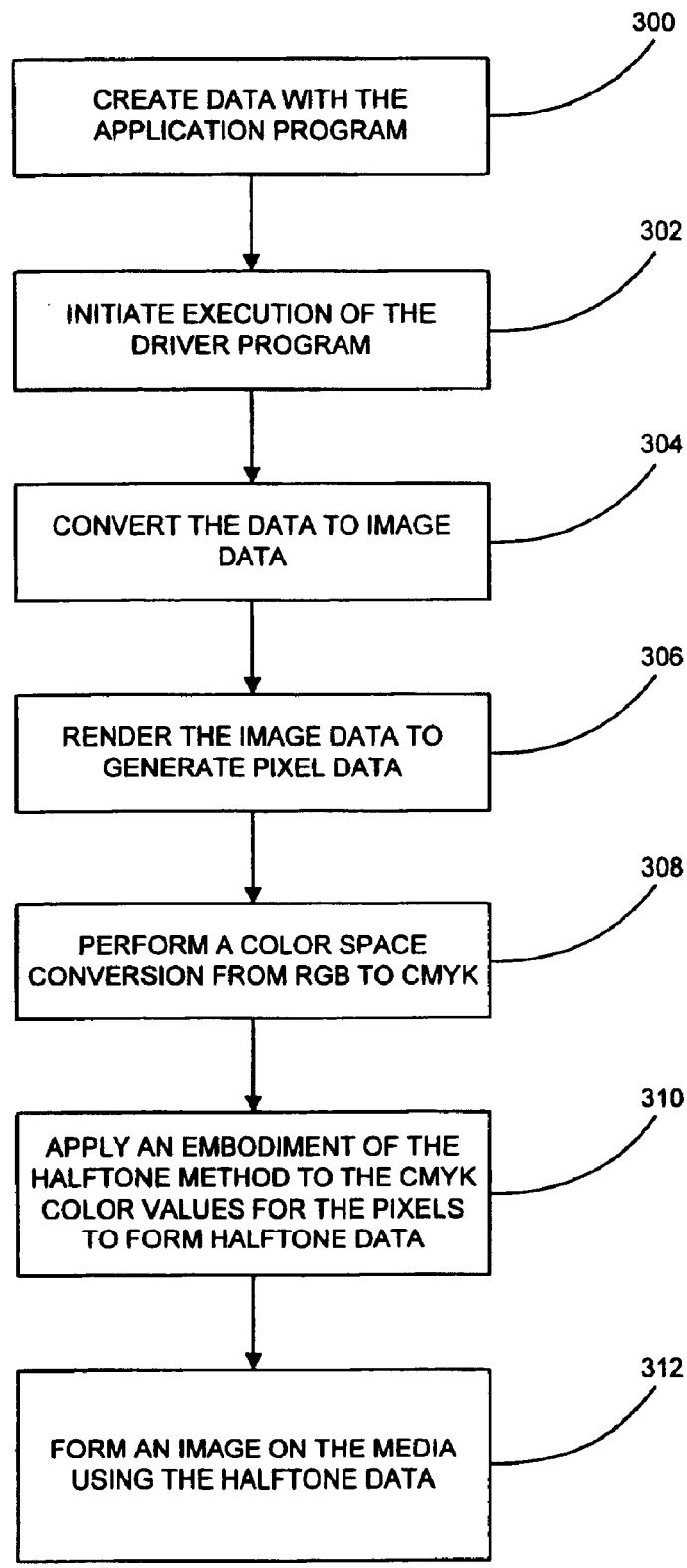

Shown in FIG. 4 is a high level flow diagram of a method for forming an image on media using the system of FIG. 3.

Figure 5:
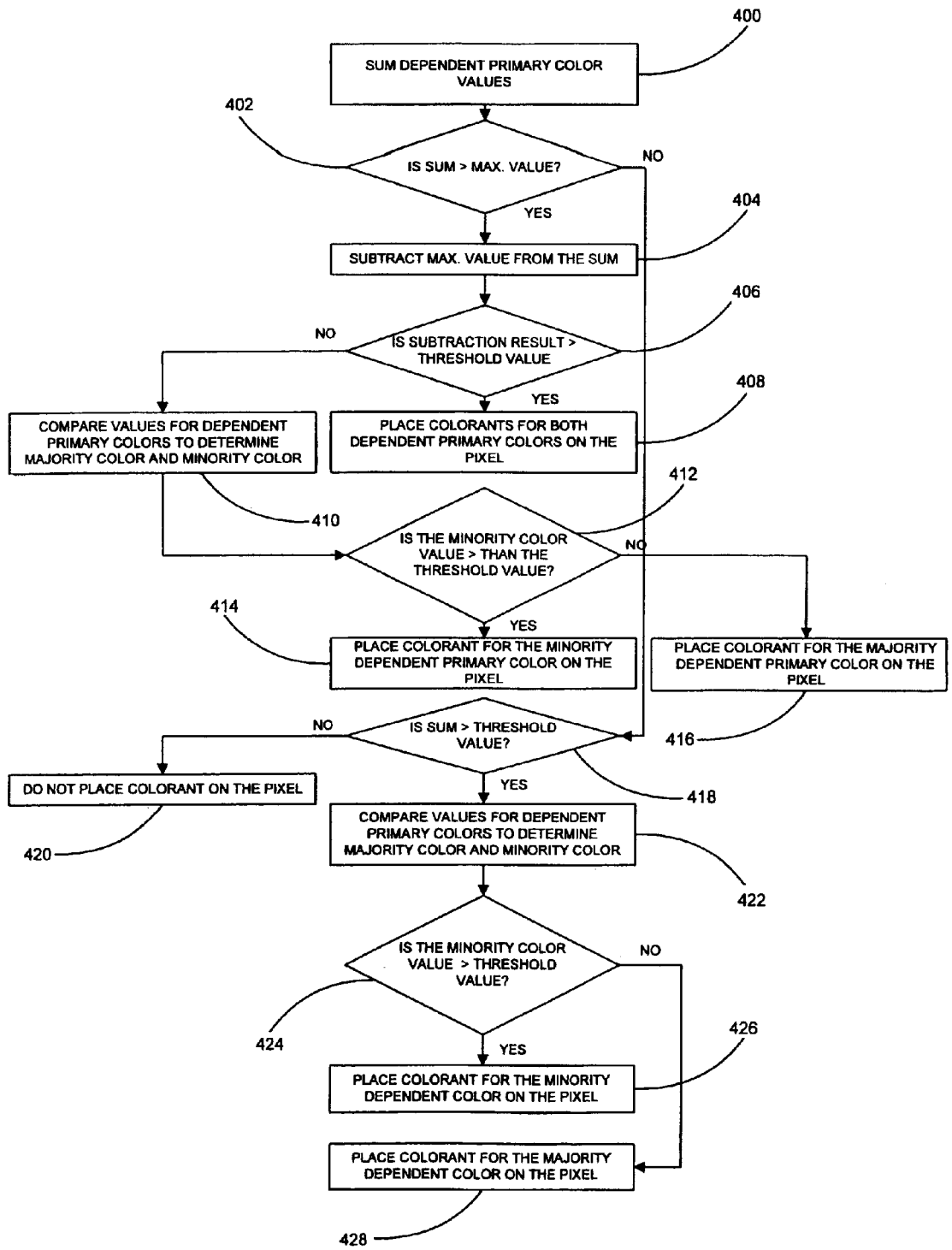

Shown in FIG. 5 is a flow diagram describing the operation of an embodiment of a halftoning method.

Shown in FIG. 6 is pseudo code for an embodiment of the halftoning method.

Figure 7:
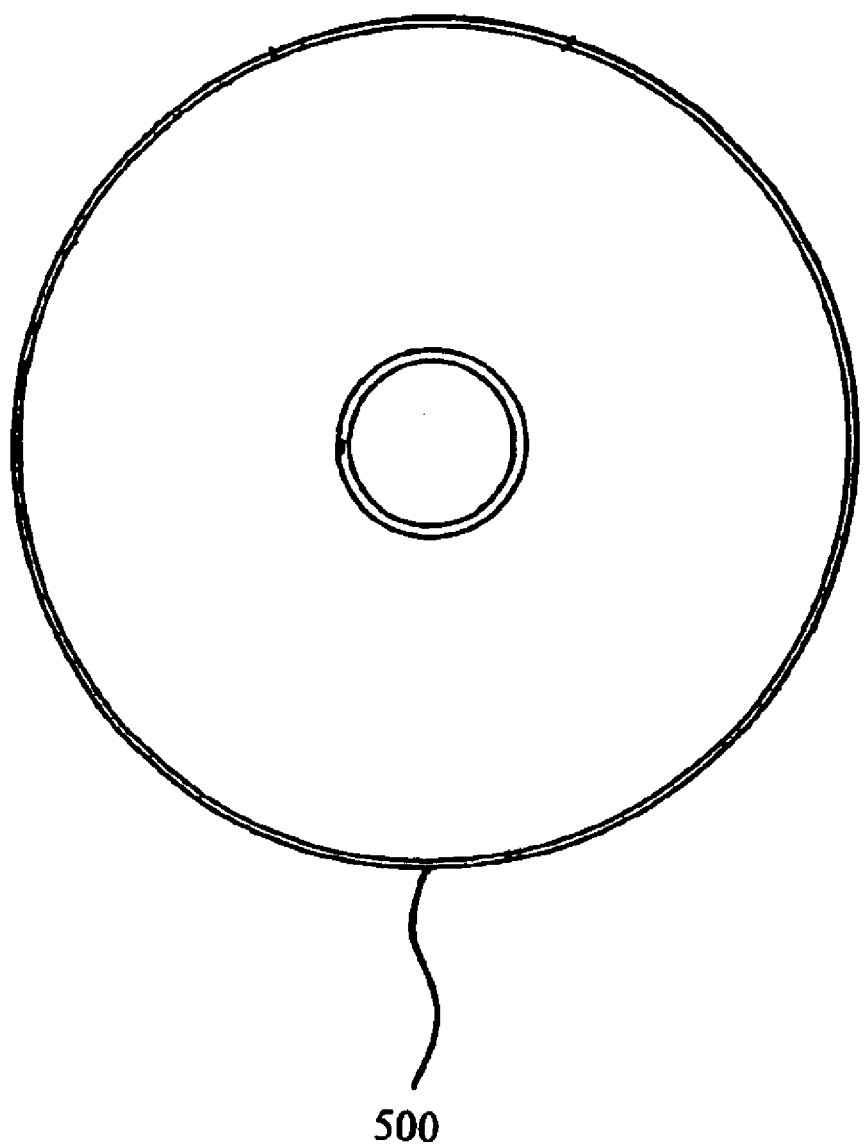

Shown in FIG. 7 is an embodiment of a computer readable medium.

Shown in FIGS. 8a–8z is a threshold matrix that could be used with the embodiment of the halftoning method corresponding to FIG. 5.

DETAILED DESCRIPTION OF THE DRAWINGS

Although embodiments of the halftoning method will be discussed in the context of an inkjet printer, it should be recognized that embodiments of the halftoning method are readily adaptable to other imaging devices. For example, an embodiment of the halftoning method could be used in an electrophotographic imaging device, such as an electrophotographic printer, to improve image appearance. Or, an embodiment of the halftoning method could be used in an electrophotographic imaging device that uses liquid toner. Furthermore, embodiments of the halftoning method are useful, in general, in imaging devices that place colorant on media in a binary fashion.

In general, matrix based halftoning involves the use of a threshold matrix. At each pixel, each of the primary color values for pixel are compared to a value in a threshold matrix. If the primary color value for the pixel is greater than the corresponding threshold matrix value, then colorant for that primary color is placed on the pixel. If the primary color value for the pixel is not greater than the corresponding threshold matrix value, then colorant for that primary color is not placed on the pixel. In an imaging device that uses 8 bits to specify each of the primary color values, the primary color values can range from 0 to 255 The color values in the threshold matrix can also range from 0 to 255.

In one prior implementation of a matrix based halftoning operation applied in an imaging device capable forming color images, the thresholding operation is applied to each color plane. In applying the thresholding operation to each color plane, a single threshold matrix may be used for all color planes. To reduce coherency between different color planes, a spatial offset can be introduced in the thresholding matrix between color planes. The spatial offset applied to the thresholding matrix can be fixed between color planes or it can be random between color planes.

The result of the halftoning operation on each of the color planes exhibits the characteristics (in terms of the pleasing appearance of the halftoned region for the color plane) of the thresholding matrix used. However, patterns can be created between the color planes. These patterns can significantly decrease the perceived print quality of the color image that is formed. Another effect that can occur from using a single threshold matrix for multiple color planes is the generation of a grainy appearance in the image due to placement of colorant of different colors onto the same pixels.

Figure 1:
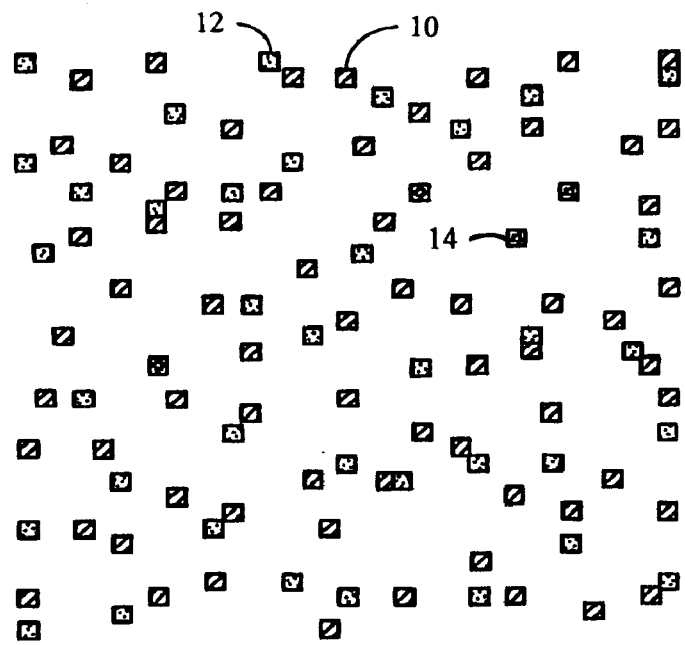

Shown in FIG. 1 is a representation of a formation of a light background color formed from a halftoning operation using two primary colors. This particular halftoning operation has a grainy appearance resulting from overlap of colorant on a pixel. One of the primary colors is cyan. The other primary color is magenta. Placement of cyan colorant onto a pixel is shown by exemplary pixel 10. placement of magenta colorant onto a pixel is shown by exemplary pixel 12. The overlap of the cyan colorant and the magenta colorant is shown by exemplary pixel 14. The pixels on which the cyan colorant and the magenta colorant are overlapping produce a darker blue color than the other areas on the background. The darker blue pixels contrasted against the lighter blue color in other areas of the background produce a grainy appearance.

Another prior halftoning operation uses a unique threshold matrix for each color plane. The threshold matrices used for the color planes are designed so that when the color planes are combined, the resulting image is less grainy than it would have been using a single threshold matrix for all color planes. However, the multiple threshold matrices perform best when a ratio of the amounts of the colorants used in the formation of the images is within a relatively narrow range. Outside of this range, there are still problems with a grainy appearance of the image formed using this halftone operation. The matrices could be designed to improve image appearance outside of this range of the ratio of colorants. However, this improvement would come at the expense of the image appearance in other ranges of the ratio of the colorants. In addition, if a monochrome image is produced using one of the colorants and one of the threshold matrices, then the resulting image will have a less pleasing appearance than would be produced using a threshold matrix designed for a monochrome imaging process.

A halftoning method has been developed to improve upon the previously described weaknesses of matrix based halftoning in a color imaging process. The halftoning method permits the use of a single threshold matrix while reducing the likelihood of correlation between the color planes in a way that produces a less grainy image and reduces the interference of patterns between color planes.

Shown in FIG. 2 is an embodiment of an imaging device, color inkjet printer 100, that includes processing circuitry used in performing the halftoning method.

Color inkjet printer 100 includes a cover 102, a media input tray 104 for holding media 106 to be used in an imaging operation, a media output tray 108 for receiving the units of media 106 on which images have been formed, color cartridges 110 (including a cyan cartridge 110a, a magenta (M) cartridge 110b, a yellow (Y) cartridge 110c, and a black (K) cartridge 110d), and a scanning carriage 112 for sliding along a slide bar 114 while colorant from one or more of color cartridges 110 is placed onto pixels. In color inkjet printer 100, the colorant stored in color cartridges 110 includes ink.

Shown in FIG. 3 is a block diagram representation of a system used for forming images on media. The system includes a computer 200. Computer 200 may execute an application program to generate data corresponding to an image displayed on monitor 202 (such as a CRT). Typically, monitor 202 will display an image using an RGB color space and 24 bits (8 bits for each primary color) to specify the color value for each monitor pixel. An imaging device 204 is coupled to computer 200. Imaging device 204 may include color inkjet printer 100 or other types of imaging devices such as electrophotographic printers, facsimile machines, or the like. Imaging device 204 includes the capability to form color images upon media in a binary fashion using a set of colorants forming a color space (e.g. cyan, magenta, and yellow). Imaging device 204 may be configured to form images at 300 dpi, 600 dpi, 1200 dpi, or other resolutions. A driver program that may be executed in computer 200 converts the data generated by the application program into a form useable by imaging device 204 to form an image on media. Imaging device 204 forms the image on the media using an embodiment of the halftoning method. Typically, execution of the driver program is initiated by a user through the application program.

Included in imaging device 204 is an embodiment of an imaging mechanism, imaging mechanism 206. Imaging mechanism 206 includes the hardware necessary to place colorant on media 106 according to embodiments of the halftoning method. For example, in the case of an electrophotographic imaging device, such as imaging mechanism 206, may include a photoconductor, developing devices for developing cyan, magenta, yellow, and black toner (the colorants in this embodiment of imaging mechanism 206), a photoconductor exposure system for forming a latent electrostatic image on the photoconductor, a charging device for charging the photoconductor, a transfer device for transferring toner from the photoconductor to media 106, and a fixing device for fixing toner to media 106. A controller, such as controller 208, coupled to imaging mechanism 206 controls the placement of colorant on media 106 by imaging mechanism 206 according to the embodiment of the halftoning method. The output from the application program executing in computer 200 is passed through interface 210 to controller 208. The controller may include a processing device, such as a microprocessor, or an application specific integrated circuit (ASIC). Further detail on embodiments of imaging mechanisms used in color electrophotographic imaging devices can be found in U.S. Pat. No. 5,291,251, entitled IMAGE DEVELOPMENT AND TRANSFER APPARATUS WHICH UTILIZED AN INTERMEDIATE TRANSFER FILM, issued to Storlie et. al., and assigned to Hewlett-Packard Company, and U.S. Pat. No. 5,314,774, entitled METHOD AND APPARATUS FOR DEVELOPING COLOR IMAGES USING DRY TONERS AND AN INTERMEDIATE TRANSFER MEMBER, issued to Camis, and assigned to Hewlett-Packard Company. Each of these two patents is incorporated by reference in their entirety into this specification.

In the case of a color inkjet imaging device, imaging mechanism 206 may include ink cartridges movably mounted on a carriage with its position precisely controlled by a belt driven by a stepper motor. An ink cartridge driver circuit coupled to the controller and the ink cartridges fires nozzles in the ink cartridges based upon signals received from the controller to place colorant on media 106 according to an embodiment of the halftoning method. Further detail on embodiments of imaging mechanisms used in color inkjet imaging devices can be found in U.S. Pat. No. 6,082,854, entitled MODULAR INK-JET HARD COPY APPARATUS AND METHODOLOGY, issued to Axtell et al., and assigned to Hewlett-Packard Company, and U.S. Pat. No. 5,399,039, entitled INK-JET PRINTER WITH PRECISE PRINT ZONE MEDIA CONTROL, issued to Giles et al., and assigned to Hewlett-Packard Company. Each of these two patents is incorporated by reference in their entirety into this specification.

Shown in FIG. 4 is a high level flow diagram of a method for forming an image on media using the system of FIG. 3. First, in step 300, a user creates data corresponding to an image on monitor 202 using the application program executing in computer 200. Next, in step 302, the user initiates execution of the driver program residing in computer 200 through the application program to begin the imaging operation. Then, in step 304, the driver program converts the data to image data useable by imaging device 204. The image data corresponds to the image on monitor 202 and is expressed in the RGB color space. Next, in step 306, the image data is rendered to generate pixel data for each pixel in terms of RGB color values. The rendering operation may be performed in computer 200 or in imaging device 204. Then, in step 308, a color space conversion is performed to convert the RGB color values for each pixel into CMYK color values for each pixel. Next, in step 310, an embodiment of the halftoning method is applied to the CMYK color values for the pixels forming the image to form halftone data. The halftone data indicates for every pixel in the image, in a binary fashion, whether each of the cyan, magenta, yellow, or black colorants are to be applied. The embodiment of the halftoning method could be performed within computer 200 or within controller 208. Finally, in step 312, the image is produced on the media by imaging device 204 using the halftone data.

The embodiment of the halftoning method in step 310 of FIG. 4 includes plane dependent matrix based halftoning. Plane dependent matrix based halftoning has advantages of increased speed and lower memory usage than error diffusion halftoning operations while having the capability to correlate color planes over the color space.

Shown in FIG. 5 is a flow diagram describing the operation of an embodiment of the halftoning method for placing colorant on a pixel that could be used in step 310. Although the embodiment of the halftoning method will be described in the context of correlation between the cyan and the magenta color planes, it should be recognized that other embodiments of the halftoning method are possible. For example, an embodiment of the halftoning method could be applied to correlate more than two color planes.

First, in step 400, the dependent primary color values for a pixel are summed. In this embodiment of the halftoning method there are two dependent primary color values, such as cyan and magenta. However, it should be recognized that embodiments of the halftoning method could be implemented in which there are more than two dependent primary color values. Next, in step 402, it is determined if the sum of step 400 is over the maximum possible primary color value (a value of 255 in a system using 8 bits to specify each of the primary color values). If the sum is over the maximum possible primary color value, colorant is to be placed on the pixel. The situation in which the sum is not over the maximum possible primary color value will be described later.

In step 404, the maximum possible primary color value is subtracted from the sum. The amount by which the sum exceeds the maximum possible primary color value represents the strength of the signal of the color that is formed by combining the two dependent primary colors. For the case in which the primary dependent colors are cyan and magenta, the amount by which the sum exceeds the maximum possible primary color value represents the strength of the blue signal for the pixel. For example, if the primary color values for both of the dependent primary colors are at a maximum value, then the signal for the color formed by combining the two dependent primary colors is at a maximum.

In step 406, the result from the subtraction performed in step 404 is compared to the threshold value for the pixel. If the result is greater than the threshold value for the pixel, then, in step 408, colorant for both of the dependent primary colors is deposited on the pixel. This situation corresponds to the case in which the signal for the color formed from the combination of the two dependent primary colors is sufficiently strong so that the color formed from the combination of the two dependent primary colors should be present at the pixel.

If the result of the subtraction performed in step 404 is not greater than the threshold value for the pixel, then, in step 410, the dependent primary color values are compared against each other. The majority dependent primary color value is the greater of the two. The minority dependent primary color value is the lesser of the two. Next, in step 412, the minority dependent primary color value is compared to the threshold value for the pixel. If the minority dependent primary color value is greater than the threshold value, then, in step 414, colorant for the minority dependent primary color is placed on the pixel. If the minority dependent primary color values is less than the threshold value, then, in step 416, colorant for the majority dependent color is placed on the pixel.

If the sum of step 400 is less than the maximum possible primary color value, then, in step 418, the sum of step 400 is compared to the threshold value for the pixel. If the sum of step 400 is not greater than the threshold value, then, in step 420, no colorant is placed on the pixel. If the sum of step 400 is greater than the threshold value, then in step 422, the dependent primary color values are compared against each other as in step 410. Next, in step 424, the minority dependent primary color value is compared to the threshold value for the pixel. If the minority dependent primary color value is greater than the threshold value, then, in step 426, colorant for the minority dependent primary color is placed on the pixel. If the minority dependent primary color values is less than the threshold value, then, in step 428, colorant for the majority dependent color is placed on the pixel.

Shown in FIG. 6 is pseudo code for an embodiment of the halftoning method. This embodiment of the halftoning method is adapted for use in an imaging device using a CMYK color space with 8 bits used to specify each of the primary color values. The dependent primary colors correlated for this embodiment of the halftoning method are cyan and magenta.

A variety of different threshold matrices could be used with embodiments of the halftoning method. Any monochrome threshold matrix that will yield a pleasing distribution of colorant over a range of coverage densities may be used with embodiments of the halftoning method. In addition, it should be recognized that threshold matrices of a variety of sizes could be used. For example, threshold matrices having 64 by 64 elements, 128 by 128 elements, or 256 by 256 elements could be used. In general, with a smaller size threshold matrix the halftoning operation is performed at a higher spatial frequency across the media and is therefore more likely to be visually perceived than performing the halftoning operation with a larger size threshold matrix. However, the larger the size of the threshold matrix used, the more computationally difficult the halftoning operation becomes. Shown in FIGS. 8a–8z is an exemplary threshold matrix that could be used with an embodiment of the halftoning method. The values in the threshold matrix are supplied in a linear array. The values in the linear array correspond to the values in a two dimensional matrix. The element at row i and column j in the two dimensional matrix corresponds to element [(i×128)+j] in the linear array.

The disclosed embodiment of the halftoning method is able to reduce the degree of graininess in an image by effectively distributing the colorants over the image in a way so that pixels on which two colorants are placed are distributed relatively widely over a background of one of the other two dependent primary colorants. The benefits of the disclosed embodiment of the halftoning method are particularly noticeable for the case in which the image includes a background dominated by the majority dependent primary color with a substantially smaller percentage of the minority dependent primary color. Summing the dependent primary colors and comparing the result against the maximum possible threshold matrix value and the corresponding threshold matrix value ensures placement of both dependent primary colorants on the pixel when the combined signals for the dependent primary colors is sufficiently strong and prevents placement of both dependent primary colorants on the pixel otherwise. In addition, for the case in which both dependent primary colorants will not be placed on the pixel, identifying the minority dependent primary color and giving priority in the decision flow of the method to the placement of the minority dependent primary colorant, a relatively even distribution of the minority dependent primary color over the image is achieved, thereby reducing the occurrence of clustering of the minority dependent primary color that causes a grainy appearance. By giving priority to placement of the minority dependent primary colorant it is more likely to place the minority dependent primary color throughout the image in the visually pleasing manner specified by the threshold matrix used. Had both primary dependent colorants been placed on the pixel if each of them was individually greater than the corresponding threshold matrix value, a grainy appearance would be more likely to result. In addition, for the case in which both dependent primary colorants will not be placed on the pixel, had priority been given to placement of the majority dependent primary color, the distribution of the minority dependent primary color in the image would not as closely follow the distribution specified by the threshold matrix as it does in embodiments of the halftone method.

An alternative embodiment of the halftone method follows a different dependent primary colorant placement priority scheme for the part of method corresponding to the case in which the sum of the dependent primary color values is greater than the maximum possible threshold matrix value. In this alternative embodiment, the resulting sum and the two dependent primary color values are rank ordered from the smallest value to the largest value. Beginning with the smallest of these three values and continuing, until a colorant is placed on the pixel, to the largest of these three values, each of these values is compared to the corresponding threshold matrix value. The first of these three values greater than the matrix threshold value has the corresponding colorant placed on the pixel.

For example, if the smallest of the three values corresponds to cyan and the corresponding value is greater than the threshold matrix value, than cyan colorant is placed on the pixel. If the value corresponding to cyan is not greater than the threshold matrix value, and the next smallest value corresponds to magenta, the value corresponding to magenta is compared to the threshold matrix value. If the magenta value is greater than the threshold matrix value, then magenta colorant is placed on the pixel. If the value corresponding to magenta is not greater than the threshold matrix value, than both magenta colorant and cyan colorant are placed on the pixel because the sum of the magenta value and the cyan value has already been determined to be greater than the maximum possible threshold matrix value.

This alternative embodiment of the halftoning method can be extended, in a straightforward manner, to more than two dependent color planes. For example, it could be extended to colorant systems using C,M,Y,K,C-low, M-low or to systems using C,M,Y,K, Orange, Green to correlate more than two of the colorants. Consider the case in which it is desired to correlate three dependent color planes. The values corresponding to the colors are added. The maximum threshold matrix value is subtracted from the resulting sum. If the result of the subtraction is greater than twice the maximum threshold value, all three colorants are placed on the pixel. If the result is less than or equal to twice the maximum threshold value, three sums are formed by adding the corresponding values for each of the possible pairs of colors values. Then, all of the four sums formed, as well as the individual values corresponding to the colors, are rank ordered from the smallest value to the largest value. Each of the values, beginning with the smallest values, are compared to the corresponding threshold matrix value. For the first one of the values that is greater than the threshold matrix value, the corresponding colorant (or colorants) are placed onto the pixel.

Shown in FIG. 7 is an embodiment of a computer readable medium, such as a compact disk 500, on which code for an embodiment of the halftoning method could be stored. Embodiments of the halftoning method could be distributed to users on the compact disks or floppy disks for installation onto the hard disk drive in a computer, such as computer 200. Alternatively, embodiments of the halftoning method could be distributed through a network to computer 200 or to a network enabled imaging device.

Shown in FIGS. 8a–8z is a threshold matrix that could be used with the embodiment of the halftoning method corresponding to FIG. 5. However, it should be recognized that many different types of the threshold matrices could be used with embodiments of the halftoning method.

Although an embodiment of the halftoning method has been illustrated, and described, it is readily apparent to those of ordinary skill in the art that various modifications may be made to this embodiment without departing from the scope of the appended claims.

What is claimed is:

1. A halftoning method, comprising:
    adding a first value and a second value to form a sum;
    placing a first colorant on the media if the sum exceeds a third value and either the second value exceeds the first value and the first value exceeds the third value or the first value equals or exceeds the second value and the third value equals or exceeds the second value; and
    placing the second colorant on the media if the sum exceeds the third value and either the first value equals or exceeds the second value and the second value exceeds the third value or the second value exceeds the first value and the third value equals or exceeds the first value.

2. The halftoning method as recited in claim 1, further comprising:
    subtracting a fourth value from the sum forming a difference; and
    placing the first colorant and the second colorant on the media if the difference exceeds the third value.

3. The halftoning method as recited in claim 2, wherein:
    placing the first colorant and the second colorant on the media includes comparing the difference to the third value.

4. The halftoning method as recited in claim 3, wherein:
    placing the first colorant on the media includes comparing the third value to the sum, the second value to the first value, the first value to the third value, and the second value to the third value.

5. The halftoning method as recited in claim 4, wherein:

placing the second colorant on the media includes comparing the third value the sum, the first value to the second value, the second value to the third value, and the third value to the first value.

6. The halftoning method as recited in claim 5, wherein:

the first colorant includes cyan; and the second colorant includes magenta.

7. The halftoning method as recited in claim 6, wherein:

the first value includes a first color value corresponding to an intensity of the cyan; and the second value includes a second color value corresponding to an intensity of the magenta.

8. The halftoning method as recited in claim 7, wherein:

placing the first colorant on the media includes placing the first colorant on a pixel;

placing the second colorant on the media includes placing the second colorant on the pixel; and placing the first colorant and the second colorant on the media includes placing the first colorant and the second colorant on the pixel.

9. The halftoning method as recited in claim 8, wherein:

the third value includes a matrix threshold value corresponding to the pixel.

10. The halftoning method as recited in claim 9, wherein:

the fourth value corresponds to a maximum possible value of the first color value and the second color value.

11. A storage device, comprising:

a computer readable medium; and processor executable instructions stored on the computer readable medium, with the processor executable instructions configured to perform a halftoning process including adding a first value and a second value to form a sum, placing a first colorant on the media if the sum exceeds a third value and either the second value exceeds the first value and the first value exceeds the third value or the first value equals or exceeds the second value and the third value equals or exceeds the second value, and placing the second colorant on the media if the sum exceeds the third value and either the first value equals or exceeds the second value and the second value exceeds the third value or the second value exceeds the first value and the third value equals or exceeds the first value.

12. The storage device as recited in claim 11, wherein:

the processor executable instructions further include subtracting a fourth value from the sum forming a difference and placing the first colorant and the second colorant on the media if the difference exceeds the third value.

13. The storage device as recited in claim 12, wherein:

for the processor executable instructions, placing the first colorant and the second colorant on the media includes comparing the third value to sum, the second value to the first value, the first value to the third value, and the second value to the third value, and placing the second colorant on the media includes comparing the third value to the sum, the first value to the second value, the second value to the third value, and the third value to the first value.

14. The storage device as recited in claim 13, wherein:

the first colorant includes cyan;

the second colorant includes magenta;

the first value includes a first color value corresponding to an intensity of the cyan; and the second value includes a second color value corresponding to an intensity of the magenta.

15. The storage device as recited in claim 14, wherein:

for the processor executable instructions, placing the first colorant on the media includes placing the first colorant on a pixel placing the second colorant on the media includes placing the second colorant on the pixel, placing the first colorant and the second colorant on the media includes placing the first colorant and the second colorant on the pixel, the third value includes a matrix threshold value corresponding to the pixel, and the fourth value corresponds to a maximum possible value of the first color value and the second color value.

16. A halftoning method, comprising:

adding a first value and a second value to form a sum;

placing a first colorant on the media if the sum exceeds a third value, a fourth value equals or exceeds the sum, and either the second value exceeds the first value and the first value exceeds the third value or the first value equals or exceeds the second value and the third value equals or exceeds the second value; and placing the second colorant on the media if the sum exceeds the third value, a fourth value equals or exceeds the sum, and either the first value equals or exceeds the second value and the second value exceeds the third value or the second value exceeds the first value and the third value equals or exceeds the first value;

subtracting the fourth value from the sum forming a difference;

determining a smallest of the first value, the second value, and the difference exceeding the third value; and placing either the first colorant and the second colorant, the first colorant, or the second colorant on the media, if respectively, the difference, the first value, or the second value corresponds to the smallest.

17. The halftoning method as recited in claim 16, wherein:

the first colorant includes cyan;

the second colorant includes magenta;

the first value includes a first color value corresponding to an intensity of the cyan; and the second value includes a second color value corresponding to an intensity of the magenta.

18. The halftoning method as recited in claim 17, wherein:

placing the first colorant on the media includes placing the first colorant on a pixel;

placing the second colorant on the media includes placing the second colorant on the pixel;

placing the first colorant and the second colorant on the media includes placing the first colorant and the second colorant on the pixel;

the third value includes a matrix threshold value corresponding to the pixel; and the fourth value corresponds to a maximum possible value of the first color value and the second color value.

19. A system to form an image on media, comprising:

a computer configured to perform a halftoning process including adding a first value and a second value to form a sum, generating data specifying placement of a first colorant on the media if the sum exceeds a third value and either the second value exceeds the first value and the first value exceeds the third value or the first value equals or exceeds the second value and the third value equals or exceeds the second value, and generating the data specifying placement of the second colorant on the media if the sum exceeds the third value and either the first value equals or exceeds the second value and the second value exceeds the third value or the second value exceeds the first value and the third value equals or exceeds the first value; and an imaging device including an imaging mechanism and a controller coupled to the imaging mechanism and configured to place the first colorant or the second colorant on the media according to the data.

20. The system as recited in claim 19, wherein:

the computer includes a configuration to subtract a fourth valve from the sum forming a difference and generate the data specifying placement of the first colorant and the second colorant on the media if the difference exceeds the third value.

21. The system as recited in claim 20, wherein:

the first colorant includes cyan;

the second colorant includes magenta;

the first value includes a first color value corresponding to an intensity of the cyan;

the second value includes a second color value corresponding to an intensity of the magenta;

the imaging device includes a configuration to place, according to the data, the first colorant on a pixel, the second colorant on pixel, and the first colorant and the second colorant on the pixel;

the third value includes a matrix threshold value corresponding to the pixel; and the fourth value corresponds to a maximum possible value of the first color value and the second color value.

22. An imaging device, comprising:

a controller configured to perform a halftoning process including adding a first value and a second value to form a sum, generating data specifying placement of a first colorant on the media if the sum exceeds a third value and either the second value exceeds the first value and the first value exceeds the third value or the first value equals or exceeds the second value and the third value equals or exceeds the second value, and generating the data specifying placement of the second colorant on the media if the sum exceeds the third value and either the first value equals or exceeds the second value and the second value exceeds the third value or the second value exceeds the first value and the third value equals or exceeds the first value; and an imaging mechanism configured to place the first colorant or the second colorant on the media according to the data.

23. The imaging device as recited in claim 22, wherein:

the controller includes a configuration to subtract a fourth value from the sum forming a difference and generate the data specifying placement of the first colorant and the second colorant on the media if the difference exceeds the third value.

24. The imaging device as recited in claim 23, wherein:

the first colorant includes cyan;

the second colorant includes magenta;

the first value includes a first color value corresponding to an intensity of the cyan;

the second value includes a second color value corresponding to an intensity of the magenta;

the imaging mechanism includes a configuration to place, according to the data, the first colorant on a pixel, the second colorant on the pixel, and the first colorant and the second colorant on the pixel;

the third value includes a matrix threshold value corresponding to the pixel;

the fourth value corresponds to a maximum possible value of the first color value and the second color value.

* * * * *